(12) United States Patent
Murakami et al.

(10) Patent No.: US 8,251,848 B2
(45) Date of Patent: Aug. 28, 2012

(54) POWER SPLIT DUAL INPUT SHAFT TRANSMISSION FOR VEHICLE

(75) Inventors: Akira Murakami, Gotenba (JP);
Makoto Funahashi, Gotenba (JP);
Takahiro Shiina, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 786 days.

(21) Appl. No.: 12/295,921

(22) PCT Filed: Aug. 2, 2007

(86) PCT No.: PCT/IB2007/002214
§ 371 (c)(1),
(2), (4) Date: Oct. 3, 2008

(87) PCT Pub. No.: WO2008/015549
PCT Pub. Date: Feb. 7, 2008

(65) Prior Publication Data
US 2009/0170649 A1  Jul. 2, 2009

(30) Foreign Application Priority Data

Aug. 3, 2006  (JP) ................................ 2006-212513
Aug. 3, 2006  (JP) ................................ 2006-212517

(51) Int. Cl.
*F16H 3/72* (2006.01)
(52) U.S. Cl. ................................. 475/5; 477/3
(58) Field of Classification Search ................. 475/1, 2, 475/5, 70–83, 198, 199, 201; 903/909, 910, 903/911; 74/330, 311, 329; 180/337, 369; 477/3
See application file for complete search history.

(56) References Cited

U.S. PATENT DOCUMENTS

| | | | |
|---|---|---|---|
| 3,204,486 A | 9/1965 | De Lalio | |
| 4,354,400 A * | 10/1982 | Baker | 475/74 |
| 5,421,790 A * | 6/1995 | Lasoen | 475/78 |
| 5,558,589 A * | 9/1996 | Schmidt | 475/5 |
| 5,571,058 A * | 11/1996 | Schmidt | 475/5 |
| 5,577,973 A * | 11/1996 | Schmidt | 475/5 |
| 5,643,122 A | 7/1997 | Fredriksen | |
| 5,730,676 A * | 3/1998 | Schmidt | 475/5 |
| 6,440,026 B1 * | 8/2002 | Johnson et al. | 475/81 |
| 6,558,283 B1 * | 5/2003 | Schnelle | 475/5 |

(Continued)

FOREIGN PATENT DOCUMENTS

DE  29 04 019 A1  1/1980

(Continued)

*Primary Examiner* — J. Allen Shriver, II
*Assistant Examiner* — Emma K Frick
(74) *Attorney, Agent, or Firm* — Oblon, Spivak, McClelland, Maier & Neustadt, L.L.P.

(57) ABSTRACT

A vehicle transmission includes at least two driving shafts to which power is transmitted from a power source, a driven shaft to which power is transmitted from the driving shafts, drive transmission mechanisms disposed between the driving shafts and the driven shaft, and a switching mechanism that selectively enables power transmission via the drive transmission mechanisms. The driving shafts are disposed concentrically and fitted rotatably relative to each other. The driving shafts are parallel to the driven shaft. A first drive unit is disposed coaxially with the driving shafts. A second drive unit is disposed coaxially with the driven shaft. The first and second drive units are interconnected so as to send and receive powers changed in energy form to and from each other. The transmission thus constructed is excellent in power transmission efficiency, quietness, vehicle mountability, etc., and can realize continuously variable speed change.

16 Claims, 24 Drawing Sheets

U.S. PATENT DOCUMENTS

| | | | |
|---|---|---|---|
| 6,811,508 B2 * | 11/2004 | Tumback | 475/5 |
| 7,034,481 B2 * | 4/2006 | Imai | 318/376 |
| 7,070,531 B2 * | 7/2006 | Ishizaki | 475/75 |
| 7,086,977 B2 * | 8/2006 | Supina et al. | 475/5 |
| 7,166,050 B2 * | 1/2007 | Schmidt et al. | 475/5 |
| 7,455,610 B2 * | 11/2008 | Kim | 475/5 |
| 7,588,510 B2 * | 9/2009 | Johnson | 475/82 |
| 2002/0065162 A1 * | 5/2002 | Kaneko et al. | 475/2 |
| 2003/0100395 A1 * | 5/2003 | Hiraiwa | 475/5 |
| 2004/0251862 A1 * | 12/2004 | Imai | 318/376 |
| 2005/0054469 A1 * | 3/2005 | Dyck et al. | 475/85 |
| 2007/0281815 A1 * | 12/2007 | Gollner | 475/72 |
| 2009/0011887 A1 * | 1/2009 | Komada et al. | 475/5 |
| 2009/0170649 A1 * | 7/2009 | Murakami et al. | 475/5 |
| 2010/0216584 A1 * | 8/2010 | Lutoslawski | 475/5 |

FOREIGN PATENT DOCUMENTS

| | | |
|---|---|---|
| DE | 44 43 267 A1 | 6/1996 |
| DE | 693 03 995 T2 | 3/1997 |
| DE | 199 03 936 A1 | 5/2000 |
| EP | 0 101 358 | 2/1984 |
| EP | 0 577 282 | 1/1994 |
| EP | 0 716 248 | 6/1996 |
| JP | 49 10787 | 3/1974 |
| JP | 11 51150 | 2/1999 |
| JP | 2000 127774 | 5/2000 |
| JP | 2000 320644 | 11/2000 |
| JP | 2003 79005 | 3/2003 |
| JP | 2003 237393 | 8/2003 |
| JP | 2005 1564 | 1/2005 |
| JP | 2005 329813 | 12/2005 |
| SU | 1150106 A | 4/1985 |

* cited by examiner

FIG. 3

| | PM1 (9) | PM2 (6) | S SYNCHRO-NIZER (22) | 1ST SYNCHRO-NIZER (19) | 2ND SYNCHRO-NIZER (20) | R SYNCHRO-NIZER (21) |
|---|---|---|---|---|---|---|
| N | O | O | N | N | N | N |
| START | PUMP | MOTOR | LEFT | RIGHT | N | N |
| 1ST | LOCK | O | N(LEFT)⟨N⟩ | RIGHT | N | N |
| 1ST-2ND | MOTOR | PUMP | N | RIGHT | N(N)⟨RIGHT⟩ | N |
| 2ND | O | LOCK | N | N(RIGHT)⟨LEFT⟩ | RIGHT | N |
| 2D-3RD | PUMP | MOTOR | N | LEFT | RIGHT | N |
| 3RD | LOCK | O | N | LEFT | N(RIGHT)⟨LEFT⟩ | N |
| 3RD-4TH | MOTOR | PUMP | N | N(LEFT) | LEFT | N |
| 4TH | O | LOCK | N | N | LEFT | N |
| REV | PUMP | MOTOR | LEFT | N | N | LEFT |

FIG. 5

| | PM1 (9) | PM2 (6) | S SYNCHRO-NIZER (22) | 1ST SYNCHRO-NIZER (19) | 2ND SYNCHRO-NIZER (20) |
|---|---|---|---|---|---|
| N | O | O | N | N | N |
| START | PUMP | MOTOR | LEFT | RIGHT | N |
| 1ST | LOCK | O | N(LEFT)⟨RIGHT⟩ | RIGHT | N |
| 1ST-2ND | MOTOR | PUMP | RIGHT | RIGHT | N |
| 2ND | O | LOCK | RIGHT | N(RIGHT)⟨LEFT⟩ | N |
| 2D-3RD | PUMP | MOTOR | RIGHT | LEFT | N |
| 3RD | LOCK | O | N(RIGHT)⟨N⟩ | LEFT | N(N)⟨LEFT⟩ |
| 3RD-4TH | MOTOR | PUMP | N | LEFT | LEFT |
| 4TH | O | LOCK | N | N(LEFT) | LEFT |
| REV | PUMP | MOTOR | LEFT | N | RIGHT |

FIG. 8

| | PM1 (9) | PM2 (6) | S SYNCHRONIZER (22) | 1ST SYNCHRONIZER (19) | 2ND SYNCHRONIZER (20) |
|---|---|---|---|---|---|
| N | O | O | N | N | N |
| START | PUMP | MOTOR | LEFT | RIGHT | N |
| 1ST | LOCK | O | N(LEFT)⟨N⟩ | RIGHT | N(N)⟨LEFT⟩ |
| 1ST–2ND | MOTOR | PUMP | N | RIGHT | LEFT |
| 2ND | O | LOCK | N | N(RIGHT)⟨LEFT⟩ | LEFT |
| 2D–3RD | PUMP | MOTOR | N(N)⟨RIGHT⟩ | LEFT | LEFT |
| 3RD | LOCK | O | RIGHT | LEFT | N(LEFT)⟨N⟩ |
| 3RD–4TH | MOTOR | PUMP | RIGHT | LEFT | N |
| 4TH | O | LOCK | LEFT | N(LEFT) | N |
| REV | PUMP | MOTOR | LEFT | N | RIGHT |

FIG. 14

| | PM1 (107) | PM2 (109) | S SYNCHRO-NIZER (111) | 1ST SYNCHRO-NIZER (120) | 2ND SYNCHRO-NIZER (121) | 3RD SYNCHRO-NIZER (122) |
|---|---|---|---|---|---|---|
| N | O | O | N | N | N | N |
| START | PUMP | MOTOR | RIGHT | RIGHT | N | RIGHT |
| 1ST | LOCK | O | N(RIGHT)⟨LEFT⟩ | RIGHT | N | N(RIGHT)⟨RIGHT⟩ |
| 1ST-2ND | MOTOR | PUMP | LEFT | RIGHT | N | RIGHT |
| 2ND | O | LOCK | LEFT | N(RIGHT)⟨LEFT⟩ | N | RIGHT |
| 2D-3RD | PUMP | MOTOR | LEFT | LEFT | N | RIGHT |
| 3RD | LOCK | O | LEFT | LEFT | N(N)⟨LEFT⟩ | N(RIGHT)⟨N⟩ |
| 3RD-4TH | MOTOR | PUMP | LEFT | N(LEFT) | LEFT | N |
| 4TH | O | LOCK | LEFT | N | LEFT | N |
| REV | PUMP | MOTOR | RIGHT | N | RIGHT | RIGHT |

FIG. 16

| | PM1 (107) | PM2 (109) | S SYNCHRONIZER (111) | 2ND SYNCHRONIZER (127) | 3RD SYNCHRONIZER (128) | 1ST SYNCHRONIZER (126) |
|---|---|---|---|---|---|---|
| N | O | O | N | N | N | N |
| START | PUMP | MOTOR | RIGHT | RIGHT | LEFT | N |
| 1ST | LOCK | O | N(RIGHT)⟨LEFT⟩ | RIGHT | N(LEFT)⟨LEFT⟩ | N |
| 1ST-2ND | MOTOR | PUMP | LEFT | RIGHT | LEFT | N |
| 2ND | O | LOCK | LEFT | N(RIGHT)⟨LEFT⟩ | LEFT | N |
| 2D-3RD | PUMP | MOTOR | LEFT | LEFT | LEFT | N |
| 3RD | LOCK | O | LEFT | LEFT | N(LEFT)⟨RIGHT⟩ | N |
| 3RD-4TH | MOTOR | PUMP | LEFT | N(LEFT) | RIGHT | N |
| 4TH | O | LOCK | LEFT | N | RIGHT | N |
| REV | PUMP | MOTOR | RIGHT | N | LEFT | LEFT |

FIG. 18

| | PM1 (107) | PM2 (109) | S SYNCHRONIZER (129) | 1ST SYNCHRONIZER (130) | 2ND SYNCHRONIZER (131) | 3RD SYNCHRONIZER (132) |
|---|---|---|---|---|---|---|
| N | O | O | N | N | N | N |
| START | MOTOR | PUMP | LEFT | RIGHT | LEFT | N |
| 1ST | O | LOCK | $N$(LEFT)⟨RIGHT⟩ | $N$(RIGHT)⟨RIGHT⟩ | LEFT | N |
| 1ST-2ND | PUMP | MOTOR | RIGHT | RIGHT | LEFT | N |
| 2ND | LOCK | O | RIGHT | RIGHT | $N$(LEFT)⟨N⟩ | $N$(RIGHT) |
| 2D-3RD | MOTOR | PUMP | RIGHT | RIGHT | N | RIGHT |
| 3RD | O | LOCK | RIGHT | $N$(RIGHT)⟨LEFT⟩ | N | RIGHT |
| 3RD-4TH | PUMP | MOTOR | RIGHT | LEFT | N | RIGHT |
| 4TH | LOCK | O | RIGHT | LEFT | N | $N$(RIGHT) |
| REV | MOTOR | PUMP | LEFT | RIGHT | RIGHT | N |

FIG. 20

|  | PM1 (107) | PM2 (109) | S SYNCHRONIZER (133) | 1ST SYNCHRONIZER (134) | 2ND SYNCHRONIZER (135) | 3RD SYNCHRONIZER (136) |
|---|---|---|---|---|---|---|
| N | O | O | N | N | N | N |
| START | MOTOR | PUMP | RIGHT | LEFT | N | RIGHT |
| 1ST | O | LOCK | N(RIGHT)⟨LEFT⟩ | N(LEFT)⟨LEFT⟩ | N | RIGHT |
| 1ST-2ND | PUMP | MOTOR | LEFT | LEFT | N | RIGHT |
| 2ND | LOCK | O | LEFT | LEFT | N | N(RIGHT)⟨LEFT⟩ |
| 2D-3RD | MOTOR | PUMP | LEFT | N(LEFT)⟨N⟩ | N | LEFT |
| 3RD | O | LOCK | LEFT | N | N(N)⟨RIGHT⟩ | LEFT |
| 3RD-4TH | PUMP | MOTOR | LEFT | N | RIGHT | LEFT |
| 4TH | LOCK | O | RIGHT | LEFT | RIGHT | N(LEFT) |
| REV | MOTOR | PUMP | RIGHT | LEFT | LEFT | N |

FIG. 22

|  | PM1 (107) | PM2 (109) | S SYNCHRO-NIZER (133) | 1ST SYNCHRO-NIZER (138) | 2ND SYNCHRO-NIZER (139) | 3RD SYNCHRO-NIZER (140) |
|---|---|---|---|---|---|---|
| N | O | O | N | N | N | N |
| START | MOTOR | PUMP | RIGHT | LEFT | N | LEFT |
| 1ST | O | LOCK | N(RIGHT)⟨LEFT⟩ | N(LEFT)⟨LEFT⟩ | N | LEFT |
| 1ST-2ND | PUMP | MOTOR | LEFT | LEFT | N | LEFT |
| 2ND | LOCK | O | LEFT | LEFT | N | N(LEFT)⟨RIGHT⟩ |
| 2D-3RD | MOTOR | PUMP | LEFT | N(LEFT)⟨N⟩ | N | RIGHT |
| 3RD | O | LOCK | LEFT | N | N(N)⟨RIGHT⟩ | RIGHT |
| 3RD-4TH | PUMP | MOTOR | LEFT | N | RIGHT | RIGHT |
| 4TH | LOCK | O | LEFT | LEFT | RIGHT | N(RIGHT) |
| REV | MOTOR | PUMP | RIGHT | LEFT | LEFT | N |

FIG. 24

| | PM1 (107) | PM2 (109) | S SYNCHRO-NIZER (141) | R SYNCHRO-NIZER (142) | 1ST SYNCHRO-NIZER (144) | 2ND SYNCHRO-NIZER (145) |
|---|---|---|---|---|---|---|
| N | O | O | N | N | N | N |
| START | MOTOR | PUMP | LEFT | N | RIGHT | LEFT |
| 1ST | O | LOCK | N(LEFT)⟨RIGHT⟩ | N | N(RIGHT)⟨RIGHT⟩ | LEFT |
| 1ST-2ND | PUMP | MOTOR | RIGHT | N | RIGHT | LEFT |
| 2ND | LOCK | O | RIGHT | N | RIGHT | N(LEFT)⟨RIGHT⟩ |
| 2D-3RD | MOTOR | PUMP | RIGHT | N | RIGHT | RIGHT |
| 3RD | O | LOCK | RIGHT | N | N(RIGHT)⟨LEFT⟩ | RIGHT |
| 3RD-4TH | PUMP | MOTOR | RIGHT | N | LEFT | RIGHT |
| 4TH | LOCK | O | LEFT | N | LEFT | N(RIGHT) |
| REV | MOTOR | PUMP | LEFT | RIGHT | RIGHT | N |

POWER SPLIT DUAL INPUT SHAFT TRANSMISSION FOR VEHICLE

CROSS-REFERENCE TO PRIORITY APPLICATIONS

The present application claims priority to JP2006-212513 filed on Aug. 3, 2006 and JP2006-212517 filed on Aug. 3, 2006, the entire contents of each of which are hereby incorporated herein by reference.

BACKGROUND OF THE INVENTION

1. Field of the Invention

The invention relates to a transmission for a vehicle which includes a plurality of drive transmission mechanisms, such as gear pairs and the like, in power transmission lines and which performs the shifting of the transmission speed ratio by changing the drive transmission mechanisms involved in the torque transmission. In particular, the invention relates to a transmission capable of using a combination of the power transmission by mechanical means, such as gear mechanisms or the like, and the power transmission via hydraulic pressure of pressure fluid or the like, or another form of energy, such as electric power or the like.

2. Description of the Related Art

An example of the foregoing type of transmission is described in Japanese Patent Application Publication No. 11-51150 (JP-A-11-51150). A transmission described in Japanese Patent Application Publication No. 11-51150 (JP-A-11-51150) is constructed of a mechanical transmission (MT) that switches the torque transmission path in a planetary gear mechanism in accordance with the states of engagement/release of a plurality of clutch mechanisms, and a hydrostatic transmission (HST) that transmits power by supplying pressure oil produced from a hydraulic pump to a hydraulic motor and that performs the shifting, and the two types of transmissions are disposed parallel to each other between an input member and an output member. In this transmission, the speed change ratio set by the mechanical transmission varies stepwise whereas the speed change ratio set by the hydrostatic transmission continuously vary. Therefore, the speed change ratio of the transmission as a whole can be continuously changed, and the transmission can be caused to function as a so-called continuously variable transmission.

Another example is described in Japanese Patent Application Publication No. 2000-320644 (JP-A-2000-320644). In a transmission described in Japanese Patent Application Publication No. 2000-320644 (JP-A-2000-320644), the power output by a motive power source is distributed and transmitted to a multi-step speed change device that is made up mainly of a plurality of gear pairs and a plurality of clutch mechanisms and to an HST (hydrostatic transmission). After the powers changed in speed by the multi-step speed change device and the HST are combined by a planetary gear mechanism, the power is output from the transmission. Therefore, in this transmission, the proportion between the power transmitted by the multi-step speed change device and the power transmitted by the HST is changed through the use of the HST, so that the speed change ratio as a whole can be continuously changed.

As described above, in the transmission described in Japanese Patent Application Publication No. 11-51150 (JP-A-11-51150), power is transmitted via the hydrostatic transmission, and the proportion of the power transmitted via the HST can be changed so as to steplessly change the speed change ratio of the transmission. However, for the transmission of power via fluid in that case, a pump is directly driven by power from the motive power source. Then, the thus-generated fluid pressure is sent to a motor to drive the motor, and the power output by the motor is directly transmitted to the output side. Therefore, there is possibility that as the fluid pressure becomes higher in accordance with the torque transmitted, the power loss may relatively increase, and therefore the power transmission efficiency as a whole may not become sufficiently high.

This is also the case with the transmission described in Japanese Patent Application Publication No. 2000-320644 (JP-A-2000-320644). In the construction described in Japanese Patent Application Publication No. 2000-320644 (JP-A-2000-320644), since the multi-step speed change device and the HST are disposed substantially parallel to each other between the input member and the output member, there is possibility that the power transmission efficiency may not become sufficiently high due to increased power loss or the like when the power transmission via the HST is performed.

Furthermore, in either of the transmissions described in Japanese Patent Application Publication No. 11-51150 (JP-A-11-51150) and Japanese Patent Application Publication No. 2000-320644 (JP-A-2000-320644), clutches, such as multi-plate clutches or the like, are used as mechanisms for inputting power output by a motive power source, such as an engine or the like, to the transmission or for cutting off the power, and therefore power, such as oil pressure or the like, for the clutches is consumed. This may possibly become a factor that increases the power loss as a whole or degrades the power transmission efficiency.

SUMMARY OF THE INVENTION

The invention has been accomplished in view of the foregoing technical tasks, and provides a transmission capable of improving the power transmission efficiency and the vehicle fuel economy.

According to one aspect of the invention, there is provided a transmission for a vehicle which has at least two driving shafts to which power is selectively transmitted from a motive power source, a driven shaft to which power is transmitted from the driving shafts, a plurality of drive transmission mechanisms disposed between the driving shafts and the driven shaft, and a switching mechanism that selectively enables transmission of power between the driving shafts and the driven shaft via the drive transmission mechanisms, the transmission being characterized in that the driving shafts are disposed concentrically and fitted to each other so as to be rotatable relative to each other, and the driving shafts and the driven shaft are disposed on axes that are parallel to each other, and that a first drive unit able to output a portion of the power transmitted from the motive power source to one of the driving shafts and output another portion of the power after changing the another portion of the power in energy form and also able to change a proportion between the power output to the one of the driving shafts and the power output after being changed in energy form is disposed on the same axis as one of the axis of the driving shafts and the axis of the driven shaft, and that a second drive unit able to output a portion of the power transmitted from the motive power source to another one of the driving shafts and output another portion of the power changing the another portion of the power in energy form and also able to change a proportion between the power output to the another one of the driving shafts and the power output after being changed in energy form is disposed on the same axis as another one of the axis of the driving shafts and the axis of the driven shaft, and that the first drive unit and the second drive unit are interconnected so as to be able to send and receive powers changed in energy form to and from each other.

According to the transmission for a vehicle described above, the power output by the motive power source is transmitted to the drive units, and power is transmitted from one of the drive units to one of the driving shafts, and then power is transmitted to the driven shaft via one or more of the drive transmission mechanisms in accordance with the state of operation of the switching mechanism. In that case, if only one of the drive units is in such a state as to output the input power directly to one of the driving shafts, the speed change ratio determined by the drive transmission mechanism that is linked to that drive unit and is in the state of being able to transmit power is set. On the other hand, if in any of the drive units, a portion of the input power is converted in energy form and then is transmitted to another drive unit, power is transmitted from the another drive unit to the driving shaft linked thereto, and then, from that driving shaft, power is transmitted to the driven shaft via a predetermined switching mechanism.

Thus, the transmission of power involving the energy form conversion is performed in parallel or simultaneously, and the power transmitted while being converted in energy form can be continuously changed. Therefore, the speed change ratio of the transmission as a whole is continuously changed. That is, the stepless or continuously variable speed change becomes possible. In that case, the transmission of power involving the energy form conversion is for the purpose of distributing the power input from the motive power source to a plurality of power transmission lines that extend along the driving shafts. Therefore, the torque for transmitting power involving the energy form conversion can be reduced, so that the power loss can be prevented or reduced and the power transmission efficiency as a whole can be improved.

In the above-described transmission for the vehicle, it is preferable that each of the first drive unit and the second drive unit include a differential mechanism that performs a differential operation by three elements that are an input element to which power is transmitted from the motive power source, an output element that outputs power to one of the driving shafts, and a reaction element, and a motor that is driven to generate energy and is supplied with energy to output power and that is variable in a capacity of generating energy and a capacity of outputting power, and that in each of the first drive unit and the second drive unit, the motor be linked to the reaction element.

According to the transmission for a vehicle described above, each drive unit transmits power to one of the driving shafts due to reaction force given by the motor, and also outputs power after changing the energy form thereof. Therefore, although the load on the motor is relatively small, large power can be transmitted by each drive unit. Therefore, the drive units and the whole construction of the transmission can be reduced in size, and the power transmission efficiency can be improved.

Furthermore, in the foregoing transmission for a vehicle, it is also preferable that the transmission further include a direct-coupling switching mechanism that selectively directly couples the driven shaft and the motor of one of the drive units disposed on the same axis as the driven shaft, and a vehicle start control device that sets the direct-coupling switching mechanism and another one of the switching mechanisms into an engaged sate.

Furthermore, in the foregoing transmission for a vehicle, it is also preferable that the another one of the switching mechanisms be either one of a drive transmission mechanism that enables torque transmission via a drive transmission mechanism that sets a greatest speed change ratio in a forward travel direction among the plurality of power transmission mechanisms, and a drive transmission mechanism that transmits power in such a direction that the vehicle travels in a reverse direction.

According to the transmission for a vehicle described above, when the vehicle starts, the transmission of power via one or more of the switching mechanisms and one or more of the drive transmission mechanisms, and the power transmission accomplished by the transmission of power between the motors can be performed. Therefore, the drive torque at the time of starting the vehicle can be made sufficiently large.

In the foregoing transmission for a vehicle, it is also preferable that the drive transmission mechanisms include a first-speed drive transmission mechanism that transmits power when the vehicle starts in a forward travel direction, and another forward-speed drive transmission mechanism whose speed change ratio is smaller than the speed change ratio of the first-speed drive transmission mechanism, and that the direct-coupling switching mechanism be able to switch the another forward-speed drive transmission mechanism into a torque transmission-capable state while linkage between the driven shaft and the motor of the one of the drive units disposed coaxially with the driven shaft is released.

According to the transmission for a vehicle described above, in addition to substantially the same effects as achieved by the foregoing constructions of the transmission for a vehicle, the shift operation characteristic can be improved since the state of linkage for the starting of the vehicle and the state of linkage for other manners of forward travel of the vehicle can be switched.

Furthermore, in the foregoing transmission for a vehicle, it is also preferable that the another forward-speed drive transmission mechanism be a drive transmission mechanism that sets a speed change ratio that is subsequently smaller than the speed change ratio of the first-speed drive transmission mechanism.

Furthermore, in the foregoing transmission for a vehicle, it is also preferable that the another forward-speed drive transmission mechanism be another drive transmission mechanism linked to one of the driving shafts to which a second-speed drive transmission mechanism whose speed change ratio is subsequently smaller than the speed change ratio of the first-speed drive transmission mechanism is linked.

According to the transmission for a vehicle described above, after the vehicle starts, the switch from the state of torque transmission by the first-speed drive transmission mechanism to the state of the next speed change step (next gear speed) whose speed change ratio is smaller than the speed change ratio determined by the first-speed drive transmission mechanism can be carried out by a flow of action of the direct-coupling switching mechanism. Thus, quick shifting can be performed, and the control of the shifting becomes easy.

Furthermore, in the foregoing transmission for a vehicle, it is also preferable that the drive transmission mechanisms include at least one reverse-speed drive transmission mechanism that transmits power to cause the vehicle to travel reversely, and that the switching mechanism include a mechanism which selectively causes a drive transmission mechanism provided between one of the driving shafts and the driven shaft and another drive transmission mechanism provided between another one of the driving shafts and the driven shaft to be capable of torque transmission and which sets both the drive transmission mechanism and the another drive transmission mechanism into such a state as not to transmit torque, and that the drive transmission mechanisms set into a torque transmission-capable state by the mechanism include the reverse-speed drive transmission mechanism.

According to the transmission for a vehicle described above, the reverse-speed drive transmission mechanism and another drive transmission mechanism for forward travel can be selectively set into the power transmission-capable state by one switching mechanism. Therefore, the switching mechanisms or actuators for driving the switching mechanisms can be reduced in number, and the construction of the transmission as a whole can be reduced in size.

Furthermore, in the foregoing transmission for a vehicle, it is also preferable that the at least two driving shafts include a first driving shaft and a second driving shaft, and that a first differential mechanism having an input element to which power is input from the motive power source, an output element linked to the first driving shaft, and a reaction element be disposed on the same axis as the first driving shaft and the second driving shaft, and that a first motor that is capable of recovering energy and outputting drive force and that is variable in an energy recovery capacity and an output capacity be linked to the reaction element of the first differential mechanism, and that a second differential mechanism having an input element to which power is input from the motive power source, an output element linked to the second driving shaft, and a reaction element be disposed on an axis that is parallel to the first driving shaft and the second driving shaft, and that a second motor that is capable of recovering energy and outputting drive force and that is variable in an energy recovery capacity and an output capacity be linked to the reaction element of the second differential mechanism, and that a vehicle-start switching mechanism be provided which selectively causes a path between the motive power source and the input element of one differential mechanism of the first differential mechanism and the second differential mechanism to be capable of torque transmission, and which selectively restricts rotation of the input element of the one differential mechanism by linking the one differential mechanism to a stationary member.

According to the transmission for a vehicle described above, since power output by the motive power source is input to the input element of each differential mechanism, power is output from the output element of each differential mechanism in accordance with the reaction force given to the reaction element of the mechanism from a corresponding one of the motors. For example, if one of the motors outputs torque so as to fix the reaction element and another motor freely rotates, power output by the motive power source is transmitted to one of the driving shafts via the differential mechanism having the reaction element fixed. Then, a predetermined drive transmission mechanism between that driving shaft and the driven shaft is caused to be in the torque transmission-capable state by one of the switching mechanisms, so that power is transmitted to the driven shaft via the predetermined drive transmission mechanism. As a result, the speed change ratio in accordance with the rotation speed ratio determined by the drive transmission mechanism is set. On another hand, if one of the motors rotates and gives reaction force to the reaction element, the energy of a portion of the power output by the motive power source is recovered by that motor. The thus-recovered energy is supplied to another motor, and the another motor outputs power, so that power is transmitted to another driving shaft via the differential mechanism to which the another motor is linked. That is, the mechanical transmission of power and the transmission of power involving energy conversion occur, and power is transmitted to the driven shaft via two driving shafts and drive transmission mechanisms. In that case, due to the differential operation of each differential mechanism, the proportion between the powers transmitted via the power transmission lines continuously changes, so that the speed change ratio of the transmission as a whole continuously changes. Thus, the stepless or continuously variable speed change becomes possible.

Furthermore, in the foregoing transmission for a vehicle, it is also preferable that one differential mechanism of the first differential mechanism and the second differential mechanism be constructed so that the one differential mechanism operates as a speed-reducing mechanism if power is input to the reaction element of the one differential mechanism from the first motor or the second motor while the input element of the one differential mechanism is linked to the stationary member by the vehicle-start switching mechanism so that rotation of the input element is restricted.

According to the transmission for a vehicle described above, by fixing the input element of one of the first and second differential mechanisms, the output torque of the first motor or the second motor input to the reaction element of that differential mechanism can be reduced in rotation speed, that is, the output torque of the first motor or the second motor can be amplified, and then the amplified torque can be transmitted to the first driving shaft or the second driving shaft.

Furthermore, in the foregoing transmission for a vehicle, it is also preferable that one differential mechanism of the first differential mechanism and the second differential mechanism be constructed of a single-pinion type planetary gear mechanism that has a sun gear, a ring gear disposed concentrically with the sun gear, and a carrier holding pinions that are in mesh with the sun gear and the ring gear, and that the ring gear form an input element of the one differential mechanism to which power is input from the motive power source, and that the carrier form an output element of the one differential mechanism that is linked to the first driving shaft or the second driving shaft, and that the sun gear form a reaction element of the one differential mechanism that is linked to the first motor or the second motor.

According to the transmission for a vehicle described above, by fixing the ring gear serving as an input element in one of the differential mechanisms which is constructed of a single-pinion type planetary gear mechanism, the rotation speed of the carrier serving as an output element in the one of the differential mechanisms is reduced relative to the rotation speed of the sun gear serving as a reaction element in the one of the differential mechanisms. That is, the output torque of the first motor or the second motor input to the sun gear of the one of the differential mechanisms can be amplified, and can be transmitted to the first driving shaft or the second driving shaft via the carrier of the one of the differential mechanisms.

Furthermore, in the foregoing transmission for a vehicle, it is also preferable that the drive transmission mechanisms include a plurality of mechanisms that are capable of setting a plurality of speed change ratios for the vehicle's traveling, and that the vehicle-start switching mechanism be constructed so that when there is a request for increasing the drive torque at the time of start of the vehicle, the vehicle-start switching mechanism interlinks the stationary member and the input element of the one differential mechanism of the first differential mechanism and the second differential mechanism, and causes a path between the input element of the one differential mechanism and the motive power source to be in a state of being incapable of torque transmission, and so that when there is not a drive torque increase request, the vehicle-start switching mechanism releases linkage between the stationary member and the input element of the one differential mechanism and allows rotation of the input element of the one differential mechanism, and causes a path between input element of the one differential mechanism and the motive power source to be in a state of being capable of torque transmission, or causes the input element of the one differential mechanism to be in a state in which the input element of the one differential mechanism is not linked to any member.

According to the transmission for a vehicle described above, in the case where large drive force is needed at the time of start of the vehicle in the forward or reverse direction, the vehicle-start switching mechanism is caused to fix the input element of the one of the first and second differential mechanisms and to set the path between the input element and the motive power source into a torque transmission-incapable state, so that the output torque of the first motor or the second motor can be amplified, and can be transmitted to the first driving shaft or the second driving shaft. Thus, at the time of starting the vehicle, the drive force can be made sufficiently large.

Furthermore, in the foregoing transmission for a vehicle, it is also preferable that the first motor be disposed on the same axis as the first differential mechanism and the first driving shaft as well as the second driving shaft, and that the second motor be disposed on the same axis as the second differential mechanism, and be disposed radially outwardly adjacent to an outside of the first motor.

According to the transmission for a vehicle describe above, since the first motor and the second motor are disposed adjacent to each other, the construction for sending and receiving energy between the two motors is simplified, and furthermore, the two motors can be combined into a single unit to improve the efficiency or ease of the production and assembly of the transmission.

Furthermore, in the foregoing transmission for a vehicle, it is also preferable that the motors include variable capacity type fluid pressure pump motors that are variable in displacement volume, and that the variable capacity type fluid pressure pump motors in the drive units be interconnected so as to be able to send and receive fluid pressures to and from each other.

According to the transmission for a vehicle described above, by changing the displacement volume of a fluid pressure pump motor, the power transmitted via the drive unit can be controlled. Therefore, the control is easy, and the power loss can be restrained to improve the power transmission efficiency and the fuel economy of the vehicle.

Furthermore, in the foregoing transmission for a vehicle, it is also preferable that the variable capacity type fluid pressure pump motors include a two-way swing type fluid pressure pump motor whose displacement volume is changeable in both positive and negative directions.

According to the transmission for a vehicle described above, since the displacement volume of one of the fluid pressure pump motors can be set to a direction opposite to the direction of the displacement volume set for the case of forward travel of the vehicle, the construction and the control for reverse travel become simple and easy.

Furthermore, in the foregoing transmission for a vehicle, it is also preferable that the motors include a motor-generator that has a function of an electric generator and a function of an electric motor.

According to the transmission for a vehicle described above, since the shift control can be electrically performed, the control becomes easy.

BRIEF DESCRIPTION OF THE DRAWINGS

The features, advantages thereof, and technical and industrial significance of this invention will be better understood by reading the following detailed description of preferred embodiments of the invention, when considered in connection with the accompanying drawings, in which:

FIG. 3 is a table collectively showing the states of operation of the hydraulic pump motors and synchronizers for setting speed change ratios;

FIG. 5 is a table collectively showing the states of operation of hydraulic pump motors and synchronizers for setting speed change ratios in the transmission having a construction shown in FIG. 4;

FIG. 8 is a table collectively showing the states of operation of hydraulic pump motors and synchronizers for setting speed change ratios in the transmission having a constitution shown in FIG. 7;

FIG. 14 is a table collectively showing the states of operation of the hydraulic pump motors and synchronizers for setting speed change ratios in the construction example of the transmission for a vehicle in accordance with the sixth embodiment shown in FIG. 12;

FIG. 16 is a table collectively showing the states of operation of hydraulic pump motors and synchronizers for setting speed change ratios in the construction example of the transmission for a vehicle in accordance with of the seventh embodiment shown in FIG. 15;

FIG. 18 is a table collectively showing the states of operation of hydraulic pump motors and synchronizers for setting speed change ratios in the construction example of the transmission for a vehicle in accordance with ninth embodiment shown in FIG. 17;

FIG. 20 is a table collectively showing the states of operation of hydraulic pump motors and synchronizers for setting speed change ratios in the construction example of the transmission for a vehicle in accordance with the tenth embodiment shown in FIG. 19;

FIG. 22 is a table collectively showing the states of operation of hydraulic pump motors and synchronizers for setting speed change ratios in the construction example of the transmission for a vehicle in accordance with the eleventh embodiment shown FIG. 21;

FIG. 24 is a table collectively showing the states of operation of hydraulic pump motors and synchronizers for setting speed change ratios in the construction example of the transmission in accordance with the twelfth embodiment shown in FIG. 23.

DETAILED DESCRIPTION OF THE PREFERRED EMBODIMENTS

Figure 1:
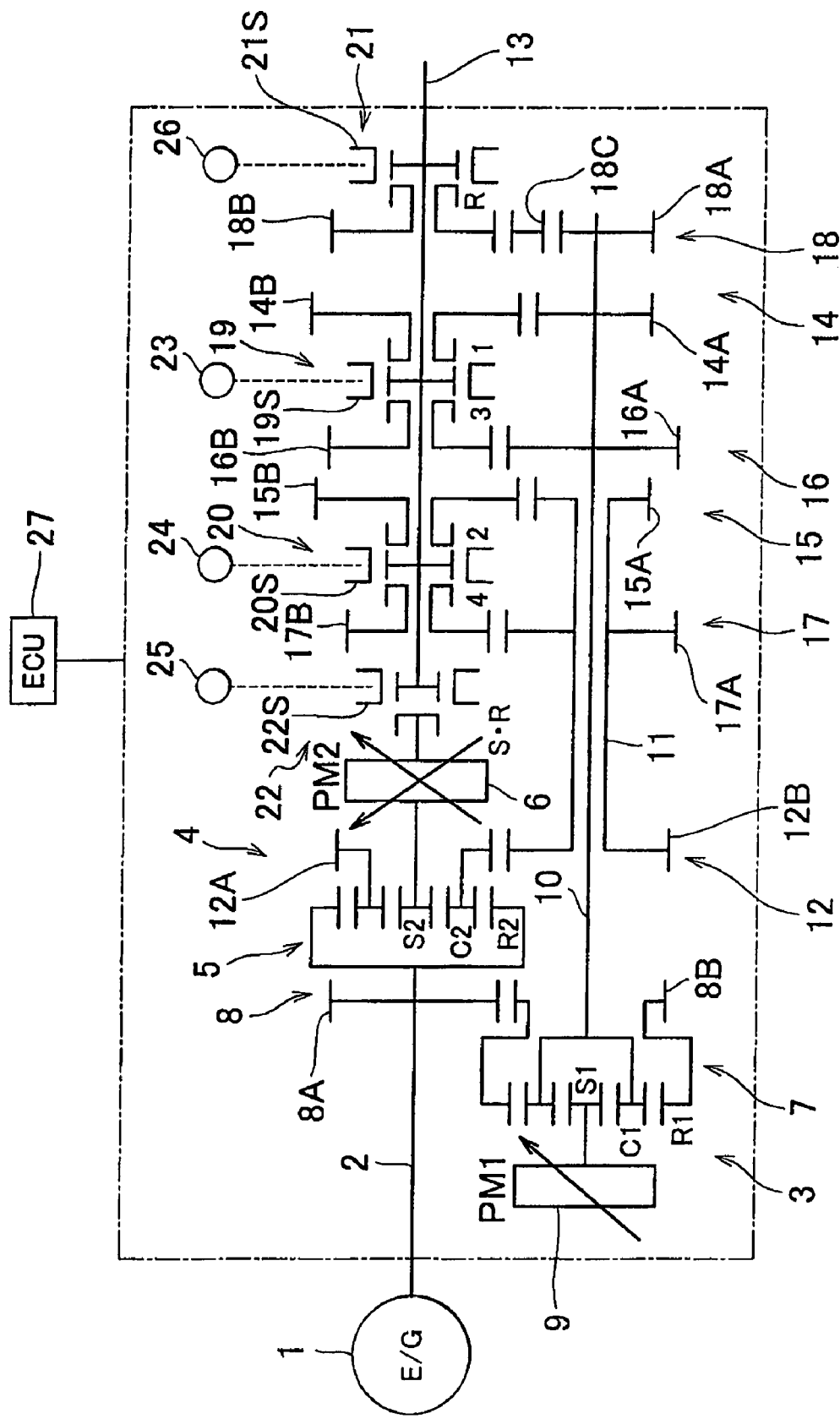
FIG. 1 is a schematic skeleton diagram showing a construction example of a transmission for a vehicle in accordance with a first embodiment of the invention.

In the following description and the accompanying drawings, the present invention will be described in more detail with reference to exemplary embodiments. Firstly, a construction example of a vehicle transmission of a first embodiment of the invention will be described with reference to FIG. 1. The example shown in FIG. 1 is a construction example in which four forward gear speeds and one reverse gear speed are set as so-called fixed speed change ratios that can be set without alteration in the form of power (energy) to be transmitted, and in particular a construction example that is adapted to an FR vehicle (a front engine, rear wheel drive vehicle) in which a motive power source 1, such as an engine or the like, is mounted in the longitudinal direction of the vehicle. Specifically, the drive units 3, 4 are disposed respectively on two axes, that is, an axis that is the same as the axis of an input member 2 linked to the motive power source 1, and an axis parallel to that axis. It is to be noted herein that the motive power source 1 may be a prevalent motive power source used in vehicles, such as an internal combustion engine, an electric motor, a construction in which an engine and a motor are combined, etc. In addition, in the description below, the motive power source 1 will be provisionally termed the engine 1. Besides, it suffices that the input member 2 be a member capable of transmitting the power output by the engine 1. For example, the input member 2 may be a drive plate, an input shaft, or the like. In the description below, the input member 2 will be termed the input shaft 2. An appropriate drive transmission device, such as a damper, a clutch, a torque converter, etc., may be disposed between the engine 1 and the input shaft 2.

Each of the drive units 3, 4 is a kind of drive transmission device that directly outputs the input power, or that directly outputs a portion of the input power and converts the other power in energy form before outputting it, and that freely rotates without performing the transmission of power. In an example shown in FIG. 1, each drive unit 3, 4 is constructed of a differential mechanism and a reaction force mechanism that applies reaction force to the differential mechanism and is able to vary the reaction force. Briefly, as for the differential mechanism, a mechanism suffices which carries out differential operation via three rotating elements. The differential mechanism may be a mechanism that has gears and rollers as rotating elements. Examples of the gear type differential mechanism that can be used as the differential mechanism herein include a single-pinion type planetary gear mechanism, and a double-pinion type planetary gear mechanism. Besides, as for the reaction force mechanism, a mechanism suffices which is capable of selectively outputting torque, and it is possible to use a fluid type pump motor, such as a hydraulic pump motor or the like, an electric motor-generator that electrically operates, etc.

In the example shown in FIG. 1, each of the drive units 3, 4 is constructed by a single-pinion type planetary gear mechanism and a variable capacity type hydraulic pump motor. In the description below, the drive unit coaxial with the engine 1 will be provisionally termed the second drive unit 4, and the drive unit disposed parallel thereto will be provisionally termed the first drive unit 3. (Herein, the unit represented by the reference character 3 may be named first drive unit, and the drive unit disposed parallel thereto may be named second drive unit 4). A planetary gear mechanism 5 in the second drive unit 4 is of a single-pinion type having, as rotating elements, a sun gear S2 that is an externally toothed gear, a ring gear R2 that is an internally toothed gear disposed concentrically with the sun gear S2, and a carrier C2 that retains pinions meshing with the sun gear S2 and the ring gear R2 in such a manner that the pinions are freely rotatable about their own axes and are also freely revolvable. The input shaft 2 is linked to the ring gear R2. Therefore, the ring gear R2 is an input element. Besides, a hydraulic pump motor 6 as a reaction force mechanism is connected to the sun gear S2. That is, the sun gear S2 is a reaction element.

This hydraulic pump motor 6 is of a variable capacity type whose displacement volume can be varied, and in particular, of a so-called two-way swing type whose displacement volume can be changed in both positive and negative directions from zero. The hydraulic pump motor 6 is disposed at a side of the planetary gear mechanism 5 opposite from the input shaft 2, and coaxially with the planetary gear mechanism 5 and the input shaft 2. As the hydraulic pump motor 6 of this kind, various types of pump motors can be adopted. For example, a swash plate pump, an oblique shaft pump, a radial piston pump, etc. can be used.

A planetary gear mechanism 7 in the first drive unit 3 has substantially the same construction as the planetary gear mechanism 5 of the second drive unit 4. That is, the planetary gear mechanism 7 is a single-pinion type planetary gear mechanism which has, as rotating elements, a sun gear S1, a ring gear R1, and a carrier C1 that retains pinions freely rotatably and revolvably, and which performs differential operation via these three rotating elements. The ring gear R1 acts as an input element, and the sun gear S1 acts as a reaction element, and the carrier C1 acts as an output element. Specifically, a counter driving gear 8A is mounted to the input shaft 2, and a counter driven gear 8B meshing with the counter driving gear 8A is linked to the ring gear R1 of the planetary gear mechanism (hereinafter, referred to as "the first planetary gear mechanism") 7 of the first drive unit 3. In addition, this first planetary gear mechanism 7 and the planetary gear mechanism (hereinafter, referred to as "the second planetary gear mechanism") 5 of the second drive unit 4 are disposed with a dislocation from each other in the direction of the axis, so that they do not overlap with each other in radial directions. The counter gear pair (hereinafter, provisionally referred to as "the first counter gear pair") 8 made up of the counter driving gear 8A and the counter driven gear 8B constitutes a so-called input drive transmission mechanism. The counter gear pair 8 may be replaced with a drive transmission mechanism that utilizes a friction wheel, or a wrapped-around drive transmission mechanism that uses a chain, a belt or the like.

Furthermore, a hydraulic pump motor 9 as a reaction force mechanism is connected to the sun gear S1 of the first planetary gear mechanism 7. The hydraulic pump motor 9 is of a variable capacity type whose displacement volume can be varied. In the example shown in FIG. 1, the hydraulic pump motor 9 is of a so-called one-way swing type whose displacement volume can be changed in one of the positive and negative directions from zero, and is disposed at an engine 1 side of the planetary gear mechanism 7 (the left side thereof in FIG. 1), and coaxially with the planetary gear mechanism 7. As for the hydraulic pump motor 9, similar to the hydraulic pump motor 6, it is possible to use a swash plate pump, an oblique pump, a radial piston pump, etc. Incidentally, in the description below, the hydraulic pump motor 9 of the first drive unit 3 will sometimes be referred to as "the first pump motor 9", and also as "PM 1" in the drawings, and the hydraulic pump motor 6 of the second drive unit 4 will sometimes be referred to as "the second pump motor 6", and also as "PM2" in the drawings.

Two driving shafts, that is, a first driving shaft 10 and a second driving shaft 11, are disposed coaxially with the first planetary gear mechanism 7 and the first pump motor 9 that constitute the first drive unit 3. One of the driving shafts, for example, the second driving shaft 11, has a hollow structure, and is fitted to an outer periphery of the first driving shaft 10 so that the two driving shafts are freely rotatable to each other. These driving shafts 10, 11 are disposed at a side of the first planetary gear mechanism 7 which is opposite from the first pump motor 9 in the direction of the axis. The first driving shaft 10 is linked to the carrier C1 of the first planetary gear mechanism 7, and the second driving shaft 11 is linked to the carrier C2 of the second planetary gear mechanism 5 so that torque can be transmitted. Thus, the carrier C2 is an output element. Specifically, a counter driving gear 12A is linked to the carrier C2, and a counter driven gear 12B meshing with the counter driving gear 12A is mounted to the second driving shaft 11. A counter gear pair (hereinafter, provisionally referred to as "second counter gear pair") 12 made up of the counter driving gear 12A and the counter driven gear 12B constitutes a so-called output drive transmission mechanism. The counter gear pair 12 may be replaced with a drive transmission mechanism that utilizes a friction wheel, or a wrapped-around drive transmission mechanism that uses a chain, a belt or the like. Therefore, since the driving shafts, the driven shaft and the drive units are disposed on two parallel axes, the outside diameter of the construction can be reduced to improve the vehicle mountability and particularly improve the vehicle mountability in the case where the construction is disposed in the longitudinal direction of the vehicle. In addition, a side reduction can be achieved.

A driven shaft 13 to which power is transmitted from the driving shafts 10, 11 is disposed coaxially with the input shaft 2 and the second drive unit 4 so that the driven shaft 13 is parallel to the driving shafts 10, 11. Therefore, the transmission shown in FIG. 1 has a so-called two-axis structure. A plurality of drive transmission mechanisms for setting different speed change ratios are provided between the driving shafts 10, 11 and the driven shaft 13. Each of the drive transmission mechanisms is provided for setting a speed change ratio between the input shaft 2 and the driven shaft 13 in accordance with its rotation speed ratio when involved in the transmission of torque, and may be a gear mechanism, a wrapped-around drive transmission mechanism, a mechanism that uses a friction wheel, etc. In the example shown in FIG. 1, four gear pairs 14, 15, 16, 17 for forward travel, and a gear pair 18 for reverse travel are provided.

The first driving shaft 10 is protruded from an end portion of the hollow structural second driving shaft 11, and to the protruded portion, a first-speed drive gear 14A, a third-speed drive gear 16A and a reverse drive gear 18A are mounted. The sequence of arrangement thereof is the reverse drive gear 18A, the first-speed drive gear 14A and the third-speed drive gear 16A from the distal end (the right-side end in FIG. 1) side of the first driving shaft 10. This is the descending order in the gear ratio (the ascending order in the pit circle radius, or the ascending order in the number of teeth). Due to this arrangement, the load on the bearing (not shown) supporting the distal end portion of the first driving shaft 10 is made relatively low, so that the bearing can be reduced in size. The second-speed drive gear 15A and the fourth-speed drive gear 17A are mounted to the second driving shaft 11 in that order from the distal end side (the right side in FIG. 1) of the second driving shaft 11. Thus, the drive gears of the odd-numbered speeds are mounted to one of the first and second driving shafts 10, 11, and the drive gears of the even-numbered speeds are mounted to the other driving shaft. In other words, the drive gears of the first speed and the third speed may be mounted to the first driving shaft 10, and the drive gears of the second speed and the fourth speed may be mounted to the second driving shaft 11.

Driven gears 14B, 15B, 16B, 17B, 18B of the gear pairs 14, 15, 16, 17, 18 are freely rotatably fitted to and supported on the driven shaft 13. Specifically, the first-speed driven gear 14B in mesh with the first-speed drive gear 14A is freely rotatably fitted to the driven shaft 13. The third-speed driven gear 16B in mesh with the third-speed drive gear 16A is freely rotatably fitted to the driven shaft 13, and is disposed adjacent to the first-speed driven gear 14B. The second-speed driven gear 15B in mesh with the second-speed drive gear 15A is freely rotatably fitted to the driven shaft 13, and is disposed adjacent to the third-speed driven gear 16B. The fourth-speed driven gear 17B in mesh with the fourth-speed drive gear 17A is freely rotatably fitted to the driven shaft 13, and is disposed adjacent to the second-speed driven gear 15B. On the other hand, the reverse driven gear 18B is freely rotatably fitted to the driven shaft 13. An idle gear 18C is disposed between the reverse driven gear 18B and the reverse drive gear 18A, so that the rotation direction of the reverse drive gear 18A and the rotation direction of the reverse driven gear 18B are the same. Therefore, the gear pairs 14, 15, 16, 17 of the first to fourth speeds correspond to a forward-speed drive transmission mechanism in the invention, and the reverse gear pair 18 corresponds to a reverse-speed drive transmission mechanism in the invention.

A switching mechanism for selectively causing these gear pairs 14, 15, 16, 17, 18 to be capable of power transmission is provided. This switching mechanism is a mechanism that selectively links an appropriately one of the gear pairs 14, 15, 16, 17, 18 to one of the driving shafts 10, 11 and the driven shaft 13. Therefore, the switching mechanism can employ synchronous link mechanisms (synchronizer) in related-art manual transmissions or the like, or mesh clutches (dog clutches), friction clutches, etc. Besides, if the driven gears are mounted integrally to the driven shaft 13, the drive gears may be provided so as to be freely rotatable relative to the driving shaft, and a switching mechanism may be provided on the driving shaft side so as to selectively link the driven gears to the driving shaft.

In the example shown in FIG. 1, a synchronous linkage mechanism is used as the switching mechanism. A first synchronizer 19 is disposed between the first-speed driven gear 14B and the third-speed driven gear 16B. A second synchronizer 20 is disposed between the second-speed driven gear 15B and the fourth-speed driven gear 17B. A reverse synchronizer (R synchronizer) 21 is disposed adjacent to the reverse driven gear 18B. In these synchronizers 19, 20, 21, similar to those used in related-art manual transmissions, a sleeve is spline-fitted to a hub integrated with the driven shaft 13, and each driven gear is provided with a chamfer or a spline formed integrally therewith to which the sleeve is gradually spline-fitted when the sleeve is moved in the direction of the axis. Furthermore, a ring is provided which gradually comes into friction contact with a predetermined member provided on the driven gear side so as to synchronize the rotation in accordance with the movement of the sleeve.

Therefore, the first synchronizer 19 is constructed as follows. That is, when a sleeve 19S is moved to the right side in FIG. 1, the first synchronizer 19 links the first-speed driven gear 14B to the driven shaft 13. When the sleeve 19S is moved to the left side in FIG. 1, the first synchronizer 19 links the third-speed driven gear 16B to the driven shaft 13. Furthermore, when positioned at the middle position, the sleeve 19S is not engaged with either of the driven gears 14B, 16B, that is, the first synchronizer 19 assumes a neutral state. Likewise, the second synchronizer 20 links the second-speed driven gear 15B to the driven shaft 13 when a sleeve 20S is move to the right side in FIG. 1. When the sleeve 20S is moved to the left side in FIG. 1, the second synchronizer 20 links the fourth-speed driven gear 17B to the driven shaft 13. Furthermore, when the sleeve 20S is positioned at the middle position, the sleeve 20S is not engaged with either of the driven gears 15B, 17B, that is, the second synchronizer 20 assumes a neutral state. Furthermore, the reverse synchronizer 21 links the reverse driven gear 18B to the driven shaft 13 when a sleeve 21S is moved to the left side in FIG. 1.

Furthermore, a switching mechanism that links the second pump motor 6 and the driven shaft 13 when the vehicle starts moving is provided. This switching mechanism is made up of a synchronous link mechanism (synchronizer), a meshing clutch (dog clutch), or a friction type clutch. In FIG. 1, a start synchronizer (S synchronizer) 22 made up of a synchronous link mechanism is illustrated. This start synchronizer 22 corresponds to a direct-coupling switching mechanism in the invention. The start synchronizer 22 includes a sleeve 22S that is spline-fitted to a hub integrated with the driven shaft 13. Corresponding to the sleeve 22S, a rotor shaft of the second pump motor 6 extends through the second pump motor 6, and an end portion of the rotor shaft has a spline that engages with the sleeve 22S. Therefore, when the sleeve 22S is moved to the left side in FIG. 1, the sleeve 22S is fitted to the spline of the rotor shaft, so that the rotor shaft and the driven shaft 13 are linked.

The sleeves 19S, 20S, 21S, 22S can be constructed so as to be caused to perform a switching action through a manual operation via a linkage arrangement (not shown), or can be constructed so as to be caused to perform a switching action through the use of actuators 23, 24, 26, 25 that are provided individually for the sleeves. Besides, an electronic control device (ECU) 27 is provided for electrically controlling the displacement volume of each of the pump motors 6, 9, or electrically controlling the actuators 23, 24, 26, 25. The electronic control device 27 is constructed mainly of a microcomputer, and performs computations in accordance with input data and pre-stored data and programs so as to set a displacement volume or to output a command signal for operating the synchronizers 19, 20, 21, 22.

Figure 2:
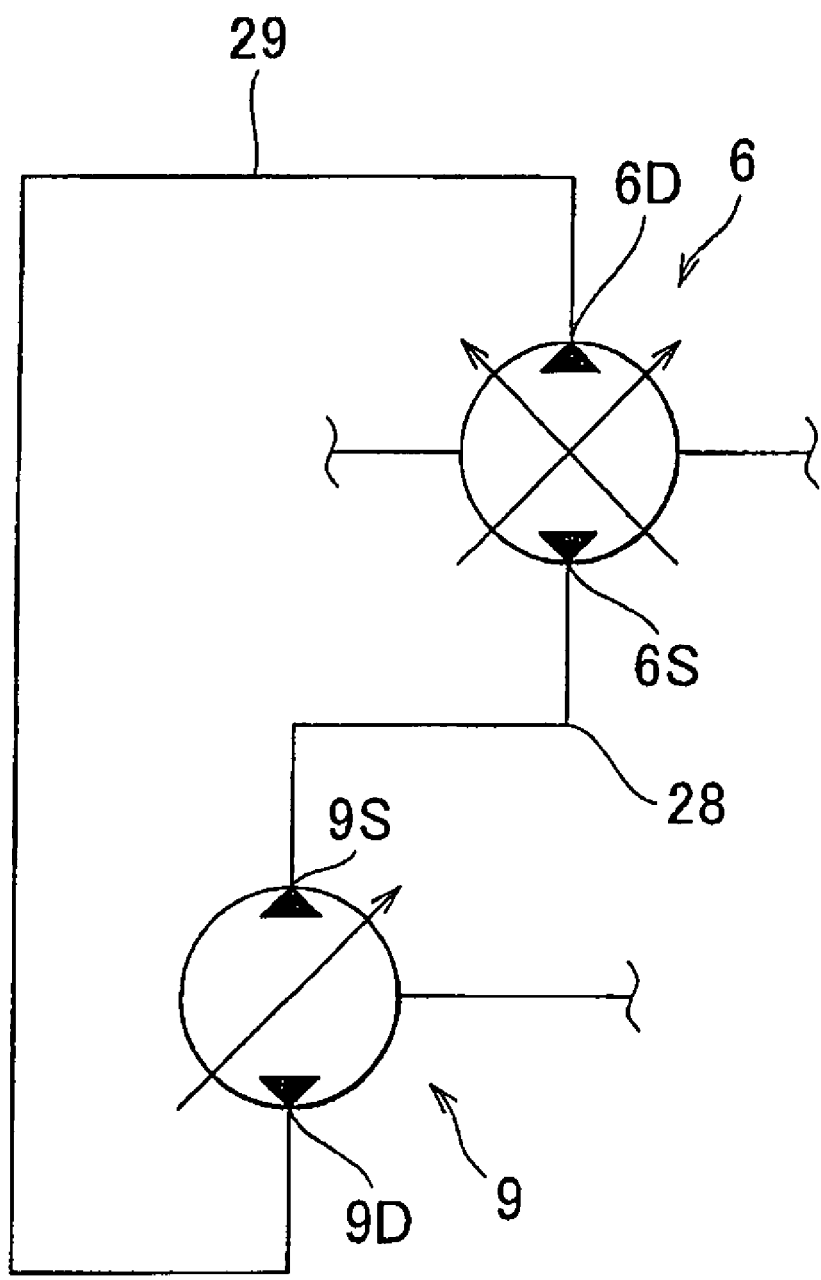
FIG. 2 is a schematic diagram for describing the states of communication of pump motors of the transmission shown in FIG. 1.

A hydraulic circuit regarding each of the pump motors 6, 9 will be briefly described. As shown in FIG. 2, the pump motors 6, 9 communicate with each other via a closed circuit. Specifically, input ports 6S, 9S of the pump motors 6, 9 are interconnected in communication by an oil passageway 28, and ejection ports 6D, 9D thereof are interconnected in communication by an oil passageway 29. The input port of each pump motor is a port that becomes relatively low in pressure when the displacement volume is set so as to give a reaction force to the planetary gear mechanism when the vehicle travels forward, and the port that becomes relatively high in pressure in that case is the ejection port. Incidentally, since inevitable leakage of pressure oil occurs, a charge pump (not shown) for replenishing the pressure oil may be connected to the foregoing closed circuit.

Next, operation of the foregoing transmission will be described. FIG. 3 is a table that collectively illustrates the states of operation of the hydraulic pump motors (PM1, PM2) 6, 9 and the synchronizers 19, 20, 21, 22 for the setting of each of the speed change steps (gear speeds) that are determined by the gear ratios of the corresponding gear pairs 14, 15, 16, 17, 18. In FIG. 3, "0" with regard to the hydraulic pump motors 6, 9 indicates a state in which the pump capacity (displacement volume) of the hydraulic pump motor is set substantially at zero, so that the hydraulic pump motor does not produce pressure oil even if the rotor shaft thereof is rotated, and so that the output shaft thereof does not rotate (is in a free state) even if the hydraulic pump motor is supplied with pressure oil, and "LOCK" indicates a state in which the rotor of the hydraulic pump motor is stopped so as not to rotate. Furthermore, "PUMP" indicates a state in which the pump capacity is set greater than substantial zero and pressure oil is being ejected, and therefore a corresponding one of the hydraulic pump motors 6, 9 functioning as a pump. Still further, "MOTOR" indicates a state in which the corresponding hydraulic pump motor 9 (or 6) is supplied with the pressure oil ejected by the other hydraulic pump motor 6 (or 9), and is functioning as a motor, and therefore is generating shaft torque.

Further, in FIG. 3, "RIGHT" and "LEFF" with regard to the synchronizers 19, 20, 21, 22 indicate the position, in FIG. 1, of the sleeve 19S, 20S, 21S, 22S of the corresponding one of the synchronizers 19, 20, 21, 22, and the round parentheses indicate the downshift stand-by state, and the angled parentheses indicate the stand-by state for an upshift, and "N" indicates a state in which the corresponding synchronizer 19, 20, 21, 22 is set to an OFF state (neutral position), and "N" in italic type indicates that the synchronizer is set to the OFF state (neutral position) in order to reduce the drag.

When the neutral position is selected and the neutral state is to be set, the displacement volume of each of the hydraulic pump motors 6, 9 is set at zero, and the synchronizers 19, 20, 21, 22 are set to the "OFF" state. That is, each of the sleeves 19S, 20S, 21S, 22S is set to its middle position. Therefore, the neutral state in which none of the gear pairs 14, 15, 16, 17, 18 are linked to the driven shaft 13 is assumed. As a result, the pump motors 6, 9 assume a so-called freewheeling state. Therefore, even if torque is transmitted from the engine 1 to the ring gears R2, R1 of the planetary gear mechanisms 5, 7, reaction force does not act on the sun gears S2, S1, so that torque is not transmitted to either of the driving shafts 10, 11 linked to the carriers C2, C1, which are output elements.

When the selector lever position is switched to a travel position, such as a drive position or the like, the sleeve 19S of the first synchronizer 19 is moved to the right side in FIG. 1, and the sleeve 22S of the start synchronizer 22 is moved to the left side in FIG. 1. Therefore, the first-speed driven gear 14B is linked to the driven shaft 13, and therefore the first driving shaft 10 and the driven shaft 13 are interlinked via the first-speed gear pair 14. Specifically, the state of linkage of the gear pairs becomes a state for setting the first speed. Besides, the rotor shaft (or the sun gear S2) of the second pump motor 6 is linked to the driven shaft 13.

In this state, since the vehicle is still at rest, the sun gear S2 of the second planetary gear mechanism 5 and the second pump motor 6 linked to the sun gear S2 are at rest, and the carrier C1 of the first planetary gear mechanism 7 is at rest, and therefore the sun gear S1 and the first pump motor 9 linked to the sun gear S1 are rotating in the direction opposite to the rotation direction of the ring gear R1. Therefore, if the displacement volume of each pump motor is gradually increased from zero, the first pump motor 9 firstly functions as a pump to generate oil pressure. In association with this, a reaction force acts on the sun gear S1 of the first planetary gear mechanism 7, so that the carrier C1 is provided with torque that rotates the carrier C1 in the same direction as the ring gear R1. In consequence, power is transmitted to the driven shaft 13 via the first-speed gear pair 14.

Since the first pump motor 9 is undergoing so-called reversed rotation to function as a pump, the first pump motor 9 ejects pressure oil from a suction port 9S thereof, and the pressure oil is supplied to a suction port 6S of the second pump motor 6. In consequence, the second pump motor 6 functions as a motor, and torque in the so-called normal rotation direction is transmitted from the rotor shaft of the second pump motor 6 to the driven shaft 13. Specifically, in the first drive unit 3, a portion of the power input from the engine 1 is transmitted via the first planetary gear mechanism 7 and the first-speed gear pair 14 to the driven shaft 13, and the other portion of the power is converted in energy form into the flowage of pressure oil. The flowage of pressure oil is transmitted to the second pump motor 6 of the second drive unit 4, so that power is transmitted from the second pump motor 6 to the driven shaft 13. Thus, at the time of starting the vehicle, the so-called mechanical power transmission and the power transmission via fluid are performed, and a power obtained by summing these powers is output to the driven shaft 13. Therefore, the driven shaft 13 acts as an output member or an output shaft.

In this state of power transmission, the torque that appears on the driven shaft 13 is greater than the torque that appears thereon where the power transmission is only the mechanical transmission via the first-speed gear pair 14, and therefore the speed change ratio of the transmission as a whole becomes greater than the so-called fixed speed change ratio that is determined by the first-speed gear pair 14. Besides, the speed change ratio changes in accordance with the proportion of the power transmission via fluid. Therefore, as the rotation speed of the sun gear S1 in the first planetary gear mechanism 7 and the first pump motor 9 linked to the sun gear S1 gradually approaches zero, the proportion of the power transmission via fluid declines, and the speed change ratio of the transmission as a whole approaches the fixed speed change ratio of the first speed. Then, by increasing the displacement volume of the first pump motor 9 to a maximum and then stopping the rotation of the first pump motor 9, the first speed as a fixed speed change ratio is established.

While this state is held, the displacement volume of the second pump motor 6 is set at zero, so that the second pump motor 6 freewheels. At the same time, the first pump motor 9 is locked, so that the rotation thereof stops. Specifically, the closed circuit connecting the pump motors 9, 6 in communication is closed or shut down by the second pump motor 6, so that the first pump motor 9 whose displacement volume has been maximized becomes unable to supply or eject pressure oil, and the rotation thereof stops. As a result, the sun gear S1 of the first planetary gear mechanism 7 receives a torque that stops the sun gear S1. Therefore, in the first planetary gear mechanism 7, power is input to the ring gear R1, with the sun gear S1 fixed. Therefore, the carrier C1 that is the output element is provided with torque that rotates the carrier C1 in the same direction as the ring gear R1, and the torque is transmitted to the driven shaft 13 as an output shaft via the first driving shaft 10 and the first-speed gear pair 14. Thus, the first speed as a fixed speed change ratio is set.

During the state of the first speed, if the start synchronizer 22 is set to the OFF state, that is, if the sleeve 22S is set at the neutral position, the second pump motor 6 is not passively rotated, so that the loss of power caused by the so called drag can be avoided. Furthermore, if in addition to this, the sleeve 20S of the second synchronizer 20 is moved to the right side in FIG. 1 to link the second-speed driven gear 15B to the driven shaft 13, a stand-by state for the upshift to the second speed as a fixed speed change ratio is obtained. On the other hand, if the sleeve 22S of the start synchronizer 22 is moved to the left side in FIG. 1 to link the driven shaft 13 to the second pump motor 6, a downshift stand-by state for setting a speed change ratio that is greater than the first speed is obtained.

During the stand-by state for the upshift from the first speed to the second speed, the second pump motor 6 and the sun gear S2 linked thereto are rotating in the direction opposite to the rotation direction of the ring gear R2. Therefore, if the displacement volume of the second pump motor 6 is increased in the positive direction, the second pump motor 6 comes to function as a pump, and reaction force associated therewith acts on the sun gear S2. As a result, the torque combining the torque input to the ring gear R2 and the reaction force that acts on the sun gear S2 acts on the carrier C2, so that the carrier C2 rotates in the normal direction and the rotation speed thereof gradually increases. In other words, the rotation speed of the engine 1 is gradually lowered.

The pressure oil produced by the second pump motor 6 functioning as a pump is supplied from its suction port 6S to the suction port 9S of the first pump motor 9. Hence, the first pump motor 9 functions as a motor, and outputs torque in the normal rotation direction. This torque acts on the sun gear S1 of the first planetary gear mechanism 7. Since power is being input to the ring gear R1 of the first planetary gear mechanism 7 from the engine 1, the torque caused by the input power and the torque that acts on the sun gear S1 are combined, and the combined torque is output from the carrier C1 to the first driving shaft 10. That is, the transmission of power via oil pressure occurs in parallel or simultaneously with the mechanical transmission of power, so that the power combining such powers is transmitted to the driven shaft 13. Then, as the rotation speed of the second pump motor 6 gradually declines, the proportion of the mechanical power transmission via the second planetary gear mechanism 5 and the second-speed gear pair 15, so that the speed change ratio of the transmission as a whole gradually declines from the speed change ratio determined by the first-speed gear pair 14 to the speed change ratio determined by the second-speed gear pair 15. In this case, the change is also a continuous variation as in the foregoing case where the speed change ratio varies to the first speed as a fixed speed change ratio after the vehicle has started. That is, the stepless or continuously variable speed change is accomplished. Then, by increasing the displacement volume of the second pump motor 6 to the maximum and then stopping the rotation thereof, the second speed as a fixed speed change ratio is established.

While this state is held, the displacement volume of the first pump motor 9 is set at zero, so that the first pump motor 9 freewheels. At the same time, the second pump motor 6 is locked, so that the rotation thereof stops. Specifically, the closed circuit connecting the pump motors 9, 6 in communication is closed or shut down by the first pump motor 9, so that the second pump motor 6 whose displacement volume has been maximized becomes unable to supply or eject pressure oil, and the rotation thereof stops. As a result, the sun gear S2 of the second planetary gear mechanism 5 receives a torque that fixes the sun gear S2. Therefore, in the second planetary gear mechanism 5, power is input to the ring gear R2, with the sun gear S2 fixed. Therefore, the carrier C2 that is the output element is provided with torque that rotates the carrier C2 in the same direction as the ring gear R2, and the torque is transmitted to the driven shaft 13 as an output shaft via the second counter gear pair 12, the second driving shaft 11 and the second-speed gear pair 15. Thus, the second speed as a fixed speed change ratio is set.

During the state of the second speed, if the first synchronizer 19 is set to the OFF state, that is, if the sleeve 19S thereof is set at the neutral position, the first pump motor 9 is not passively rotated, so that the loss of power caused by the so-called drag can be avoided. Furthermore, if the sleeve 19S of the first synchronizer 19 is moved to the left side in FIG. 1 to link the third-speed driven gear 16B to the driven shaft 13, a stand-by state for the upshift to the third speed as a fixed speed change ratio is obtained. On the other hand, if the sleeve 19S of the first synchronizer 19 is moved to the right side in FIG. 1 to link the first-speed driven gear 14B to the driven shaft 13, a stand-by state for the downshift to the first speed is obtained.

During the stand-by state for the upshift from the second speed to the third speed, the first pump motor 9 and the sun gear S1 linked thereto are rotating in the direction opposite to the rotation direction of the ring gear R1. Therefore, if the displacement volume of the first pump motor 9 is increased in the positive direction, the first pump motor 9 comes to function as a pump, and reaction force associated therewith acts on the sun gear S1. As a result, the torque combining the torque input to the ring gear R1 and the reaction force that acts on the sun gear S1 acts on the carrier C1, so that the carrier C1 rotates in the normal direction. In turn, the torque thereof is transmitted to the driven shaft 13 that is the output shaft, via the first driving shaft 10 and the third-speed gear pair 16. Besides, as the speed change ratio declines, the rotation speed of the engine 1 is gradually lowered.

The pressure oil produced by the first pump motor 9 functioning as a pump is supplied from its suction port 9S to the suction port 6S of the second pump motor 6. Hence, the second pump motor 6 functions as a motor to output torque in the normal rotation direction. This torque acts on the sun gear S2 of the second planetary gear mechanism 5. Since power is being input to the ring gear R2 of the second planetary gear mechanism 5 from the engine 1, the torque caused by the input power and the torque that acts on the sun gear S2 are combined, and the combined torque is output from the carrier C2 to the second driving shaft 11 via the second counter gear pair 12. That is, the transmission of power via oil pressure occurs in parallel or simultaneously with the mechanical transmission of power, so that the power combining such powers is transmitted to the driven shaft 13. Then, as the rotation speed of the first pump motor 9 gradually declines, the proportion of the mechanical power transmission via the first planetary gear mechanism 7 and the third-speed gear pair 16 gradually increases, so that the speed change ratio of the transmission as a whole gradually declines from the speed change ratio determined by the second-speed gear pair 15 to the speed change ratio determined by the third-speed gear pair 16. In this case, the change is also a continuous variation as in the foregoing case where the speed change ratio varies to the first speed as a fixed speed change ratio after the vehicle has started, or the case of the upshift from the first speed to the second speed. That is, the stepless or continuously variable speed change is accomplished. Then, by increasing the displacement volume of the first pump motor 9 to the maximum and then stopping the rotation thereof, the third speed as a fixed speed change ratio is established.

While this state is held, the displacement volume of the second pump motor 6 is set at zero, so that the second pump motor 6 freewheels. At the same time, the first pump motor 9 is locked, so that the rotation thereof stops. Specifically, the closed circuit connecting the pump motors 9, 6 in communication is closed or shut down by the second pump motor 6, so that first pump motor 9 whose displacement volume has been maximized becomes unable to supply or eject pressure oil, and the rotation thereof stops. As a result, the sun gear S1 of the first planetary gear mechanism 7 receives a torque that fixes the sun gear S1. Therefore, in the first planetary gear mechanism 7, power is input to the ring gear R1, with the sun gear S1 fixed. Therefore, the carrier C1 that is the output element is provided with torque that rotates the carrier C1 in the same direction as the ring gear R1, and the torque is transmitted to the driven shaft 13 as an output shaft via the first driving shaft 10, and the third-speed gear pair 16. Thus, the third speed as a fixed speed change ratio is set.

During the state of the third speed, if the second synchronizer 20 is set to the OFF state, that is, if the sleeve 20S thereof is set at the neutral position, the second pump motor 6 is not passively rotated, so that the loss of power caused by the so-called drag can be avoided. Furthermore, if the sleeve 20S of the second synchronizer 20 is moved to the left side in FIG. 1 to link the fourth-speed driven gear 17B to the driven shaft 13, a stand-by state for the upshift to the fourth speed as a fixed speed change ratio is obtained. On the other hand, if the sleeve 20S of the second synchronizer 20 is moved to the right side in FIG. 1 to link the second-speed driven gear 15B to the driven shaft 13, a stand-by state for the downshift to the second speed is obtained.

During the stand-by state for the upshift from the third speed to the fourth speed, the second pump motor 6 and the sun gear S2 linked thereto are rotating in the direction opposite to the rotation direction of the ring gear R2. Therefore, if the displacement volume of the second pump motor 6 is increased in the positive direction, the second pump motor 6 comes to function as a pump, and reaction force associated therewith acts on the sun gear S2. As a result, the torque combining the torque input to the ring gear R2 and the reaction force that acts on the sun gear S2 acts on the carrier C2, so that the carrier C2 rotates in the normal direction. In turn, the torque thereof is transmitted to the second driving shaft 11 via the second counter gear pair 12, and is further transmitted to the driven shaft 13 that is the output shaft, via the fourth-speed gear pair 17. Besides, as the speed change ratio declines, the rotation speed of the engine 1 is gradually lowered.

The pressure oil produced by the second pump motor 6 functioning as a pump is supplied from its suction port 6S to the suction port 9S of the first pump motor 9. Hence, the first pump motor 9 functions as a motor to output torque in the normal rotation direction. This torque acts on the sun gear S1 of the first planetary gear mechanism 7. Since power is being input to the ring gear R1 of the first planetary gear mechanism 7 from the engine 1, the torque caused by the input power and the torque that acts on the sun gear S1 are combined, and the combined torque is output from the carrier C1 to the first driving shaft 10 via the second counter gear pair 12. That is, the transmission of power via oil pressure occurs in parallel or simultaneously with the mechanical transmission of power, so that the power combining such powers is transmitted to the driven shaft 13. Then, as the rotation speed of the second pump motor 6 gradually declines, the proportion of the mechanical power transmission via the second planetary gear mechanism 5 and the fourth-speed gear pair 17 gradually increases, so that the speed change ratio of the transmission as a whole gradually declines from the speed change ratio determined by the third-speed gear pair 16 to the speed change ratio determined by the fourth-speed gear pair 17. In this case, the change is also a continuous variation as in the foregoing shifts between the fixed speed change ratios. That is, the stepless or continuously variable speed change is accomplished. Then, by increasing the displacement volume of the second pump motor 6 to the maximum and then stopping the rotation thereof, the fourth speed as a fixed speed change ratio is established.

While this state is held, the displacement volume of the first pump motor 9 is set at zero, so that the first pump motor 9 freewheels. At the same time, the second pump motor 6 is locked, so that the rotation thereof stops. Specifically, the closed circuit connecting the pump motors 9, 6 in communication is closed or shut down by the first pump motor 9, so that the second pump motor 6 whose displacement volume has been maximized becomes unable to supply or eject pressure oil, and the rotation thereof stops. As a result, the sun gear S2 of the second planetary gear mechanism 5 receives a torque that fixes the sun gear S2. Therefore, in the second planetary gear mechanism 5, power is input to the ring gear R2, with the sun gear S2 fixed. Therefore, the carrier C2 that is the output element is provided with torque that rotates the carrier C2 in the same direction as the ring gear R2, and the torque is transmitted to the second driving shaft 11 via the second counter gear pair 12, and is further transmitted to the driven shaft 13 as an output shaft via the fourth-speed gear pair 17. Thus, the fourth speed as a fixed speed change ratio is set.

During the state of the fourth speed, if the first synchronizer 19 is set to the OFF state, that is, if the sleeve 19S thereof is set at the neutral position, the first pump motor 9 is not passively rotated, so that the loss of power caused by the so-called drag can be avoided. Besides, if the sleeve 19S of the first synchronizer 19 is moved to the left side in FIG. 1 to link the third-speed driven gear 16B to the driven shaft 13, a stand-by state for the downshift to the third speed is obtained.

Next, the reverse gear speed will be described. If a command to set the reverse gear speed is output, for example, by switching the selector lever position from the neutral position to the reverse position, the sleeve 22S of the start synchronizer 22 is moved to the left side in FIG. 1 so that the second pump motor 6 is linked to the driven shaft 13, and the sleeve 21S of the reverse synchronizer 21 is moved to the left side in FIG. 1 so that the reverse driven gear 18B is linked to the driven shaft 13. While this state is held, the displacement volume of the first pump motor 9 is gradually increased. At the same time, the displacement volume of the second pump motor 6 is gradually increased in the negative direction, contrary to the foregoing cases of the forward gear speeds (forward travel). While the vehicle is at rest, the driven shaft 13 is not rotating, and therefore the second pump motor 6 linked to the driven shaft 13 is at rest. In the first planetary gear mechanism 7, on the other hand, power is being input to the ring gear R1 from the engine 1 while the carrier C1 linked to the first driving shaft 10 is fixed. Therefore, the sun gear S1 and the first pump motor 9 linked thereto are rotating in the direction opposite to the rotation direction of the ring gear R1.

Therefore, if the torque capacity of the first pump motor 9 is gradually increased, the first pump motor 9 comes to function as a pump to generate oil pressure. Since reaction force associated with the operation of the first pump motor 9 acts on the sun gear S1, the carrier C1 that is the output element is provided with torque that rotates the carrier C1 in the same direction as in the case of forward travel. This torque is transmitted to the first driving shaft 10. Since the reverse gear pair 18 disposed between the first driving shaft 10 and the driven shaft 13 includes the idle gear 18C, the rotation of the first driving shaft 10 in the same direction as in the case of forward travel results in the driven shaft 13 rotating in the direction opposite to the rotation direction thereof in the case of forward travel. In other words, since the rotation direction of the first driving shaft 10 is opposite to the rotation direction of the input shaft 2, the rotation direction of the driven shaft 13 is opposite to the rotation direction of the input shaft 2. Therefore, the vehicle moves rearward.

The pressure oil produced by the first pump motor 9 functioning as a pump is supplied from its suction port 9S to the suction port 6S of the second pump motor 6. Since the displacement volume of the second pump motor 6 is set on the negative side as mentioned above, the second pump motor 6, with the pressure oil supplied to the suction port 6S, rotates in the direction opposite to the rotation direction thereof in the case of forward travel, and the torque is transmitted to the driven shaft 13. That is, power is transmitted to the driven shaft 13 by the mechanical power transmission via the first planetary gear mechanism 7 and the reverse gear pair 18, and the power transmission via fluid between the pump motors 6, 9.

Then, by gradually increasing the displacement volume of the first pump motor 9, the rotation speed thereof gradually declines, and correspondingly the proportion of the power transmission via fluid gradually declines, so that the speed change ratio gradually declines to the speed change ratio that is determined by the gear ratio of the reverse gear pair 18. That is, the speed change ratio continuously varies. Then, when the displacement volume of each of the pump motors 6, 9 is maximized, the reverse gear speed as a fixed speed change ratio is set.

As described above, the transmission shown in FIG. 1 is able to set speed change ratios of four forward gear speeds and one reverse gear speed as so-called fixed speed change ratios that can be set without involvement of the fluid drive transmission, and is also able to continuously set the speed change ratio between the fixed speed change ratios. Thus, the transmission in FIG. 1 is able to perform the stepless or continuously variable speed change in a wide range of speed change ratio as a whole. Furthermore, the transmission has a so-called two-axis construction having two axes on which the rotating members, including the driving shafts 10, 11, the driven shaft 13, the drive units 3, 4, etc., are disposed. Therefore, the outside diameter of the transmission can be reduced to reduce the size of the overall construction. Furthermore, since power can be output on an extension of the center axis of rotation of the engine 1 or an axis parallel thereto, the foregoing transmission can be provided as a transmission that is excellent in the mountability in FR vehicles whose constraints regarding the outside diameter are great and whose constraints regarding the axial length are relatively small.

Furthermore, when the vehicle starts to travel forward or rearward, the transmission can transmit power to the driven shaft 13 by the power transmission via fluid in addition to the mechanical power transmission by linking the second pump motor 6 to the driven shaft 13 through the use of the start synchronizer 22. This switching operation of the start synchronizer 22 is performed on the basis of the command signal from the electronic control device 27 mentioned above. Therefore, the electronic control device 27 corresponds to a vehicle start control device in the invention. Since the start synchronizer 22 is operated as described above, the speed change ratio at the time of starting the vehicle becomes larger than the speed change ratio determined by the first-speed gear pair 14 or the reverse gear pair 18 with a large gear ratio. Thus, the drive torque at the time of starting the vehicle can be made relatively large to achieve good acceleration from standstill. Incidentally, since the start synchronizer 22 is provided for assistance or supplement to the drive torque provided via the fluid drive transmission at the time of starting the vehicle, the provision of the start synchronizer 22 is not particularly needed, if necessary drive torque can be obtained merely through the so-called mechanical power transmission via the gear pairs 14, 18.

Furthermore, when any one of the fixed speed change ratios as the forward gear speeds is set in the transmission, the displacement volume of one of the pump motors 6, 9 is set at zero, and correspondingly the other one of the pump motors 9, 6 is locked. Therefore, when any one of the fixed speed change ratios is set, the fluid drive transmission is not performed. That is, power can be transmitted without performing conversion of energy form, and energy is not particularly needed in order to keep the power transmission path capable of power transmission. Therefore, the power transmission efficiency can be improved more than in the related art.

Herein, preferable gear ratios of the first and second counter gear pairs 8, 12 and the planetary gear mechanisms 7, 5 will be described. It is preferable that these gear ratios be set as follows:

$$\kappa 1 \times (1+\rho 1) > \kappa 2 \times (1+\rho^2)$$

where $\kappa 1$ is the gear ratio of the first counter gear pair 8, and $\kappa 2$ is the gear ratio of the second counter gear pair 12, and $\rho 1$ is the gear ratio of the first planetary gear mechanism 7 (the ratio between the number of teeth of the sun gear S1 and the number of teeth of the ring gear R1), and $\rho 2$ is the gear ratio of the second planetary gear mechanism 5 (the ratio between the number of teeth of the sun gear S2 and the number of teeth of the ring gear R2). This makes it possible to set a fourth-speed speed change ratio suitable for practical use even if the gear ratio of the fourth-speed gear pair 17 is set at a gear ratio that is close to "1". Therefore, since the outside diameter of the fourth-speed driven gear 17B can be made relatively large, the constraints regarding the outside diameter of the driven shaft 13 that supports the fourth-speed driven gear 17B are lessened. Hence, a strength of the driven shaft 13 or the output shaft can be secured without increasing the outside diameter of the transmission as a whole.

In addition to the relationship expressed by the foregoing inequality, it is preferable that the rate between the fixed speed change ratio of the first speed and the fixed speed change ratio of the second speed (or the amount of step therebetween), and the rate between the fixed speed change ratio of the third speed and the fixed speed change ratio of the fourth speed (or the amount of step therebetween) is equal to the following rate:

$$\{\kappa 1 \times (1+\rho 1)\} / \{\kappa 2 \times (1+\rho 2)\}$$

This construction makes it possible to obtain the individual fixed speed change ratios by switching the counter gear pair involved in the power transmission from the engine 1 even if the first-speed gear pair 14 and the second-speed gear pair 15 have the same construction and the same specifications and the third-speed gear pair 16 and the fourth-speed gear pair 17 have the construction and the same specifications. Therefore, the commonality of component parts can be enhanced, and the cost of the transmission as a whole can be reduced.

Figure 4:
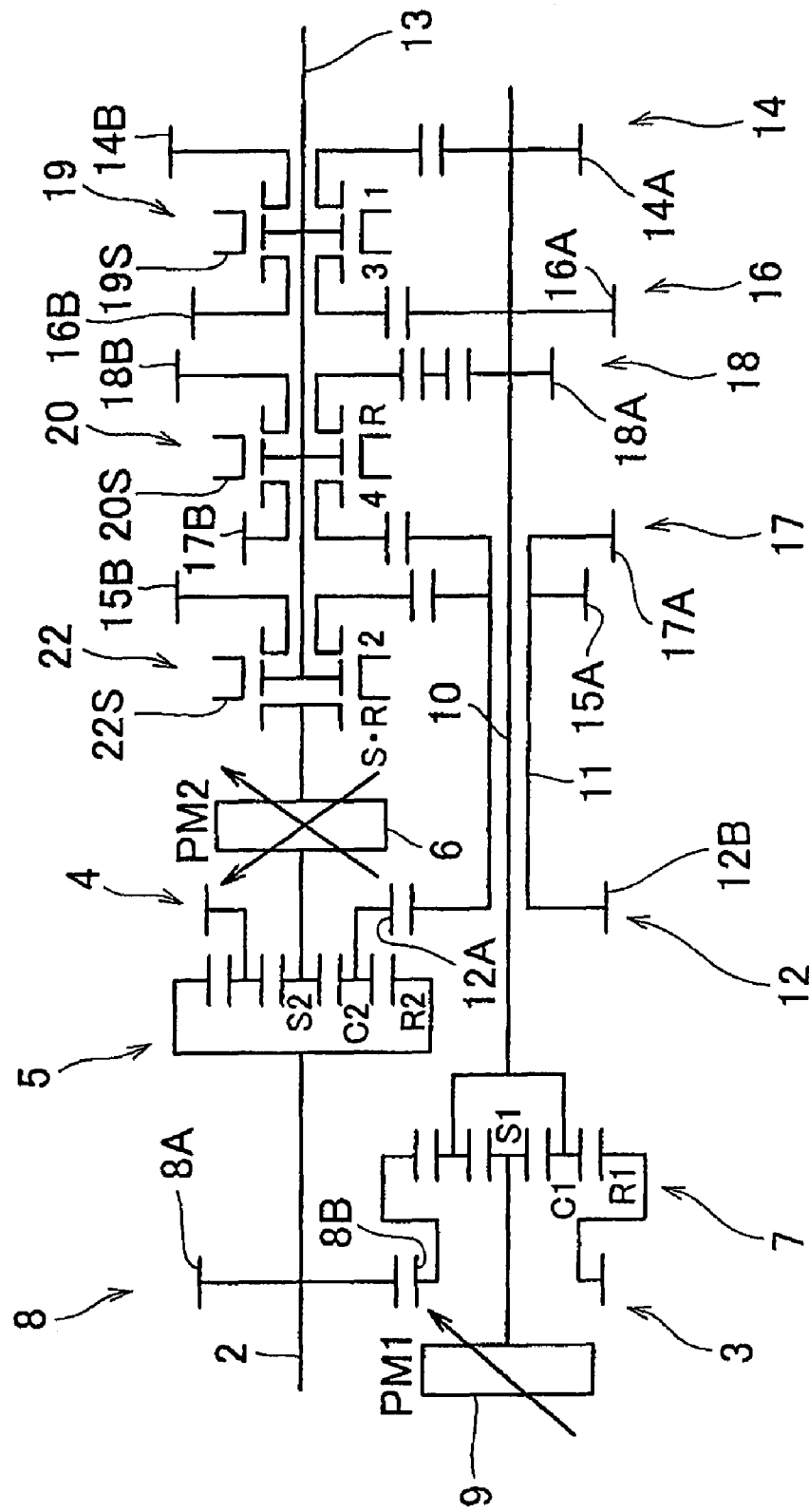
FIG. 4 is a schematic skeleton diagram showing a construction example of a transmission for a vehicle in accordance with a second embodiment of the invention.

Next, a construction example of a vehicle transmission in accordance with a second embodiment of the invention will be described. The example shown in FIG. 4 is a construction obtained by partially alerting the construction shown in FIG. 1 so that the number of synchronizers as switching mechanisms is three and four forward gear speeds and one reverse gear speed are set. Specifically, in the construction shown in FIG. 4, the gear pairs are disposed on a driven shaft 13 and one of a first driving shaft 10 and a second driving shaft 11 in the following manner. That is, a first-speed gear pair 14, a third-speed gear pair 16 and a reverse gear pair 18 are disposed on the first driving shaft 10 in that order from the distal end side thereof (the right end side in FIG. 4), and a fourth-speed gear pair 17 and a second-speed gear pair 15 are disposed on the second driving shaft 11 in that order from the distal end side thereof. Therefore, the reverse gear pair 18 are the fourth-speed gear pair 17 are disposed adjacent to each other.

Correspondingly to the alteration in the disposal of the gear pairs, a second synchronizer 20 is disposed between a reverse driven gear 18B and a fourth-speed driven gear 17B. Then, by moving a sleeve 20S of the second synchronizer 20 to the left side in FIG. 4, the fourth-speed driven gear 17B is linked to the driving shaft 11. Conversely, by moving the sleeve 20S to the right side in FIG. 4, the reverse driven gear 18B is linked to the driven shaft 13. Besides, a start synchronizer 22 is constructed so that a sleeve 22S thereof can be movable from a so-called OFF-state middle position to the left and right sides. That is, by moving the sleeve 22S to the left side in FIG. 4, a second pump motor 6 is linked to the driven shaft 13. This is the same as in the construction shown in FIG. 1.

Furthermore, by moving the sleeve 22S to the right side in FIG. 4, a second-speed driven gear 15B is linked to the driven shaft 13. Incidentally, in the example shown in FIG. 4, a first counter gear pair 8 is disposed between a first pump motor 9 and a first planetary gear mechanism 7, and correspondingly, the first planetary gear mechanism 7 is disposed relatively close to the second planetary gear mechanism 5 in the direction of the axis. The other portions, arrangements and the like shown in FIG. 4 are the same as those shown in FIG. 1, and are represented in FIG. 4 by the same reference characters as in FIG. 1, and will not be described below. Incidentally, in FIG. 4, the engine 1, the electronic control device 27 and the actuators 23, 24, 25, 26 are not shown.

The construction as shown in FIG. 4 is also able to set four forward gear speeds and one reverse gear speed as fixed speed change ratios. The states of operation of the synchronizers 19, 20, 22 and the states of operation of the pump motors 9, 6 for setting the fixed speed change ratios and intermediate speed change ratios therebetween are collectively shown in FIG. 5. The indications used in FIG. 5 mean the same as those in FIG. 3 that are described above. The states of speed change will be briefly described. In the neutral state, the displacement volumes of the pump motors 9, 6 are set at zero, and the synchronizers 19, 20, 22 are set to the OFF state of no torque transmission by positioning the sleeves 19S, 20S, 22S thereof at the middle position.

When the vehicle is to be started forward, the sleeve 22S of the start synchronizer 22 is moved to the left side in FIG. 4 to link the second pump motor 6 to the driven shaft 13 as an output shaft, and the sleeve 19S of the first synchronizer 19 is moved to the right side in FIG. 4 to link the first-speed driven gear 14B to the driven shaft 13. This is the same as in the foregoing transmission shown in FIG. 1. Therefore, the first pump motor 9 functions as a pump to generate oil pressure, and the thus-produced pressure oil is supplied to the suction port 6S of the second pump motor 6, and the second pump motor 6 functions as a motor.

As a result, the so-called mechanical transmission of power and the transmission of power via fluid occur, and the power combining such powers is transmitted to the driven shaft 13. The speed change ratio in this case is larger than the fixed speed change ratio of the first speed. As the rotation speed of the first pump motor 9 gradually approaches zero, the proportion of the fluid drive transmission lessens. Finally, the first pump motor 9 stops, and the mechanical power transmission alone continues. That is, the first speed as a fixed speed change ratio is established, and the first pump motor 9 is locked by bringing the displacement volume of the second pump motor 6 to zero.

For the upshift to the second speed, the sleeve 22S of the start synchronizer 22 is moved from the left side to the right side in FIG. 4 to link the second-speed driven gear 15B to the driven shaft 13, and the sleeve 19S of the first synchronizer 19 is kept to the right side in FIG. 4 to keep the first-speed driven gear 14B linked to the driven shaft 13. This state of linkage of the gear pairs is the same as in the case of the upshift from the first speed to the second speed in the transmission shown in FIG. 1 or in the case of setting intermediate speed change ratios between the first speed and the second speed in the transmission shown in FIG. 1. Therefore, by gradually increasing the displacement volume of the second pump motor 6, the second pump motor 6 is caused to function as a pump and generate oil pressure. The thus-produced pressure oil is supplied to the suction port 9S of the first pump motor 9, and the first pump motor 9 functions as a motor.

As a result, the so-called mechanical transmission of power and the transmission of power via fluid occur, and the power combining such powers is transmitted to the driven shaft 13. The speed change ratio in this case ranges between the fixed speed change ratio of the first speed and the fixed speed change ratio of the second speed. Then, as the rotation speed of the second pump motor 6 gradually approaches zero, the proportion of the fluid drive transmission lessens. Finally, the second pump motor 6 stops, and the mechanical power transmission alone continues. That is, the second speed as a fixed speed change ratio is established, and the second pump motor 6 is locked by bringing the displacement volume of the first pump motor 9 to zero.

For the upshift to the third speed, the sleeve 22S of the start synchronizer 22 is kept to the right side in FIG. 4 to keep the second-speed driven gear 15B linked to the driven shaft 13. Besides, the sleeve 19S of the first synchronizer 19 is moved to the left side in FIG. 4 to link the third-speed driven gear 16B to the driven shaft 13. This state of linkage of the gear pairs is the same as in the case of the upshift from the second speed to the third speed in the transmission shown in FIG. 1 or in the case of setting intermediate speed change ratios between the second speed and the third speed in the transmission shown in FIG. 1. Therefore, by gradually increasing the displacement volume of the first pump motor 9, the first pump motor 9 is caused to function as a pump and generate oil pressure. The thus-produced pressure oil is supplied to the suction port 6S of the second pump motor 6, and the second pump motor 6 functions as a motor.

As a result, the so-called mechanical transmission of power and the transmission of power via fluid occur, and the power combining such powers is transmitted to the driven shaft 13. The speed change ratio in this case ranges between the fixed speed change ratio of the second speed and the fixed speed change ratio of the third speed. Then, as the rotation speed of the first pump motor 9 gradually approaches zero, the proportion of the fluid drive transmission lessens. Finally, the first pump motor 9 stops, and the mechanical power transmission alone continues. That is, the third speed as a fixed speed change ratio is established, and the first pump motor 9 is locked by bringing the displacement volume of the second pump motor 6 to zero.

For the upshift to the fourth speed, the sleeve 22S of the start synchronizer 22 is returned to the neutral position, so that the start synchronizer 22 assumes the OFF state. Furthermore, the sleeve 20S of the second synchronizer 20 is moved to the left side in FIG. 4 to link the fourth-speed driven gear 17B to the driven shaft 13. This state of linkage of the gear pairs is the same as in the case of the upshift from the third speed to the fourth speed in the transmission shown in FIG. 1 or in the case of setting intermediate speed change ratios between the third speed and the fourth speed in the transmission shown in FIG. 1. Therefore, by gradually increasing the displacement volume of the second pump motor 6, the second pump motor 6 is caused to function as a pump and generate oil pressure. The thus-produced pressure oil is supplied to the suction port 9S of the first pump motor 9, and the first pump motor 9 functions as a motor.

As a result, the so-called mechanical transmission of power and the transmission of power via fluid occur, and the power combining such powers is transmitted to the driven shaft 13. The speed change ratio in this case ranges between the fixed speed change ratio of the third speed and the fixed speed change ratio of the fourth speed. Then, as the rotation speed of the second pump motor 6 gradually approaches zero, the proportion of the fluid drive transmission lessens. Finally, the second pump motor 6 stops, and the mechanical power transmission alone continues. That is, the fourth speed as a fixed speed change ratio is established, and the second pump motor 6 is locked by bringing the displacement volume of the first pump motor 9 to zero.

When the reverse gear speed is to be set, the sleeve 22S of the start synchronizer 22 is moved to the left side in FIG. 4 to link the second pump motor 6 to the driven shaft 13, and the first synchronizer 19 is set to the OFF state, and the sleeve 20S of the second synchronizer 20 is moved to the right side in FIG. 4 to link the reverse driven gear 18B to the driven shaft 13. This state of linkage of the gear pairs is the same as in the case of setting the reverse gear speed in the transmission shown in FIG. 1. Therefore, by gradually increasing the displacement volume of each of the pump motors 9, 6, the first pump motor 9 is caused to function as a pump and generate oil pressure. The thus-produced pressure oil is supplied to the suction port 6S of the second pump motor 6, and the second pump motor 6 functions as a motor.

In this case, since power from the first drive unit 3 is transmitted to the driven shaft 13 via the reverse gear pair 18, the driven shaft 13 rotates in the direction opposite to the rotation direction thereof in the case of forward travel. Besides, since the displacement volume of the second pump motor 6 is set in the direction opposite to the direction thereof in the case of forward travel, the second pump motor 6 rotates in the direction opposite to the rotation direction thereof in the case of forward travel. The thus-generated torque is transmitted to the driven shaft 13. As a result, the so-called mechanical transmission of power and the transmission of power via fluid occur, and the power combining such powers is transmitted to the driven shaft 13. Thus, the reverse gear speed is established. Furthermore, since the displacement volume of each of the pump motors 9, 6 is maximized, the reverse gear speed as a fixed speed change ratio is set.

Therefore, according to the construction as shown in FIG. 4, since the start synchronizer 22 also serves as the reverse synchronizer 21 shown in FIG. 1, the four forward gear speeds and the one reverse gear speed can be set through the use of the three synchronizers (switching mechanisms). Therefore, the construction as shown in FIG. 4 reduces the number of necessary component parts as a whole, and allows reductions of the size and weight of the transmission. Besides, since a basic construction of the transmission shown in FIG. 4 is substantially the same as the basic construction of the transmission shown in FIG. 4, the transmission shown in FIG. 4 is also able to achieve substantially the same operation and effects as the transmission shown in FIG. 1.

Figure 6:
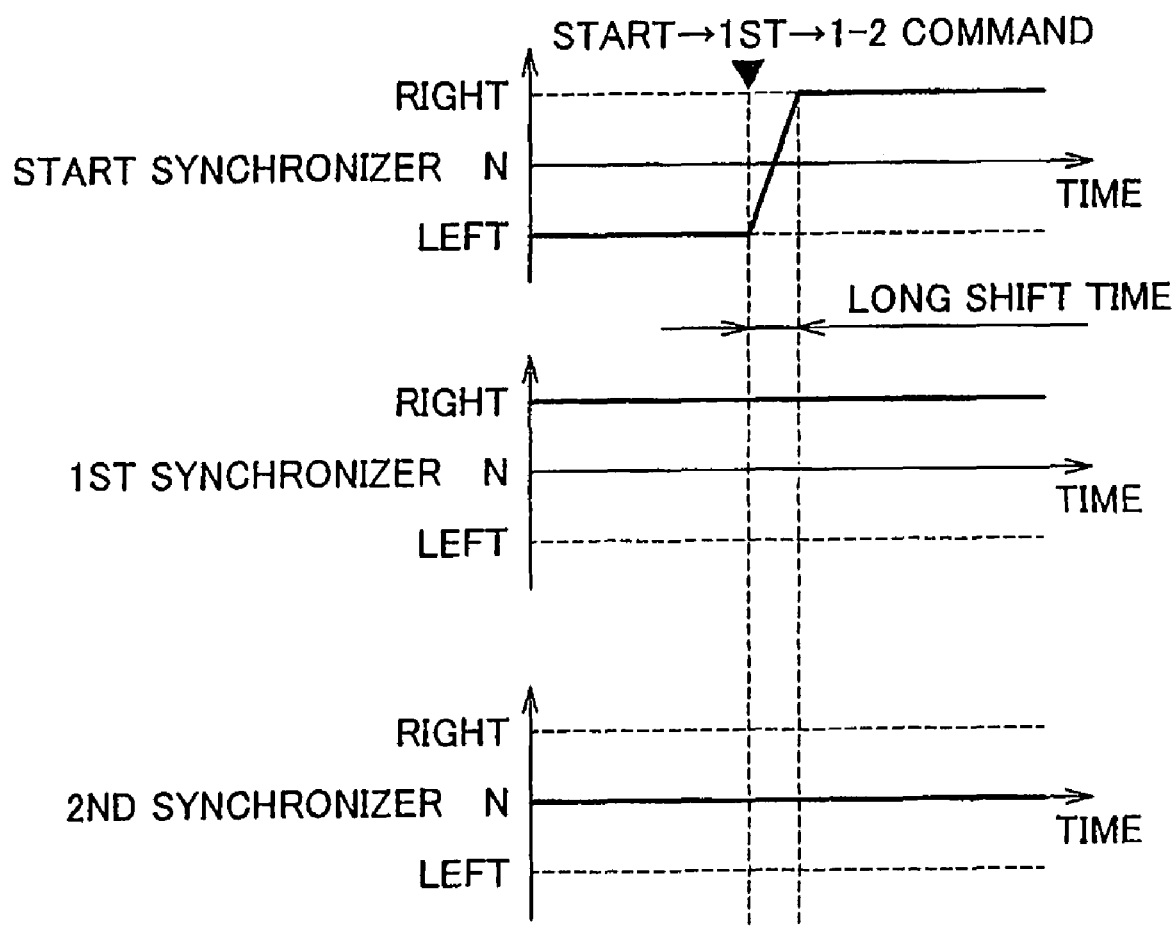
FIG. 6 is a time chart for describing the actions of the synchronizers for the switching from the start of the vehicle to the second speed via the first speed.

Furthermore, the construction as shown in FIG. 4 facilitates the upshift control following the start of the vehicle in the forward direction. Specifically, the foregoing first speed is a speed change ratio for the purpose of achieving large drive force at the time of starting the vehicle, and ordinarily, the first speed is immediately followed by the upshift to the second speed or the third speed. The switching of the synchronizes for the upshift from the first speed to the second speed in the construction shown in FIG. 4 is only the switching of the start synchronizer 22 from the left side position to the right side position in FIG. 4 as shown in FIG. 5. This can be illustrated as in FIG. 6. In the upshift from the starting of the vehicle to the second speed via the first speed, the first and second synchronizers 19, 20 are kept in their respective existing states of operation, and only the sleeve 22S of the start synchronizer 22 is moved from the left side to the right side. Therefore, in the case where appropriate actuators are employed for the shifting operation of the synchronizers, only one of the actuators needs to be operated, and the operation is in a simple linear fashion. Therefore, the shift control is easy. In other words, since there is no need to operate a plurality of synchronizers in coordination or in a retained sequence of switching, the shift control is easy, and in particular, the control of changing the low-speed-side speed change ratio becomes easy.

Figure 7:
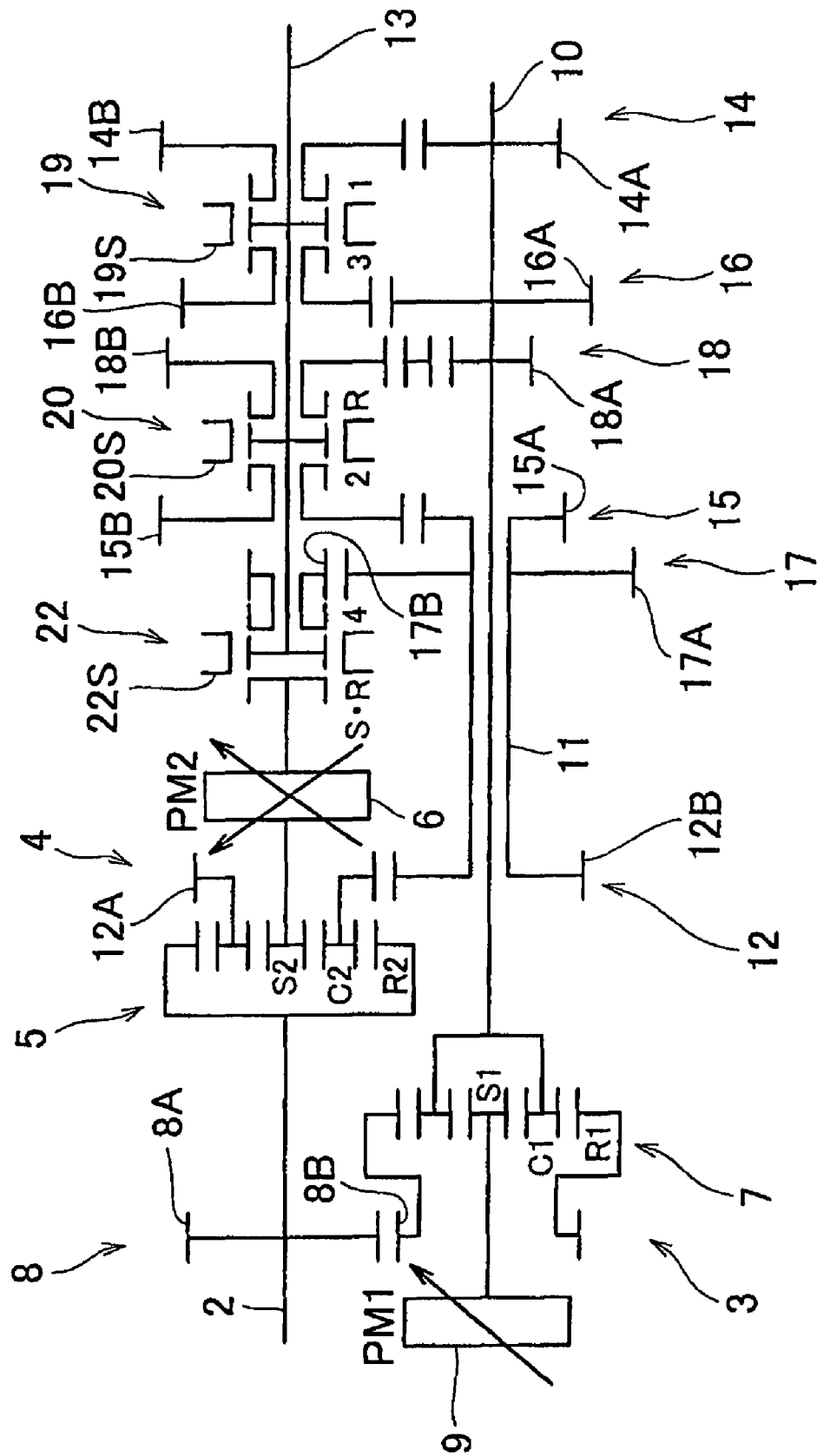
FIG. 7 is a schematic skeleton diagram showing a construction example of a transmission for a vehicle in accordance with a third embodiment of the invention.

As still another embodiment of the invention, a construction example of a transmission for a vehicle in accordance with a third embodiment will be described. The third embodiment is an example that is constructed so as to improve the speed shift response at the time of the upshift from the start of the vehicle to the second speed via the first speed. The construction of the third embodiment is obtained substantially by interchanging the second-speed gear pair 15 and the fourth-speed gear pair 17 in position in the foregoing construction shown in FIG. 4. Specifically, the second-speed gear pair 15 is disposed at the distal end side of a second driving shaft 11 (the right end side thereof in FIG. 7). Therefore, a second-speed driven gear 15B faces a reverse driven gear 18B across a second synchronizer 20, and a second-speed drive gear 15A is mounted on the distal end side of the second driving shaft 11. The fourth-speed gear pair 17 is disposed at the engine 1 side of the second-speed gear pair 15 (or at the side thereof toward drive units 3, 4). Therefore, a fourth-speed driven gear 17B faces a rotor shaft of a second pump motor 6 across a start synchronizer 22, and a fourth-speed drive gear 17A meshing with the fourth-speed driven gear 17B is mounted to the second driving shaft 11. The other portions, arrangements and the like shown in FIG. 7 are the same as those shown in FIG. 4, and are represented in FIG. 7 by the same reference characters as in FIG. 4, and will not be described below. Incidentally, in FIG. 7, the engine 1, the electronic control device 27 and the actuators 23, 24, 25, 26 are not shown.

The construction as shown in FIG. 7 is also able to set four forward gear speeds and one reverse gear speed as fixed speed change ratios. The states of operation of the synchronizers 19, 20, 22 and the states of operation of the pump motors 9, 6 for setting the fixed speed change ratios and intermediate speed change ratios therebetween are collectively shown in FIG. 8. The indications used in FIG. 8 mean the same as those in FIG. 3 or 5 that are described above. Besides, since the construction shown in FIG. 7 is different from the construction shown in FIG. 4 in that the second-speed gear pair 15 and the fourth-speed gear pair 17 are interchanged in position, the table shown in FIG. 8 is different from the table shown in FIG. 5 in the contents related to the second speed and the fourth speed, and the other contents are the same as in FIG. 5.

The states of speed change in the transmission shown in FIG. 7 will be briefly described. In the neutral state, the displacement volumes of the pump motors 9, 6 are set at zero, and the synchronizers 19, 20, 22 are set to the OFF state of no torque transmission by positioning the sleeves 19S, 20S, 22S thereof at the middle position.

When the vehicle is to be started forward, the sleeve 22S of the start synchronizer 22 is moved to the left side in FIG. 7 to link the second pump motor 6 to the driven shaft 13 as an output shaft, and the sleeve 19S of the first synchronizer 19 is moved to the right side in FIG. 7 to link the first-speed driven gear 14B to the driven shaft 13. This is the same as in the foregoing transmission shown in FIG. 4. Therefore, the first pump motor 9 functions as a pump to generate oil pressure, and the thus-produced pressure oil is supplied to the suction port 6S of the second pump motor 6, and the second pump motor 6 functions as a motor.

As a result, the so-called mechanical transmission of power and the transmission of power via fluid occur, and the power combining such powers is transmitted to the driven shaft 13. The speed change ratio in this case is larger than the fixed speed change ratio of the first speed. As the rotation speed of the first pump motor 9 gradually approaches zero, the proportion of the fluid drive transmission lessens. Finally, the first pump motor 9 stops, and the mechanical power transmission alone continues. That is, the first speed as a fixed speed change ratio is established, and the first pump motor 9 is locked by bringing the displacement volume of the second pump motor 6 to zero.

For the upshift to the second speed, the sleeve 22S of the start synchronizer 22 is moved from the left side in FIG. 7 to the middle position to release the linkage between the rotor shaft of the second pump motor 6 and the driven shaft 13, and the sleeve 19S of the first synchronizer 19 is kept to the right side in FIG. 7 to keep the first-speed driven gear 14B linked to the driven shaft 13. Furthermore, the sleeve 20S of the second synchronizer 20 is moved to the left side in FIG. 7 to link the second-speed driven gear 15B to the driven shaft 13. This state of linkage of the gear pairs is the same as in the case of the upshift from the first speed to the second speed in the transmission shown in FIG. 1 or 4 or in the case of setting intermediate speed change ratios between the first speed and the second speed in the transmission shown in FIG. 1. Therefore, by gradually increasing the displacement volume of the second pump motor 6, the second pump motor 6 is caused to function as a pump and generate oil pressure. The thus-produced pressure oil is supplied to the suction port 9S of the first pump motor 9, and the first pump motor 9 functions as a motor.

As a result, the so-called mechanical transmission of power and the transmission of power via fluid occur, and the power combining such powers is transmitted to the driven shaft 13. The speed change ratio in this case ranges between the fixed speed change ratio of the first speed and the fixed speed change ratio of the second speed. Then, as the rotation speed of the second pump motor 6 gradually approaches zero, the proportion of the fluid drive transmission lessens. Finally, the second pump motor 6 stops, and the mechanical power transmission alone continues. That is, the second speed as a fixed speed change ratio is established, and the second pump motor 6 is locked by bringing the displacement volume of the first pump motor 9 to zero.

For the upshift to the third speed, the states of operation of the start synchronizer 22 and the second synchronizer 20 are kept unchanged, and the sleeve 19S of the first synchronizer 19 is moved from the right side position to the left side position in FIG. 7 to release the linkage between the first-speed driven gear 14B and the driven shaft 13 and link the third-speed driven gear 16B to the driven shaft 13. This state of linkage of the gear pairs is the same as in the case of the upshift from the second speed to the third speed in the transmission shown in FIG. 1 or 4, or in the case of setting intermediate speed change ratios between the second speed and the third speed in the transmission shown in FIG. 1 or 4. Therefore, by gradually increasing the displacement volume of the first pump motor 9, the first pump motor 9 is caused to function as a pump and generate oil pressure. The thus-produced pressure oil is supplied to the suction port 6S of the second pump motor 6, and the second pump motor 6 functions as a motor.

As a result, the so-called mechanical transmission of power and the transmission of power via fluid occur, and the power combining such powers is transmitted to the driven shaft 13. The speed change ratio in this case ranges between the fixed speed change ratio of the second speed and the fixed speed change ratio of the third speed. Then, as the rotation speed of the first pump motor 9 gradually approaches zero, the proportion of the fluid drive transmission lessens. Finally, the first pump motor 9 stops, and the mechanical power transmission alone continues. That is, the third speed as a fixed speed change ratio is established, and the first pump motor 9 is locked by bringing the displacement volume of the second pump motor 6 to zero.

For the upshift to the fourth speed, the sleeve 22S of the start synchronizer 22 is moved from the neutral position to the right side in FIG. 7 to link the fourth-speed driven gear 17B to the driven shaft 13, and the sleeve 20S of the second synchronizer 20 is moved to the middle position in FIG. 7 to release the linkage between the second-speed driven gear 15B and the driven shaft 13. This state of linkage of the gear pairs is the same as in the case of the upshift from the third speed to the fourth speed in the transmission shown in FIG. 1 or 4, or in the case of setting intermediate speed change ratios between the third speed and the fourth speed in the transmission shown in FIG. 1 or 4. Therefore, by gradually increasing the displacement volume of the second pump motor 6, the second pump motor 6 is caused to function as a pump and generate oil pressure. The thus-produced pressure oil is supplied to the suction port 9S of the first pump motor 9, and the first pump motor 9 functions as a motor.

As a result, the so-called mechanical transmission of power and the transmission of power via fluid occur, and the power combining such powers is transmitted to the driven shaft 13. The speed change ratio in this case ranges between the fixed speed change ratio of the third speed and the fixed speed change ratio of the fourth speed. Then, as the rotation speed of the second pump motor 6 gradually approaches zero, the proportion of the fluid drive transmission lessens. Finally, the second pump motor 6 stops, and the mechanical power transmission alone continues. That is, the fourth speed as a fixed speed change ratio is established, and the second pump motor 6 is locked by bringing the displacement volume of the first pump motor 9 to zero.

When the reverse gear speed is to be set, the sleeve 22S of the start synchronizer 22 is moved to the left side in FIG. 7 to link the second pump motor 6 to the driven shaft 13, and the first synchronizer 19 is set to the OFF state, and the sleeve 20S of the second synchronizer 20 is moved to the right side in FIG. 7 to link the reverse driven gear 18B to the driven shaft 13. This state of linkage of the gear pairs is the same as in the case of setting the reverse gear speed in the transmission shown in FIG. 1 or 4. Therefore, by gradually increasing the displacement volume of each of the pump motors 9, 6, the first pump motor 9 is caused to function as a pump and generate oil pressure. The thus-produced pressure oil is supplied to the suction port 6S of the second pump motor 6, and the second pump motor 6 functions as a motor.

In this case, since power from the first drive unit 3 is transmitted to the driven shaft 13 via the reverse gear pair 18, the driven shaft 13 rotates in the direction opposite to the rotation direction thereof in the case of forward travel. Besides, since the displacement volume of the second pump motor 6 is set in the direction opposite to the direction thereof in the case of forward travel, the second pump motor 6 rotates in the direction opposite to the rotation direction thereof in the case of forward travel. The thus-generated torque is transmitted to the driven shaft 13. As a result, the so-called mechanical transmission of power and the transmission of power via fluid occur, and the power combining such powers is transmitted to the driven shaft 13. Thus, the reverse gear speed is established. Furthermore, since the displacement volume of each of the pump motors 9, 6 is maximized, the reverse gear speed as a fixed speed change ratio is set.

Therefore, the transmission constructed as shown in FIG. 7 is also able to set the four forward gear speeds and the one reverse gear speed by using the three synchronizers (switching mechanisms) similarly to the transmission shown in FIG. 4, and is able to achieve substantially the same operation and effects as the transmission shown in FIG. 4. Besides, in the transmission shown in FIG. 7, the synchronizers 19, 20, 22 are constructed so that the sleeves 19S, 20S, 22S are stroked from the neutral position to the left and right sides. The switching between the state in which the first speed as a fixed speed change ratio is set and the state in which the second speed as a fixed speed change ratio is set can be achieved merely by moving the sleeve 22S of the start synchronizer 22 and the sleeve 20S of the second synchronizer 20 by a half of their respective entire stroke ranges.

Figure 9:
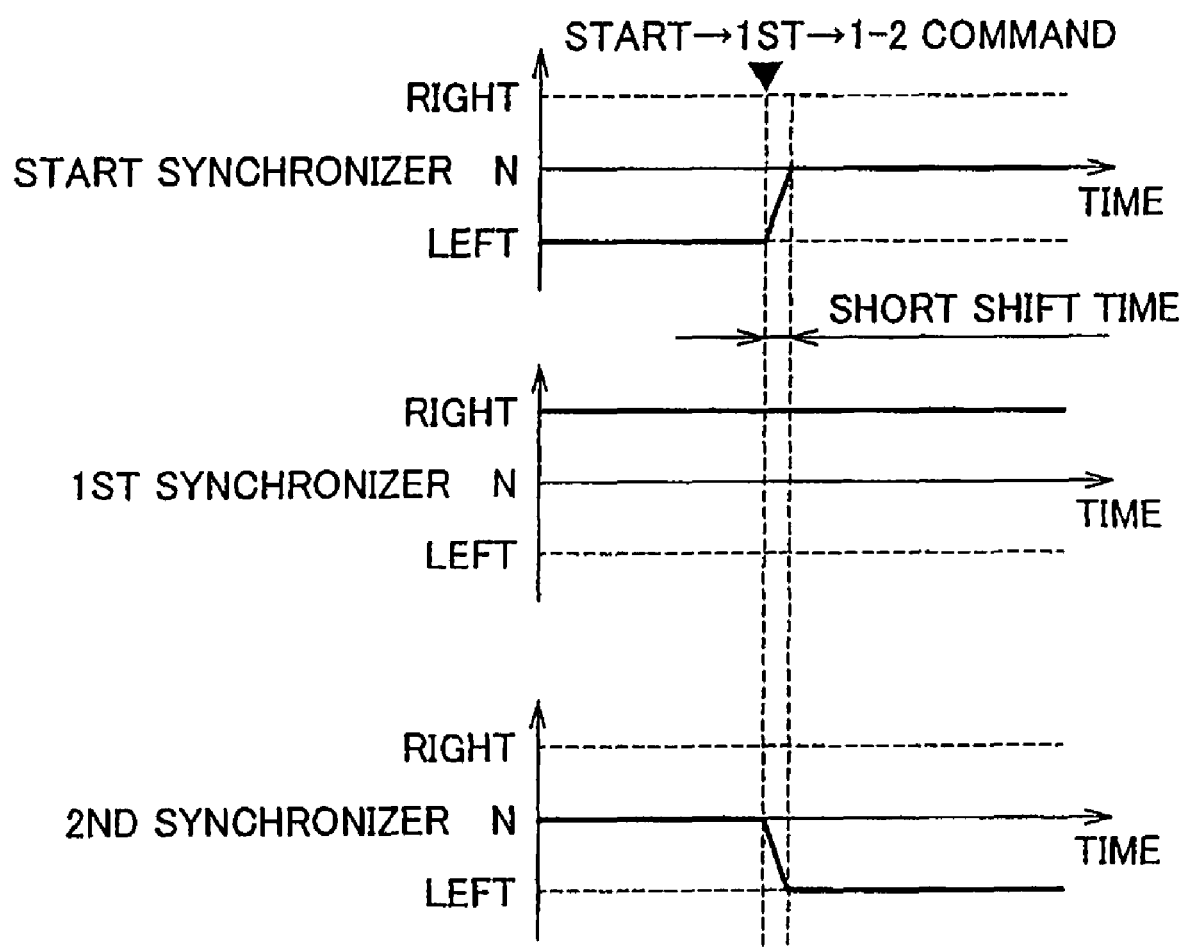
FIG. 9 is a time chart for describing the actions of the synchronizers for the switching from the start of the vehicle to the second speed via the first speed in the transmission having a constitution shown in FIG. 7.

This can be illustrated as in FIG. 9. In the upshift from the starting of the vehicle to the second speed via the first speed, the first synchronizer 19 is kept in the existing state of operation, and the sleeve 22S of the start synchronizer 22 is moved from the left side position to the middle neutral position. Substantially synchronously with this, the sleeve 20S of the second synchronizer 20 is moved from the middle neutral position to the right side position. Therefore, the moving distances of the sleeves 22S, 20S of the start synchronizer 22 and the second synchronizer 20, which are caused to perform the switching operation, are a half of their respective entire stroke ranges. Besides, since the movements of the sleeves 22S, 20S can be simultaneously performed, the time required for the switching substantially reduces by half, and the speed shift response can be improved. In particular, the upshift responsiveness following the start of the vehicle can be improved.

Figure 10:
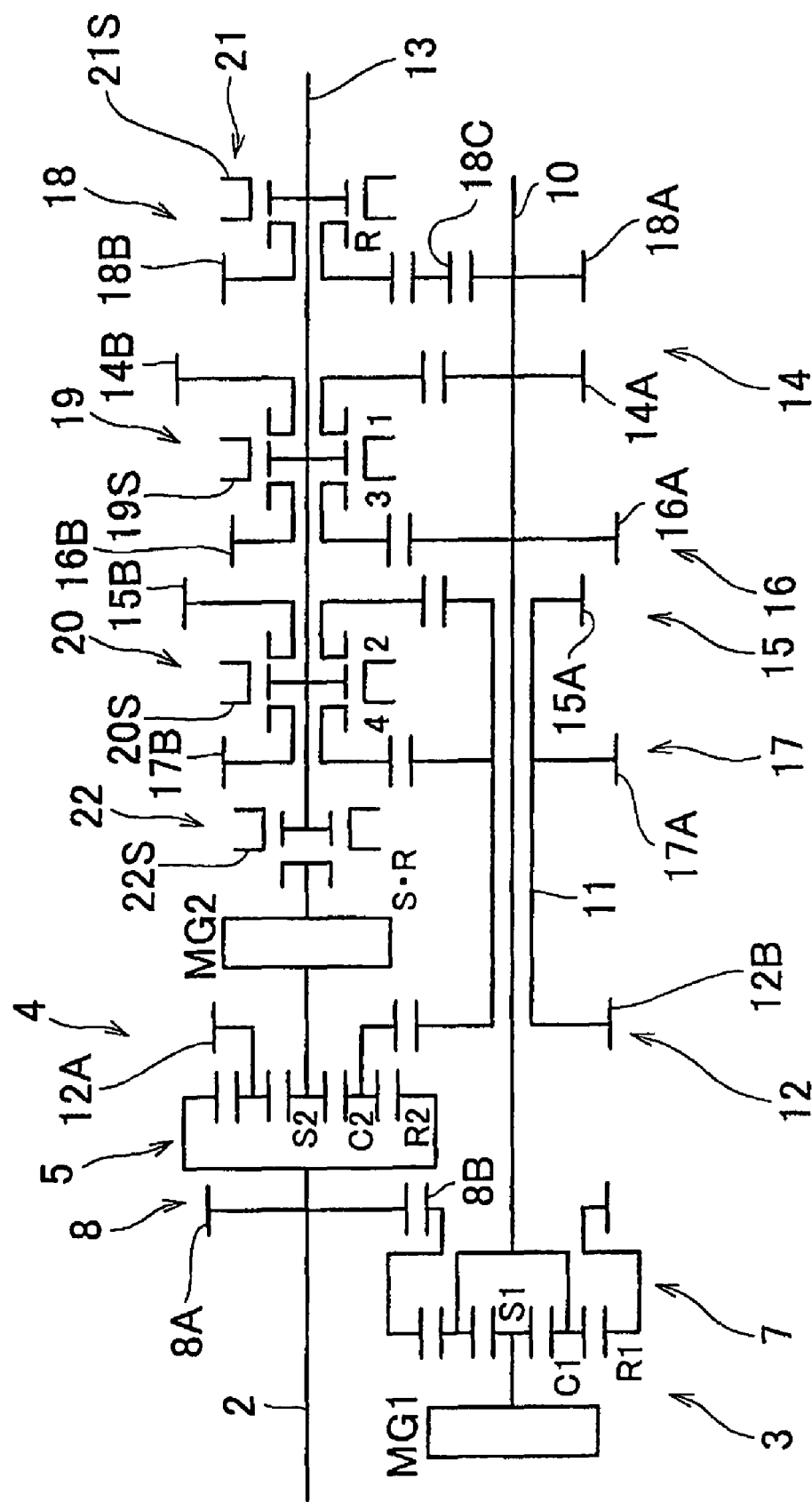
FIG. 10 is a schematic skeleton diagram showing a construction example of a transmission for a vehicle in accordance with a fourth embodiment of the invention which employs electric motor-generators as drive units.

The energy form conversion in the invention is not limited to the conversion of the mechanical energy of rotation with predetermined torque into the flowage of pressure fluid. In the invention, it is also possible to construct the transmission so that the mechanical energy is changed into electric energy and the electric energy is changed back to mechanical energy. In connection with this, a construction of a fourth embodiment is shown in FIG. 10. In the fourth embodiment, the first pump motor 9 and the second pump motor 6 in the construction of the first embodiment shown in FIG. 1 are replaced with a first electric motor-generator MG1 and a second electric motor-generator MG2, respectively, and the electric motor-generators MG1, MG2 are interconnected so that electric power can be sent and received therebetween. Incidentally, each of the electric motor-generators is an electric motor equipped with an electric power generation function, such as a permanent magnet type synchronous electric motor.

Therefore, in the construction shown in FIG. 10, the electric motor-generators MG1, MG2 function as electric power generators in place of the pump motors 9, 6 functioning as pumps in the construction in FIG. 1. Furthermore, similarly to the pump motors 9, 6 in FIG. 1 functioning as motors, the electric motor-generators MG1, MG2 function as motors for powering. Still further, similarly to the pump motors 9, 6 in FIG. 1 coming to freewheel when the displacement volume thereof is set at zero, the electric motor-generators MG1, MG2 come to rotate freely when the electrification thereof is cut off. Incidentally, the locking of the electric motor-generators MG1, MG2 is carried out electrically.

Thus, since the electric motor-generators MG1, MG2 can be caused to function in substantially the same manner as the pump motors 9, 6, the transmission constructed as shown in FIG. 10 is also able to continuously set the speed change ratio from the start of the vehicle to the fourth speed as a fixed speed change ratio so that the transmission can be caused to function as a continuously variable transmission. Incidentally, the states of operation for setting the speed change steps (gear speeds) and intermediate speed change ratios therebetween can be collectively shown by a table obtained by replacing the first pump motor 9 (PM1) and the second pump motor 6 (PM2) in the table in FIG. 3 with the first electric motor-generator MG1 and the second electric motor-generator MG2, respectively, and further by replacing the "0" of the displacement volume with "FREE", and the "PUMP" with "POWER GENERATION", and the "MOTOR" with "POWERING". Incidentally, in the construction shown in FIG. 1, the rotation direction (direction of torque) is set on the basis of the direction of the displacement volume of the first or second pump motor 9, 6 set, whereas in the construction of FIG. 10, the rotation direction of the electric motor-generators MG1, MG2, and the direction of the output torque thereof are electrically controlled.

Figure 11:
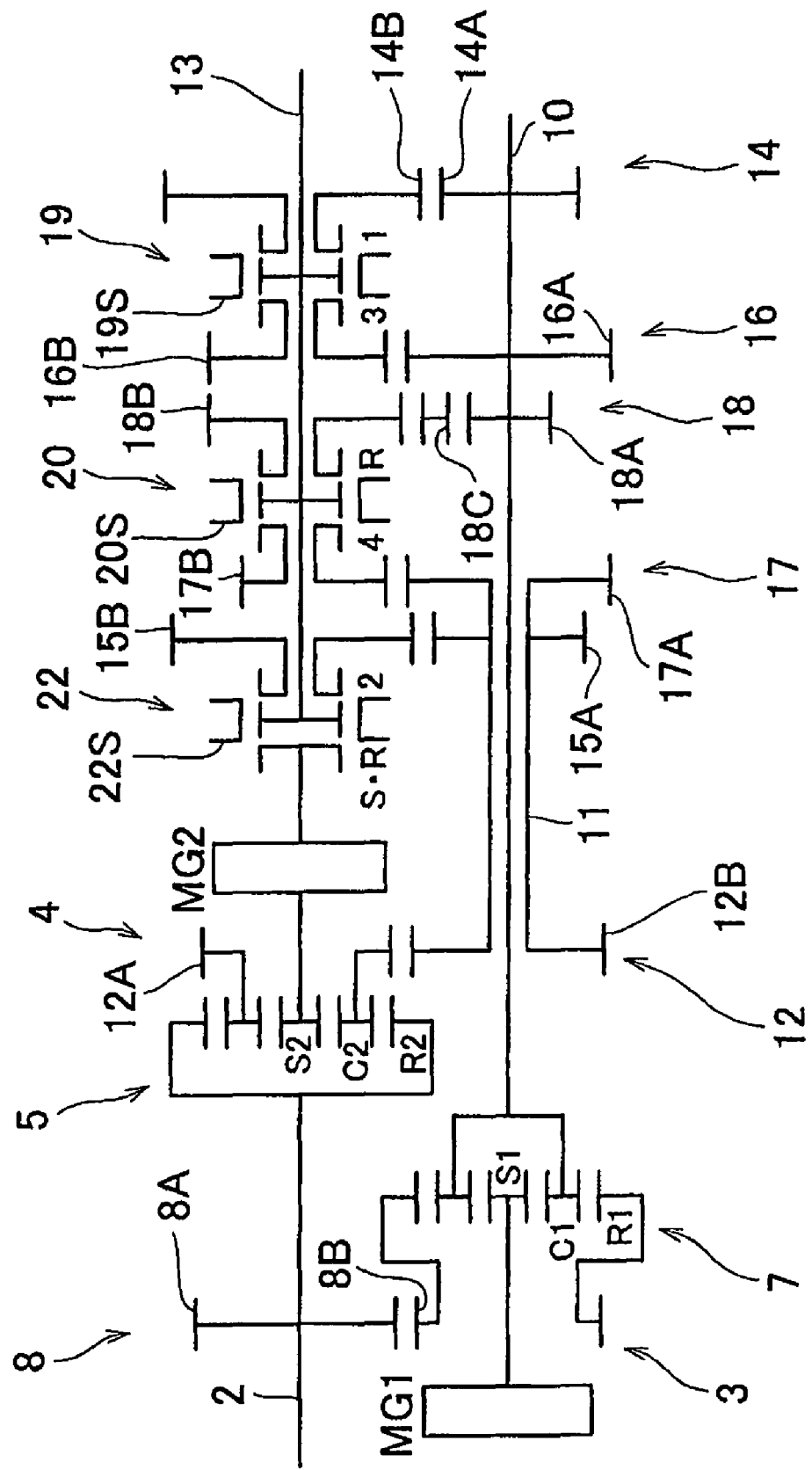
FIG. 11 is a schematic skeleton diagram showing a construction example of a transmission for a vehicle in accordance with a fifth embodiment of the invention which employs electric motor-generators as drive unit.

In a construction example of a fifth embodiment shown in FIG. 11, the first pump motor 9 and the second pump motor 6 in the construction of the second embodiment shown in FIG. 4 are replaced with a first electric motor-generator MG1 and a second electric motor-generator MG2, respectively, and the electric motor-generators MG1, MG2 are interconnected so that electric power can be sent and received therebetween.

Therefore, the transmission constructed as shown in FIG. 11, similarly to the transmission of the construction of the second embodiment shown in FIG. 4, is also able to continuously set the speed change ratio from the start of the vehicle to the fourth speed as a fixed speed change ratio so that the transmission can be caused to function as a continuously variable transmission. Incidentally, the states of operation for setting the speed change steps (gear speeds) and the intermediate speed change ratios therebetween can be collectively shown by a table obtained by replacing the first pump motor 9 (PM1) and the second pump motor 6 (PM2) in the table in FIG. 5 with the first electric motor-generator MG1 and the second electric motor-generator MG2, respectively, and further by replacing the "0" of the displacement volume with "FREE", and the "PUMP" with "POWER GENERATION", and the "MOTOR" with "POWERING".

Although in the foregoing concrete example, the driven shaft 13 is provided as an output shaft, it is also possible to adopt a construction in which an output shaft is provided separately from the driven shaft 13, and power is transmitted from the driven shaft 13 to the output shaft, and is thus output from the transmission. In that case, the output shaft may be disposed coaxially with the driving shafts 10, 11. Besides, it suffices that each drive unit in the invention be constructed so that at least a portion of the power input to the drive unit be directly output, and a portion of the input power be converted in energy force, and be thus output. The drive unit is not limited to a unit combining a differential mechanism, such as a planetary gear mechanism or the like, and a variable capacity type fluid pressure pump motor or an electric motor-generator. For example, each drive unit may be constructed only of a fluid pressure pump motor of a variable capacity type that performs a differential operation between a casing and a rotor.

Furthermore, in the invention, it is also possible to adopt a construction in which the first pump motor 9 is of a so-called two-way swing type, instead of a construction in which the second pump motor 6 is of a so-called two-way swing type. That is, it suffices that at least one of the motors be of a two-way swing type. Furthermore, in the invention, the number of fixed speed change ratios that can be set may be greater than four, or may also be smaller than four.

Figure 12:
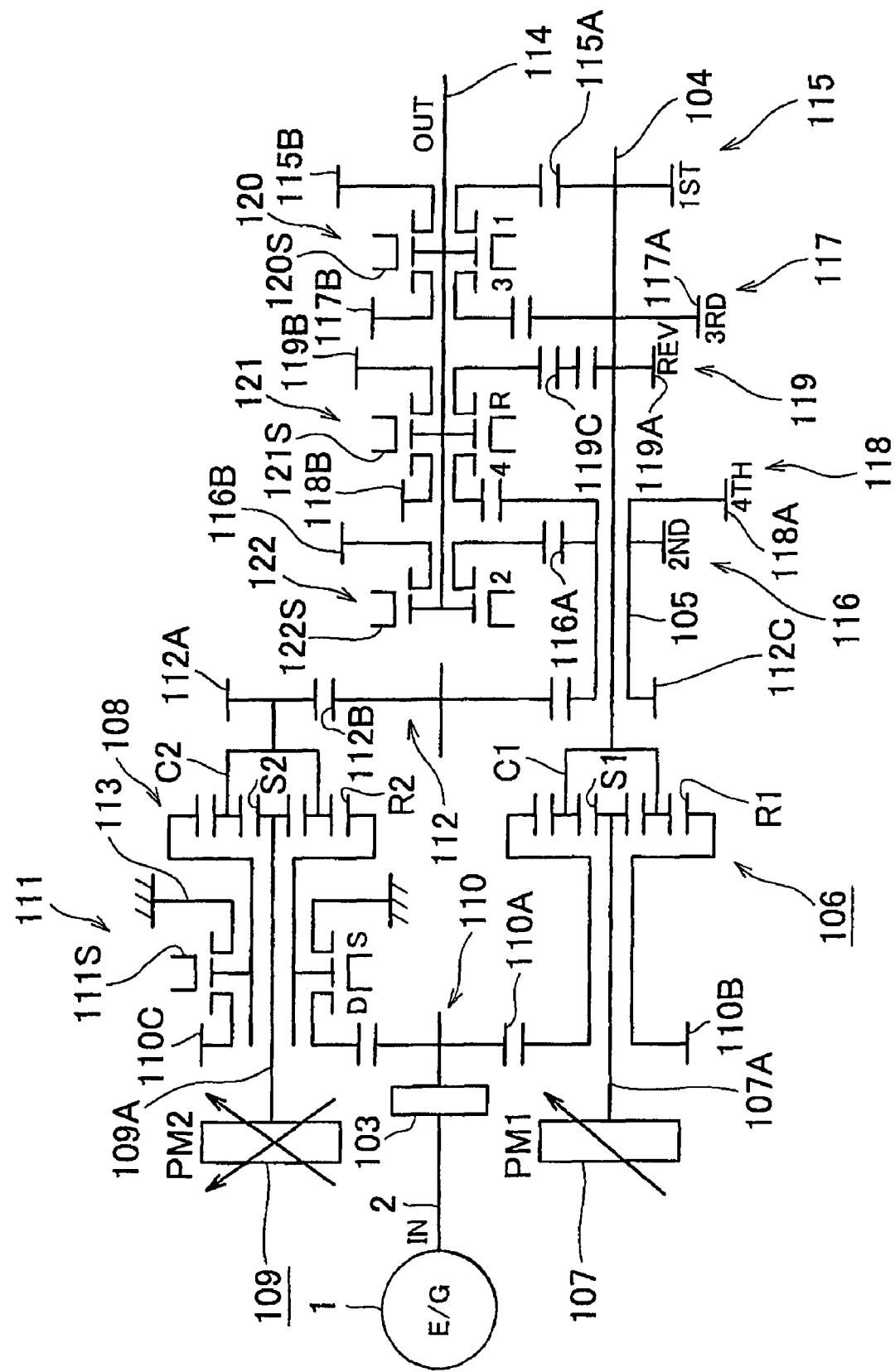
FIG. 12 is a schematic skeleton diagram showing a construction example of a transmission for a vehicle in accordance with a sixth embodiment of the invention.

Next, a vehicle transmission in accordance with a sixth embodiment of the invention will be described. FIG. 12 shows a construction example the vehicle transmission in accordance with the sixth embodiment of the invention. In this construction, four forward gear speeds and one reverse gear speed are set as so-called fixed speed change ratios that can be set without alteration in the form of power (energy) to be transmitted. In particular, this construction is adapted to an FR vehicle (a front engine, rear wheel drive vehicle) in which a motive power source 1, such as an engine or the like, is mounted in the longitudinal direction of the vehicle. Specifically, a mechanism that distributes power or transmits and shuts off power is disposed on an axis that is the same as the axis of an input member 2 linked to the motive power source 1, or an axis parallel to the axis of the input member 2.

It is to be noted herein that the motive power source 1 may be a prevalent motive power source used in vehicles, such as an internal combustion engine, an electric motor, a construction in which an engine and a motor are combined, etc. In the description below, the motive power source 1 will be provisionally termed the engine 1. Besides, it suffices that the input member 2 be a member capable of transmitting the power output by the engine 1. For example, the input member 2 may be a drive plate, an input shaft, or the like. In the description below, the input member 2 will be termed the input shaft 2. An appropriate drive transmission device, such as a damper, a clutch, a torque converter, etc., may be disposed between the engine 1 and the input shaft 2. In FIG. 12, reference character 103 represents an oil pump that is called subsidiary pump or charge pump, and is used to supply lubricating oil to various portions within the transmission, or to replenish the pressure oil for the oil passageway that is formed between hydraulic pump motors.

The mechanism disposed on each of the axes is a kind of drive transmission device that directly outputs the input power, or that directly outputs a portion of the input power and converts the other power in energy form before outputting it, and that freely rotates without performing the transmission of power. In the construction example of the sixth embodiment shown in FIG. 12, the mechanism on each axis is constructed of a differential mechanism and a reaction force mechanism that applies reaction force to the differential mechanism and is able to vary the reaction force. Briefly, as for the differential mechanism, a mechanism suffices which carries out differential operation via three rotating elements. The differential mechanism may be a mechanism that has gears and rollers as rotating elements. Examples of the gear type differential mechanism that can be used as the differential mechanism herein include a single-pinion type planetary gear mechanism, and a double-pinion type planetary gear mechanism. Besides, as for the reaction force mechanism, a mechanism suffices which is capable of selectively outputting torque, and it is possible to use a fluid type pump motor, such as a hydraulic pump motor or the like, an electric motor-generator that electrically operates, etc.

In the construction example of the sixth embodiment shown in FIG. 12, a single-pinion type planetary gear mechanism is used as the differential mechanism, and a variable capacity type hydraulic pump motor is used as the reaction force mechanism for generating reaction force (which corresponds to a motor in this invention). In the description below, a planetary gear mechanism disposed coaxially with a first driving shaft 104 and a second driving shaft 105 that are parallel to an engine 1 and an input shaft 2 will be provisionally referred to as the first planetary gear mechanism 106, and a hydraulic pump motor disposed coaxially with the first driving shaft 104 and the second driving shaft 105 will be provisionally referred to as the first pump motor 107. Furthermore, a planetary gear mechanism and a hydraulic pump motor disposed in parallel with the first planetary gear mechanism 106 and the first pump motor 107 will be provisionally referred to as the second planetary gear mechanism 108 and the second pump motor 109, respectively. In addition, in the drawings, the first pump motor 107 is sometimes referred to as PM1, and the second pump motor 109 is sometimes referred to as the PM2.

One of the first driving shaft 104 and the second driving shaft 105, that is, the second driving shaft 105 in this construction example of the sixth embodiment, has a hollow structure, and is fitted to an outer periphery of the first driving shaft 104 so that the two driving shafts are freely rotatable to each other. These driving shafts 104, 105 are disposed at a side of the first planetary gear mechanism 106 which is opposite from the first pump motor 107 in the direction of the axis.

The first planetary gear mechanism 106 is of a single-pinion type having, as rotating elements, a sun gear S1 that is an externally toothed gear, a ring gear R1 that is an internally toothed gear disposed concentrically with the sun gear S1, and a carrier C1 that retains pinions meshing with the sun gear S1 and the ring gear R1 in such a manner that the pinions are freely rotatable about their own axes and are also freely revolvable. A counter driving gear 110A of a first counter gear pair 110 is mounted on the input shaft 2, and a counter driven gear 110B meshing with the counter driving gear 110A is linked to the ring gear R1. That is, the input shaft 2 is linked to the ring gear R1 via the first counter gear pair 110. Therefore, the ring gear R1 is an input element. Besides, a rotor shaft 107A of the first pump motor 107 as a reaction force mechanism is connected to the sun gear S1. Therefore, the sun gear S1 is a reaction element. The first driving shaft 104 is connected to the carrier C1. Therefore the carrier C1 is an output element.

This first pump motor 107 is of a variable capacity type whose displacement can be varied, and, in the construction example of the sixth embodiment shown in FIG. 12, of a so-called one-way swing type whose displacement can be changed in one of positive and negative directions from zero. The first pump motor 107 is disposed at an engine 1 side of the first planetary gear mechanism 106 (the left side thereof in FIG. 12), and coaxially with the first planetary gear mechanism 106. As the first pump motor 107 of this kind, various types of pump motors can be adopted. For example, a swash plate pump, an oblique shaft pump, a radial piston pump, etc. can be used.

The second planetary gear mechanism 108 has substantially the same construction as the first planetary gear mechanism 106. That is, the second planetary gear mechanism 108 is a single-pinion type planetary gear mechanism that has, as rotating elements, a sun gear S2, a ring gear R2, and a carrier C2 that retains pinions freely rotatably and revolvably, and that performs differential operation via these three rotating elements.

As in the first planetary gear mechanism 106, a counter driven gear 110C meshing with the counter driving gear 110A mounted to the input shaft 2 is linked to the ring gear R2 via a start (S) synchronizer 111. The start synchronizer 111 corresponds to a vehicle-start switching mechanism, and is constructed so as to selectively establish a state in which torque can be transmitted between the ring gear R2 of the second planetary gear mechanism 108 and the engine 1 and so as to restrict the rotation of the ring gear R2, that is, fix the ring gear R2. Therefore, the ring gear R2 is an input element. Besides, a rotor shaft 109A of the second pump motor 109 as a reaction force mechanism is connected to the sun gear S2. Therefore, the sun gear S2 is a reaction force element. A counter driving gear 112A of a second counter gear pair 112 is mounted to the carrier C2, and a counter driven gear 112C meshing therewith via an idle gear 112B is linked to the second driving shaft 105. That is, the second driving shaft 105 is linked to the carrier C2 via the second counter gear pair 112. Therefore, the carrier C2 is an output element.

The second pump motor 109 is of a variable capacity type whose displacement volume can be varied. In the construction example of the sixth embodiment shown in FIG. 12, in particular, the second pump motor 109 is of a so-called two-way swing type whose displacement volume can be changed in both of the positive and negative directions from zero, and is disposed coaxially with the second planetary gear mechanism 108, and radially outwardly adjacent to the first pump motor 107. As for the second pump motor 109, similar to the first pump motor 107, it is possible to use various types of pump motors, for example, a swash plate pump, an oblique pump, a radial piston pump, etc.

The start synchronizer 111 as a vehicle-start switching mechanism will be described. The start synchronizer 111 is made up of, for example, a synchronous link mechanism (synchronizer), a mesh clutch (dog clutch), or a friction type clutch. The start synchronizer 111 illustrated in FIG. 12 is made up of a synchronous link mechanism. The start synchronizer 111 includes a sleeve 111S that is spline-fitted to a hub that is integrated with the ring gear R2 of the second planetary gear mechanism 108. At two opposite sides of the sleeve 111S, splines are provided which are respectively integrated with the counter driven gear 110C of the first counter gear pair 110 and with a stationary member 113 that is fixed to, for example, the casing (not shown) of the transmission).

Specifically, the splined portion integrated with the counter driven gear 110C of the first counter gear pair 110 is disposed at the left side of the sleeve 111S in FIG. 12, and the splined portion integrated with the stationary member 113 is disposed at the right side of the sleeve 111S in FIG. 12. Therefore, the start synchronizer 111 is constructed as follows. When the sleeve 111S is moved to the left side in FIG. 12, the start synchronizer 111 links the counter driven gear 110C of the first counter gear pair 110 to the ring gear R2 of the second planetary gear mechanism 108. When the sleeve 111S is moved to the right side in FIG. 12, the start synchronizer 111 links the ring gear R2 of the second planetary gear mechanism 108 to the stationary member 113 to restrict the rotation of the ring gear R2, that is, fix the ring gear R2. When the sleeve 111S is positioned at the middle position, the sleeve 111S is not engaged with either the counter driven gear 110C or the stationary member 113, that is, the start synchronizer 111 assumes a neutral state.

As described above, the second planetary gear mechanism 108 in the construction example of the sixth embodiment is constructed of a single-pinion type planetary gear mechanism in which the ring gear R2, the sun gear S2 and the carrier C2 are the input element, the reaction force element and the output element. Therefore, when the sleeve 111S of the start synchronizer 111 is moved to the right side in FIG. 12 to fix the ring gear R2, the speed of the rotation output from the carrier C2 is reduced relative to the speed of the rotation input to the sun gear S2. Specifically, the second planetary gear mechanism 108 is constructed so that when the start synchronizer 111 is operated to fix the ring gear R2, that is, the input element of the second planetary gear mechanism 108, the second planetary gear mechanism 108 operates as a speed reducing mechanism that amplifies the torque of the sun gear S2, that is, the reaction force element of the second planetary gear mechanism 108, and outputs torque from the carrier C2, that is, the output element of the second planetary gear mechanism 108, if the output torque of the second pump motor 109 is input to the sun gear S2.

Incidentally, the first counter gear pair 110 and the second counter gear pair 112 constitute a so-called input drive transmission mechanism and a so-called output drive transmission mechanism, respectively. Either of the counter gear pairs may be replaced with a drive transmission mechanism that utilizes a friction wheel, or a wrapped-around drive transmission mechanism that uses a chain, a belt or the like.

Furthermore, in the construction example of the sixth embodiment shown in FIG. 12, the first planetary gear mechanism 106 and the second planetary gear mechanism 108 are disposed so that the axes of the two mechanism are parallel to each other and the two mechanisms are placed side by side in parallel. That is, while the first planetary gear mechanism 106 is disposed on the same axis as the axis of the first driving shaft 104 and the second driving shaft 105, the second planetary gear mechanism 108 is disposed on the axis parallel to the driving shafts 104, 105, and is radially outwardly adjacent to the first planetary gear mechanism 106. Therefore, the axis length of the two planetary gear mechanisms 106, 108 can be shortened and therefore the construction of the transmission can be reduced in size, in comparison with the case where the two planetary gear mechanisms 106, 108 are dislocated from each other in the direction of the axis. In association with the side reduction of the transmission, the vehicle mountability of the transmission can be improved, and in particular, the mountability thereof in the case of FR vehicles can be improved.

The first driving shaft 104 and the second driving shaft 105 are disposed coaxially with the first planetary gear mechanism 106 and the first pump motor 107, as described above. That is, the two driving shafts, that is, the first driving shaft 104 and the second driving shaft 105, are disposed on the axis of the first planetary gear mechanism 106 and the first pump motor 107. The second driving shaft 105 has a hollow structure, and is fitted to the outer periphery side of the first driving shaft 104 so that the two driving shafts are freely rotatable to each other. The driving shafts 104, 105 are disposed at the side of the first planetary gear mechanism 106 which is opposite from the first pump motor 107 in the direction of the axis.

A driven shaft 114 to which power is transmitted from the driving shafts 104, 105 is disposed in parallel with the driving shafts 104, 105, and coaxially with the input shaft 2. Therefore, in the transmission shown in FIG. 12, a main portion thereof has a so-called two-axis structure. A plurality of drive transmission mechanisms for setting different speed change ratios are provided between the driving shafts 104, 105 and the driven shaft 114. Each of the drive transmission mechanisms is provided for setting a speed change ratio between the input shaft 2 and the driven shaft 114 in accordance with its rotation speed ratio when involved in the transmission of torque, and may be a gear mechanism, a wrapped-around drive transmission mechanism, a mechanism that uses a friction wheel, etc. In the construction example of the sixth embodiment shown in FIG. 12, four gear pairs 115, 116, 117, 118 for forward travel, and a gear pair 119 for reverse travel are provided.

The first driving shaft 104 is protruded from an end portion of the hollow structural second driving shaft 105, and to the protruded portion, a first-speed drive gear 115A and a third-speed drive gear 117A as well as a reverse drive gear 119A are mounted. The sequence of arrangement thereof is the first-speed drive gear 115A, the third-speed drive gear 117A and the reverse drive gear 119A in that order from the side of the distal end of the first driving shaft 104 (the right-side end thereof in FIG. 12). By arranging the two gears for forward travel, that is, the first-speed drive gear 115A and the third-speed drive gear 117A, in the descending order in the gear ratio (i.e., the ascending order in the pit circle radius, or the ascending order in the number of teeth), the load that acts on the bearing (not shown) that supports the distal end portion of the first driving shaft 104 is made relatively low, so that the bearing can be reduced in size.

On the second driving shaft 105, a fourth-speed drive gear 118A, a second-speed drive gear 116A and the counter driven gear 12C are disposed in that order from the distal end side (the right side in FIG. 12). Thus, the drive gears of the odd-numbered speeds are mounted to one of the first and second driving shafts 104, 105, and the drive gears of the even-numbered speeds are mounted to the other driving shaft. In other words, the drive gears 116A, 118A of the second and fourth speeds may be mounted to the first driving shaft 104, and the drive gears 115A, 117A of the first and third speeds may be mounted to the second driving shaft 105.

Driven gears 115B, 116B, 117B, 118B, 119B of the gear pairs 115, 116, 117, 118, 119 are freely rotatably fitted to and supported on the driven shaft 114. Specifically, the first-speed driven gear 115B in mesh with the first-speed drive gear 115A is freely rotatably fitted to the driven shaft 114. The third-speed driven gear 117B in mesh with the third-speed drive gear 117A is freely rotatably fitted to the driven shaft 114, and is disposed adjacent to the first-speed driven gear 115B. Furthermore, the reverse driven gear 119B in mesh with an idle gear 119C disposed between the reverse driven gear 119B and a reverse drive gear 119A is freely rotatably fitted to the driven shaft 114, so that the rotation direction of the reverse driven gear 119B and the rotation direction of the reverse drive gear 119A are the same. The fourth-speed driven gear 118B in mesh with a fourth-speed drive gear 118A is freely rotatably fitted to the driven shaft 114, and is disposed adjacent to the reverse driven gear 119B.

The second-speed driven gear 116B in mesh with a second-speed drive gear 116A is freely rotatably fitted to the driven shaft 114, and is disposed adjacent to the fourth-speed driven gear 118B. Thus, the gear pairs 115, 116, 117, 118 of the first to forth speeds correspond to a forward-speed drive transmission mechanism, and the reverse gear pair 119 corresponds to a reverse-speed drive transmission mechanism.

A switching mechanism for selectively making the gear pairs 115, 116, 117, 118, 119 able to transmit power is provided. This switching mechanism selectively link suitable ones of the gear pairs 115, 116, 117, 118, 119 to the driving shafts 104, 105 or to the driven shaft 114. Therefore, the switching mechanism can employ synchronous link mechanisms (synchronizer) in related-art manual transmissions or the like, or mesh clutches (dog clutches), friction clutches, etc. Besides, if the aforementioned driven gears are mounted integrally to the driven shaft 114, the drive gears may be disposed freely rotatably relative to the drive shaft, and the switching mechanism may be provided on the driving shaft side so as to selectively link the driven gears to the driving shaft.

In the construction example of the sixth embodiment shown in FIG. 12, the switching mechanism used therein is a synchronous link mechanism in which a first synchronizer 120 is disposed between the first-speed driven gear 115B and the third-speed driven gear 117B, and a second synchronizer 121 is disposed between reverse driven gear 119B and fourth-speed driven gear 118B, and a third synchronizer 122 is disposed adjacent to the second-speed driven gear 116B. In these synchronizers 120, 121, 122, as those used in related-art manual transmissions, a sleeve is spline-fitted to a hub integrated with the driven shaft 114, and each driven gear is provided with a chamfer or a spline formed integrally therewith to which the sleeve is gradually spline-fitted when the sleeve is moved in the direction of the axis. Furthermore, a ring is provided which gradually comes into friction contact with a predetermined member provided on the driven gear side so as to synchronize the rotation in accordance with the movement of the sleeve.

Therefore, the first synchronizer 120 is constructed as follows. That is, when a sleeve 120S thereof is moved to the right side in FIG. 12, the first synchronizer 120 links the first-speed driven gear 115B to the driven shaft 114. When the sleeve 120S is moved to the left side in FIG. 12, the first synchronizer 120 links the third-speed driven gear 117B to the driven shaft 114. Furthermore, when the sleeve 120S is positioned at the middle position, the sleeve 120S is not engaged with either of the driven gears 115B, 117B, that is, the first synchronizer 120 assumes a neutral state. Likewise, the second synchronizer 121 links the reverse driven gear 119B to the driven shaft 114 when a sleeve 121S thereof is move to the right side in FIG. 12. When the sleeve 121S is moved to the left side in FIG. 12, the second synchronizer 121 links the fourth-speed driven gear 118B to the driven shaft 114. Furthermore, when the sleeve 121S is positioned at the middle position, the sleeve 121S is not engaged with either of the driven gears 119B, 118B, that is, the second synchronizer 121 assumes a neutral state. Furthermore, the third synchronizer 122 links the second-speed driven gear 116B to the driven shaft 114 when a sleeve 122S thereof is moved to the right side in FIG. 12. When the sleeve 122S is positioned at the middle position, the third synchronizer 122 assumes a neutral state in which the sleeve 122S is not engaged with the second-speed driven gear 116B.

The sleeves 120S, 121S, 122S and the sleeve 111S of the synchronizers 120, 121, 122 and the start synchronizer 111 can be constructed so as to be caused to perform a switching action through a manual operation via a linkage arrangement (not shown), or can be constructed so as to be caused to perform a switching action through the use of actuators (not shown) that are provided individually for the sleeves. Besides, the displacement volume of each of the pump motors 107, 109, or the operation of the actuators is electrically controlled by an electronic control device (ECU) (not shown). The electronic control device is constructed mainly of a microcomputer, and performs computations in accordance with input data and pre-stored data and programs so as to set a displacement volume or to output a command signal for operating the synchronizers 111, 120, 121, 122.

Figure 13:
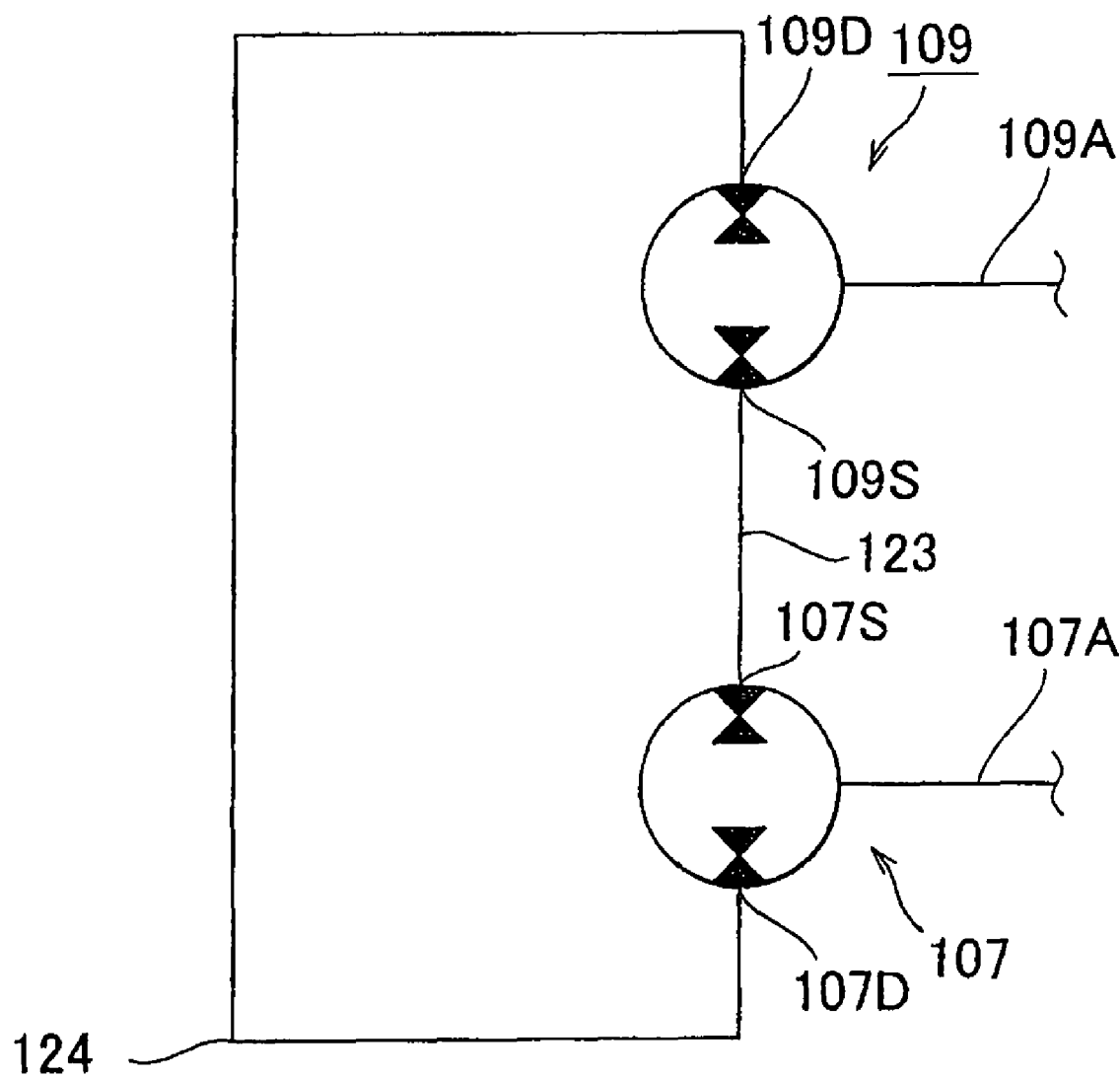
FIG. 13 is a schematic diagram for describing the states of communication of pump motors of the transmission shown in FIG. 12.

A hydraulic circuit regarding each of the pump motors 107, 109 will be briefly described. As shown in FIG. 13, the pump motors 107, 109 communicate with each other via a closed circuit. Specifically, input ports 107S, 109S of the pump motors 107, 109 are interconnected in communication by an oil passageway 123, and ejection ports 107D, 109D thereof are interconnected in communication by an oil passageway 124. The input port of each pump motor is a port that becomes relatively low in pressure when the displacement volume is set so as to give a reaction force to the planetary gear mechanism when the vehicle travels forward, and, conversely, the port that becomes relatively high in pressure in that case is the ejection port. The hydraulic closed circuit constructed as described above, since inevitable leakage of pressure oil occurs, the aforementioned charge pump 103 for replenishing the pressure oil may be connected to the foregoing closed circuit.

Next, operation of the foregoing transmission will be described. FIG. 14 is a table that collectively illustrates the states of operation of the first and second pump motors (PM1, PM2) 107, 109 and the synchronizers 111, 120, 121, 122 for the setting of each of the speed change steps (gear speeds) determined by the gear ratios of the corresponding gear pairs 115, 116, 117, 118, 119. In FIG. 14, "0" with regard to the pump motors 107, 109 indicates a state in which the pump capacity (displacement volume) of the pump motor is set substantially at zero, so that the pump motor does not produce pressure oil even if the rotor shaft thereof is rotated, and so that the output shaft thereof does not rotate (is in a free state) even if the hydraulic pump motor is supplied with pressure oil, and "LOCK" indicates a state in which the rotor of the hydraulic pump motor is stopped so as not to rotate. Furthermore, "PUMP" indicates a state in which the pump capacity is set greater than substantial zero and pressure oil is being ejected, and therefore a corresponding one of the first and second pump motors 107, 109 is functioning as a pump. Still further, "MOTOR" indicates a state in which the corresponding pump motor 109 (or 107) is supplied with the pressure oil ejected by the other first pump motor 107 (or 109), and is functioning as a motor, and therefore is generating shaft torque.

Further, in FIG. 14, "RIGHT" and "LEFT" with regard to the synchronizers 111, 120, 121, 122 indicate the position, in FIG. 12, of the sleeve 111S, 120S, 121S, 122S of the corresponding one of the synchronizers 111, 120, 121, 122, and the round parentheses indicate the downshift stand-by state, and the angled parentheses indicate the stand-by state for an upshift, and "N" indicates a state in which the corresponding synchronizer 111, 120, 121, 122 is set to the OFF state (neutral position), and "N" in italic type indicates that the synchronizer is set to the OFF state (neutral position) in order to reduce the drag.

When the neutral position is selected and the neutral state is to be set, the displacement volume of each of the pump motors 107, 109 is set at zero, and the synchronizers 111, 120, 121, 122 are set to the "OFF" state. That is, each of the sleeves 111S, 120S, 121S, 122S is set to its middle position. Therefore, the neutral state in which none of the gear pairs 115, 116, 117, 118, 119 are linked to the driven shaft 114 is assumed. As a result, the pump motors 107, 109 assume a so-called freewheeling state. Therefore, even if torque is transmitted from the engine 1 to the ring gears R1, R2 of the planetary gear mechanisms 106, 108, reaction force does not act on the sun gears S1, S2, so that torque is not transmitted to either of the driving shafts 104, 105 linked to the carriers C1, C2, which are output elements.

When the selector lever position is switched to a travel position, such as a drive position or the like, the sleeve 120S of the first synchronizer 120, the sleeve 122S of the third synchronizer 122, and the sleeve 111S of the first synchronizer 111 are moved to the right side in FIG. 11, while the second synchronizer 121 remains set in the OFF state. Therefore, the first-speed driven gear 115B and the second-speed driven gear 116B are linked to the driven shaft 114, and therefore the ring gear R2 of the second planetary gear mechanism 108 is linked to the stationary member 113. As a result, the first driving shaft 104 and the driven shaft 114 are linked via the first-speed gear pair 115, and the second driving shaft 105 and the driven shaft 114 are linked via the second-speed gear pair 116. Besides, the ring gear R2 of the second planetary gear mechanism 108 is fixed.

Specifically, the state of linkage of the gear pairs becomes a state for setting the first speed and the second speed. Furthermore, since the ring gear R2 of the second planetary gear mechanism 108 is fixed, the second planetary gear mechanism 108 will function as a speed-reducing mechanism in which the rotation speed of the carrier C2, that is, the output element of the second planetary gear mechanism 108, is reduced relative to the rotation speed of the sun gear S2 when the torque output by the second pump motor 109 is input to the sun gear S2 via the rotor shaft 109A, in other words, will function as a speed-reducing mechanism in which the torque of the carrier C2, that is, the output element of the second planetary gear mechanism 108, is amplified relative to the torque of the sun gear S2 when the torque output by the second pump motor 109 is input to the sun gear S2 via the rotor shaft 109A.

Thus, at the time of starting the vehicle, the switching of the selector lever position to a travel position causes formation of two power transmission paths: a power transmission path in which the power of the engine 1 is transmitted to the driven shaft 114 via the first planetary gear mechanism 106, the first driving shaft 104 and the first-speed gear pair 115; and a power transmission path in which the torque output by the second pump motor 109 is amplified by the second planetary gear mechanism 108, and then is transmitted to the driven shaft 114 via the second counter gear pair 112, the second driving shaft 105 and the second-speed gear pair 116.

In this state, since the vehicle is still at rest, the carrier C1 of the first planetary gear mechanism 106 is at rest while the ring gear R1 is receiving power from the engine 1, so that the sun gear S1 is rotating in the direction opposite to the rotation direction of the ring gear R1. From this state, the displacement volumes of the pump motors 107, 109 are gradually increased so that the first pump motor 107 is firstly caused to function as a pump and generate oil pressure. Then, the corresponding reaction force acts on the sun gear S1 in the first planetary gear mechanism 106, so that the carrier C1 is provided with torque that rotates the carrier C1 in the same direction as the ring gear R1. As a result, power is transmitted to the driven shaft 114 via the first-speed gear pair 115.

At this time, since the first pump motor 107 undergoes so-called reverse rotation and functions as a pump, the first pump motor 107 ejects pressure oil from its suction port 107S, and the pressure oil is supplied to the suction port 109S of the second pump motor 109. As a result, the second pump motor 109 functions as a motor so that torque in the so-called normal rotation direction is output from the rotor shaft 109A, and the torque is input to the sun gear S2 of the second planetary gear mechanism 108. At this time, the second planetary gear mechanism 108 functions as a speed-reducing mechanism in which the ring gear R2 is fixed and the carrier C2 acts as an output element as described above. Therefore, the torque input to the sun gear S2 is amplified by the second planetary gear mechanism 108, and then is transmitted to the driven shaft 114 via the second counter gear pair 112, the second driving shaft 105 and the second-speed gear pair 116. That is, the torque output from the second pump motor 109 is amplified, and is transmitted to the driven shaft 114.

Thus, in the construction as shown in FIG. 12, the torque of the second pump motor 109 can be sufficiently amplified at the time of start of the vehicle. For example, the output torque To at the time of start of the vehicle can be expressed as in:

$$To = \kappa a \times (1+\rho 1) \times \kappa 1_{st} \times Tin + (1+\rho 2)/\rho 2 \times \kappa b \times \kappa c \times \kappa 2_{nd} \times Tpm2$$

where κa is the gear ratio of the first counter gear pair 110; κb is the gear ratio between the counter driving gear 112A and the idle gear 112B in the second counter gear pair 112; κc is the gear ratio between the idle gear 112B and the counter driven gear 112C in the second counter gear pair 112; $\kappa 1_{st}$ is the gear ratio of the first-speed gear pair 115; $\kappa 2_{nd}$ is the gear ratio of the second-speed gear pair 116; ρ1 is the gear ratio of the first planetary gear mechanism 106 (the value obtained by dividing the number of teeth of the sun gear by the number of teeth of the ring gear); ρ2 is the gear ratio of the second planetary gear mechanism 108 (the value obtained by dividing the number of teeth of the sun gear by the number of teeth of the ring gear); Tin is the input torque that is input to the input shaft 2; and Tpm2 is the torque of the second pump motor 109.

Since the gear ratio ρ2 of the second planetary gear mechanism 108 is limited to equal to or greater than about 0.3 and less than or equal to about 0.6 due to the mechanism, ρ2=0.5 is provisionally assumed. With further assumptions of the gear ratios κb, κc of the second counter gear pair 112 being as κb=κc=1.0, and $\kappa 2_{nd}$=2.5, the foregoing equation is rewritten into:

$$To = \kappa a \times (1+\rho 1) \times \kappa 1_{st} \times Tin + 7.5 \times Tpm2$$

Thus, the torque of the second pump motor 109 can be made sufficiently large (amplified to 7.5 times), and the output torque can be correspondingly increased. Therefore, the second pump motor 109 can be reduced in size, so that the construction of the transmission as a whole can be reduced in size and weight.

Thus, when the vehicle starts, a portion of the power input from the engine 1 is transmitted to the driven shaft 114 via the first planetary gear mechanism 106 and the first-speed gear pair 115, and the other portion of the power is converted in energy form into the flowage of pressure oil, and then is transmitted to the second pump motor 109, from which amplified torque is transmitted to the driven shaft 114. Thus, at the time of start of the vehicle, the so-called mechanical power transmission and the power transmission via fluid are performed, and torque is amplified in the case of the power transmission via fluid. The power combining such powers is output to the driven shaft 114. That is, at the time of start of the vehicle, the torque output by the second pump motor 109 can be amplified and added to the torque that the transmission outputs. In other words, when the vehicle starts, the output torque of the second pump motor 109 can be amplified and then transmitted to the driven shaft 114. This power transmission line, combined with the power transmission line in which power is transmitted to the driven shaft 114 via the first planetary gear mechanism 106, the first driving shaft 104 and the first-speed gear pair 115, realizes the establishment of two power transmission lines. As a result, at the time of start of the vehicle when large drive force is required, larger drive torque can be obtained, and the vehicle acceleration from standstill can be improved.

In the power transmission state as described above, the torque that appears on the driven shaft 114 is larger than in the case where power is transmitted only by the mechanical transmission via the first-speed gear pair 115, so that the speed change ratio of the transmission as a whole is larger than the so-called fixed speed change ratio determined by the first-speed gear pair 115. Besides, the speed change ratio changes in accordance with the proportion of the power transmission via fluid. Therefore, as the rotation speed of the sun gear S2 of the second planetary gear mechanism 108 and the second pump motor 109 linked to the sun gear S2 gradually approaches zero, the proportion of the power transmission via fluid declines and the speed change ratio of the transmission as a whole approaches the fixed speed change ratio of the first speed. Then, by increasing the displacement volume of the first pump motor 107 to a maximum and then stopping the rotation of the first pump motor 107, the first speed as a fixed speed change ratio is established.

While this state is held, the displacement volume of the second pump motor 109 is set at zero, so that the second pump motor 109 freewheels. At the same time, the first pump motor 107 is locked, so that the rotation thereof stops. Specifically, the closed circuit connecting the pump motors 107, 109 in communication is closed or shut down by the second pump motor 109, so that the first pump motor 107 whose displacement volume has been maximized becomes unable to supply or eject pressure oil, and the rotation thereof stops. As a result, the sun gear S1 of the first planetary gear mechanism 106 receives a torque that stops the sun gear S2. Therefore, in the first planetary gear mechanism 106, power is input to the ring gear R1, with the sun gear S1 fixed. Therefore, the carrier C1 that is the output element is provided with torque that rotates the carrier C1 in the same direction as the ring gear R1, and the torque is transmitted to the driven shaft 114 as an output shaft via the first driving shaft 104 and the first-speed gear pair 115. Thus, the first speed as a fixed speed change ratio is set.

During the state of the first speed, if the start synchronizer 111 and the third synchronizer 122 are set to the OFF state, that is, if the sleeve 111S and the sleeve 121S thereof are set at their neutral positions, the second pump motor 109 is not passively rotated, so that the loss of power caused by the so-called drag can be avoided. If the sleeve 111S of the start synchronizer 111 is moved to the left side in FIG. 12 to link the counter driven gear 110C of the first counter gear pair 110 to the ring gear R2 of the second planetary gear mechanism 108 while the sleeve 120S of the first synchronizer 120 and the sleeve 122S of the third synchronizer 122 are kept to the right side in FIG. 12 and the second synchronizer 122 is kept in the OFF state, the input shaft 2 is linked to the driven shaft 114 via the first counter gear pair 110, the second planetary gear mechanism 108, the second counter gear pair 112, the second driving shaft 105 and the second-speed gear pair 116. Thus, a stand-by state for the upshift to the second speed as a fixed speed change ratio is obtained. On the other hand, if the sleeve 111S of the start synchronizer 111 is moved to the right side in FIG. 12 to establish a state in which torque can be transmitted between the rotor shaft 109A of the second pump motor 109 and the driven shaft 114, a downshift stand-by state for setting a speed change ratio that is greater than the first speed is obtained.

During the stand-by state for the upshift from the first speed to the second speed, the second pump motor 109 and the sun gear S2 linked thereto are rotating in the direction opposite to the rotation direction of the ring gear R2. Therefore, if the displacement volume of the second pump motor 109 is increased in the positive direction, the second pump motor 109 comes to function as a pump, and reaction force associated therewith acts on the sun gear S2. As a result, the torque combining the torque input to the ring gear R2 and the reaction force that acts on the sun gear S2 acts on the carrier C2, so that the carrier C2 rotates in the normal direction and the rotation speed thereof gradually increases. In other words, the rotation speed of the engine 1 is gradually lowered. From the carrier C2, torque is transmitted to the driven shaft 114 via the second counter gear pair 112, the second driving shaft 105 and the second-speed gear pair 116.

The pressure oil produced by the second pump motor 109 functioning as a pump is supplied from its suction port 109S to the suction port 107S of the first pump motor 107. Hence, the first pump motor 107 functions as a motor, and outputs torque in the normal rotation direction. This torque acts on the sun gear S1 of the first planetary gear mechanism 106. Since power is being input to the ring gear R1 of the first planetary gear mechanism 106 from the engine 1, the torque caused by the input power and the torque that acts on the sun gear S1 are combined, and the combined torque is output from the carrier C1 to the first driving shaft 104. That is, the transmission of power via oil pressure occurs in parallel or simultaneously with the mechanical transmission of power, so that the power combining such powers is transmitted to the driven shaft 114. Then, as the rotation speed of the second pump motor 109 gradually declines, the proportion of the mechanical power transmission via the second planetary gear mechanism 108 and the second-speed gear pair 116, so that the speed change ratio of the transmission as a whole gradually declines from the speed change ratio determined by the first-speed gear pair 115 to the speed change ratio determined by the second-speed gear pair 116. In this case, the change is also a continuous variation as in the foregoing case where the speed change ratio varies to the first speed as a fixed speed change ratio after the vehicle has started. That is, the stepless or continuously variable speed change is accomplished. Then, by increasing the displacement volume of the second pump motor 109 to the maximum and then stopping the rotation thereof, the second speed as a fixed speed change ratio is established.

While this state is held, the displacement volume of the first pump motor 107 is set at zero, so that the first pump motor 107 freewheels. At the same time, the second pump motor 109 is locked, so that the rotation thereof stops. Specifically, the closed circuit connecting the pump motors 107, 109 in communication is closed or shut down by the first pump motor 107, so that the second pump motor 109 whose displacement volume has been maximized becomes unable to supply or eject pressure oil, and the rotation thereof stops. As a result, the sun gear S2 of the second planetary gear mechanism 108 receives a torque that fixes the sun gear S2. Therefore, in the second planetary gear mechanism 108, power is input to the ring gear R2, with the sun gear S2 fixed. Therefore, the carrier C2 that is the output element is provided with torque that rotates the carrier C2 in the same direction as the ring gear R2, and the torque is transmitted to the driven shaft 114 as an output shaft via the second counter gear pair 112, the second driving shaft 105 and the second-speed gear pair 116. Thus, the second speed as a fixed speed change ratio is set.

During the state of the second speed, if the first synchronizer 120 is set to the OFF state, that is, if the sleeve 120S thereof is set at the neutral position, the first pump motor 107 is not passively rotated, so that the loss of power caused by the so-called drag can be avoided. Furthermore, if the sleeve 120S of the first synchronizer 120 is moved to the left side in FIG. 12 to link the third-speed driven gear 117B to the driven shaft 114, a stand-by state for the upshift to the third speed as a fixed speed change ratio is obtained. On the other hand, if the sleeve 120S of the first synchronizer 120 is moved to the right side in FIG. 12 to link the first-speed driven gear 115B to the driven shaft 114, a stand-by state for the downshift to the first speed is obtained.

During the stand-by state for the upshift from the second speed to the third speed, the first pump motor 107 and the sun gear S1 linked thereto are rotating in the direction opposite to the rotation direction of the ring gear R1. Therefore, if the displacement volume of the first pump motor 107 is increased in the positive direction, the first pump motor 107 comes to function as a pump, and reaction force associated therewith acts on the sun gear S1. As a result, the torque combining the torque input to the ring gear R1 and the reaction force that acts on the sun gear S1 acts on the carrier C1, so that the carrier C1 rotates in the normal direction. In turn, the torque thereof is transmitted to the driven shaft 114 that is the output shaft, via the first driving shaft 104 and the third-speed gear pair 117. Besides, as the speed change ratio declines, the rotation speed of the engine 1 is gradually lowered.

The pressure oil produced by the first pump motor 107 functioning as a pump is supplied from its suction port 107S to the suction port 109S of the second pump motor 109. Hence, the second pump motor 109 functions as a motor to output torque in the normal rotation direction. This torque acts on the sun gear S2 of the second planetary gear mechanism 108. Since power is being input to the ring gear R2 of the second planetary gear mechanism 108 from the engine 1, the torque caused by the input power and the torque that acts on the sun gear S2 are combined, and the combined torque is output from the carrier C2 to the second driving shaft 105 via the second counter gear pair 112. That is, the transmission of power via oil pressure occurs in parallel or simultaneously with the mechanical transmission of power, so that the power combining such powers is transmitted to the driven shaft 114. Then, as the rotation speed of the first pump motor 107 gradually declines, the proportion of the mechanical power transmission via the first planetary gear mechanism 106 and the third-speed gear pair 117 gradually increases, so that the speed change ratio of the transmission as a whole gradually declines from the speed change ratio determined by the second-speed gear pair 116 to the speed change ratio determined by the third-speed gear pair 117. In this case, the change is also a continuous variation as in the foregoing case where the speed change ratio varies to the first speed as a fixed speed change ratio after the vehicle has started, or the case of the upshift from the first speed to the second speed. That is, the stepless or continuously variable speed change is accomplished. Then, by increasing the displacement volume of the first pump motor 107 to the maximum and then stopping the rotation thereof, the third speed as a fixed speed change ratio is established.

While this state is held, the displacement volume of the second pump motor 109 is set at zero, so that the second pump motor 109 freewheels. At the same time, the first pump motor 107 is locked, so that the rotation thereof stops. Specifically, the closed circuit connecting the pump motors 107, 109 in communication is closed or shut down by the second pump motor 109, so that first pump motor 107 whose displacement volume has been maximized becomes unable to supply or eject pressure oil, and the rotation thereof stops. As a result, the sun gear S1 of the first planetary gear mechanism 106 receives a torque that fixes the sun gear S1. Therefore, in the first planetary gear mechanism 106, power is input to the ring gear R1, with the sun gear S1 fixed. Therefore, the carrier C1 that is the output element is provided with torque that rotates the carrier C1 in the same direction as the ring gear R1, and the torque is transmitted to the driven shaft 114 as an output shaft via the first driving shaft 104, and the third-speed gear pair 117. Thus, the third speed as a fixed speed change ratio is set.

During the state of the third speed, if the second synchronizer 121 and the third synchronizer 122 are set to the OFF state, that is, if the sleeve 121S and the sleeve 122S thereof are set at their neutral positions, the second pump motor 109 is not passively rotated, so that the loss of power caused by the so-called drag can be avoided. Furthermore, if while the third synchronizer 122 is kept in the OFF state, the sleeve 121S of the second synchronizer 121 is moved to the left side in FIG. 12 to link the fourth-speed driven gear 118B to the driven shaft 114, a stand-by state for the upshift to the fourth speed as a fixed speed change ratio is obtained. On the other hand, if while the second synchronizer 121 is kept in the OFF state, the sleeve 122S of the third synchronizer 122 is moved to the right side in FIG. 12 to link the second-speed driven gear 116B to the driven shaft 114, a stand-by state for the downshift to the second speed is obtained.

During the stand-by state for the upshift from the third speed to the fourth speed, the second pump motor 109 and the sun gear S2 linked thereto are rotating in the direction opposite to the rotation direction of the ring gear R2. Therefore, if the displacement volume of the second pump motor 109 is increased in the positive direction, the second pump motor 109 comes to function as a pump, and reaction force associated therewith acts on the sun gear S2. As a result, the torque combining the torque input to the ring gear R2 and the reaction force that acts on the sun gear S2 acts on the carrier C2, so that the carrier C2 rotates in the normal direction. In turn, the torque thereof is transmitted to the second driving shaft 105 via the second counter gear pair 112, and is further transmitted to the driven shaft 114 that is the output shaft, via the fourth-speed gear pair 114. Besides, as the speed change ratio declines, the rotation speed of the engine 1 is gradually lowered.

The pressure oil produced by the second pump motor 109 functioning as a pump is supplied from its suction port 109S to the suction port 107S of the first pump motor 107. Hence, the first pump motor 107 functions as a motor to output torque in the normal rotation direction. This torque acts on the sun gear S1 of the first planetary gear mechanism 106. Since power is being input to the ring gear R1 of the first planetary gear mechanism 106 from the engine 1, the torque caused by the input power and the torque that acts on the sun gear S1 are combined, and the combined torque is output from the carrier C1 to the first driving shaft 104 via the second counter gear pair 112. That is, the transmission of power via oil pressure occurs in parallel or simultaneously with the mechanical transmission of power, so that the power combining such powers is transmitted to the driven shaft 114. Then, as the rotation speed of the second pump motor 109 gradually declines, the proportion of the mechanical power transmission via the second planetary gear mechanism 108 and the fourth-speed gear pair 118 gradually increases, so that the speed change ratio of the transmission as a whole gradually declines from the speed change ratio determined by the third-speed gear pair 117 to the speed change ratio determined by the fourth-speed gear pair 118. In this case, the change is also a continuous variation as in the foregoing shifts between the fixed speed change ratios. That is, the stepless or continuously variable speed change is accomplished. Then, by increasing the displacement volume of the second pump motor 109 to the maximum and then stopping the rotation thereof, the fourth speed as a fixed speed change ratio is established.

While this state is held, the displacement volume of the first pump motor 107 is set at zero, so that the first pump motor 107 freewheels. At the same time, the second pump motor 109 is locked, so that the rotation thereof stops. Specifically, the closed circuit connecting the pump motors 107, 109 in communication is closed or shut down by the first pump motor 107, so that the second pump motor 109 whose displacement volume has been maximized becomes unable to supply or eject pressure oil, and the rotation thereof stops. As a result, the sun gear S2 of the second planetary gear mechanism 108 receives a torque that fixes the sun gear S2. Therefore, in the second planetary gear mechanism 108, power is input to the ring gear R2, with the sun gear S2 fixed. Therefore, the carrier C2 that is the output element is provided with torque that rotates the carrier C2 in the same direction as the ring gear R2, and the torque is transmitted to the second driving shaft 105 via the second counter gear pair 112, and is further transmitted to the driven shaft 114 as an output shaft via the fourth-speed gear pair 118. Thus, the fourth speed as a fixed speed change ratio is set.

During the state of the fourth speed, if the first synchronizer 120 is set to the OFF state, that is, if the sleeve 120S thereof is set at the neutral position, the first pump motor 107 is not passively rotated, so that the loss of power caused by the so-called drag can be avoided. Besides, if the sleeve 120S of the first synchronizer 120 is moved to the left side in FIG. 12 to link the third-speed driven gear 117B to the driven shaft 114, a stand-by state for the downshift to the third speed is obtained.

Next, the reverse gear speed will be described. If a command to set the reverse gear speed is output, for example, by switching the selector lever position from the neutral position to the reverse position, the sleeve 111S of the start synchronizer 111 is moved to the right side in FIG. 12 so that the ring gear R2 of the second planetary gear mechanism 108 is linked to the stationary member 113 and thus the ring gear R2 assumes a fixed state. Furthermore, the sleeve 121A of the second synchronizer 121 and the sleeve 122S of the third synchronizer 122 are both moved to the right side in FIG. 12 so that the reverse driven gear 119B and the second-speed driven gear 116B are linked to the driven shaft 114. This forms two power transmission paths: a power transmission path that extends from the input shaft 2 to the driven shaft 114 via the first planetary gear mechanism 106, the first driving shaft 104 and the reverse gear pair 119; and a power transmission path that extends from the rotor shaft 109A of the second pump motor 109 to the driven shaft 114 via the second planetary gear mechanism 108, the second counter gear pair 112, the second driving shaft 105 and the second-speed gear pair 116.

While this state is held, the displacement volume of the first pump motor 107 is gradually increased. At the same time, the displacement volume of the second pump motor 109 is gradually increased in the negative direction, contrary to the foregoing cases of the forward gear speeds (forward travel). While the vehicle is at rest, the driven shaft 114 is not rotating, and therefore the second pump motor 109 linked to the driven shaft 114 is at rest. In the first planetary gear mechanism 106, on the other hand, power is being input to the ring gear R1 from the engine 1 while the carrier C1 linked to the first driving shaft 104 is fixed. Therefore, the sun gear S1 and the first pump motor 107 linked thereto are rotating in the direction opposite to the rotation direction of the ring gear R2.

Therefore, if the torque capacity of the first pump motor 107 is gradually increased, the first pump motor 107 comes to function as a pump to generate oil pressure. Since reaction force associated with the operation of the first pump motor 107 acts on the sun gear S1, the carrier C1 that is the output element is provided with torque that rotates the carrier C1 in the same direction as in the case of forward travel. This torque is transmitted to the first driving shaft 104. Since the reverse gear pair 119 disposed between the first driving shaft 104 and the driven shaft 114 includes the idle gear 119C, the rotation of the first driving shaft 104 in the same direction as in the case of forward travel results in the driven shaft 114 rotating in the opposite direction, so that the vehicle travels rearward.

The pressure oil produced by the first pump motor 107 functioning as a pump is supplied from its suction port 107S to the suction port 109S of the second pump motor 109. Since the displacement volume of the second pump motor 109 is set on the negative side as mentioned above, the second pump motor 109, with the pressure oil supplied to the suction port 109S, rotates in the direction opposite to the rotation direction thereof in the case of forward travel, and the torque is transmitted to the driven shaft 114 via the second planetary gear mechanism 108, the second counter gear pair 112, the second driving shaft 105 and the second-speed gear pair 116.

At this time, since the ring gear R2 of the second planetary gear mechanism 108 is fixed, the second planetary gear mechanism 108 functions as a speed-reducing mechanism in which the carrier C2 acts as an output element as in the foregoing operation performed at the time of start of the vehicle. Therefore, the torque input to the sun gear S2 is amplified by the second planetary gear mechanism 108, and then is transmitted to the driven shaft 114 via the second counter gear pair 112, the second driving shaft 105 and the second-speed gear pair 116. That is, the torque output from the second pump motor 109 is amplified and then transmitted to the driven shaft 114.

Therefore, a portion of the power input from the engine 1 is transmitted to the driven shaft 114 via the first planetary gear mechanism 106 and the reverse gear pair 119, and the other portion of the power is converted in energy form into the flowage of pressure oil, and then is transmitted to the second pump motor 109, from which amplified torque is transmitted to the driven shaft 114. That is, at the time of reverse travel, similarly to the time of start of forward travel, the so-called mechanical power transmission and the power transmission via fluid are performed, and torque is amplified in the case of the power transmission via fluid. The power combining such powers is output to the driven shaft 114. Therefore, similarly to the time of start of forward travel, at the time of start of reverse travel when large drive force is required, too, larger drive torque can be obtained.

Then, by gradually increasing the displacement volume of the first pump motor 107, the rotation speed thereof gradually declines, and correspondingly the proportion of the power transmission via fluid gradually declines, so that the speed change ratio gradually declines to the speed change ratio that is determined by the gear ratio of the reverse gear pair 119. That is, the speed change ratio continuously varies. Then, when the displacement volume of each of the pump motors 107, 109 is maximized, the reverse gear speed as a fixed speed change ratio is set.

As described above, the transmission shown in FIG. 12 is able to set speed change ratios of four forward gear speeds and one reverse gear speed as so-called fixed speed change ratios that can be set without involvement of the fluid drive transmission, and is also able to continuously set the speed change ratio between the fixed speed change ratios. Thus, the transmission in FIG. 12 is able to perform the stepless or continuously variable speed change in a wide range of speed change ratio as a whole. Besides, since a so-called two-axis construction is provided in which a main portion of the transmission has two axes on which the driving shafts 104, 105 and the driven shaft 114 as well as the planetary gear mechanisms 106, 108 and the pump motors 107, 109 and other rotation members are disposed, the outside diameter can be reduced as a whole, and the construction of the transmission as a whole can be reduced in size. Furthermore, the planetary gear mechanisms 106, 108 as well as the pump motors 107, 109 are disposed adjacent to each other, that is, are disposed so that the two mechanisms or motors are not dislocated from each other in the direction of the axis. Therefore, the length of the transmission in the directing of the axis can be shortened, and the construction of the transmission as a whole can be reduced in size. Besides, since power can be output on an extension of the center axis of rotation of the engine 1 or an axis parallel to the center axis, the mountability of the transmission can be made excellent particularly for FR vehicles.

Furthermore, when the vehicle starts in the forward direction or the reverse direction, the ring gear R2 of the second planetary gear mechanism 108 is fixed by the start synchronizer 111 to cause the second planetary gear mechanism 108 to function as a speed-reducing mechanism, so that the torque output by the second pump motor 109 is amplified before being transmitted to the driven shaft 114. Therefore, power can be transmitted to the driven shaft 114 by the power transmission via fluid, in addition to the mechanical power transmission, while the torque thereof is amplified. Since the start synchronizer 111, that is, the vehicle-start switching mechanism 111, is operated as described above, the speed change ratio at the time of starting the vehicle becomes even larger than the speed change ratio determined by the large gear ratio of the first-speed gear pair 115 or the reverse gear pair 119. Thus, the drive torque at the time of starting the vehicle can be made relatively large to achieve good acceleration from standstill.

Furthermore, when any one of the fixed speed change ratios as the forward gear speeds is set in the transmission, the displacement volume of one of the pump motors 107, 109 is set at zero, and correspondingly the other one of the pump motors 107, 109 is locked. Therefore, when any one of the fixed speed change ratios is set, the fluid drive transmission is not performed. That is, power can be transmitted without performing conversion of energy form, and energy is not particularly needed in order to keep the power transmission path capable of power transmission. Therefore, the power transmission efficiency can be improved more than in the related art.

Furthermore, in the construction example of the sixth embodiment shown in FIG. 12, each of the pump motors 107, 109 has a so-called one-side shaft-projected structure in which its rotor shaft 107A, 109A is projected only in one of the two directions along the axis thereof. Therefore, the pump motors 107, 109 can be provided with a simple construction, so that a small size and a high reliability can be achieved.

Next, a construction example of a seventh embodiment of the invention will be described. This construction example of the seventh embodiment is obtained by altering a portion of the construction of the foregoing sixth embodiment shown in FIG. 12. Therefore, in the following description, portions different from those in the construction shown in FIG. 12 will be described, and portions that are substantially the same as those shown in FIG. 12 are suffixed with the same reference characters as in FIG. 12, and will not be described in detail again.

Figure 15:
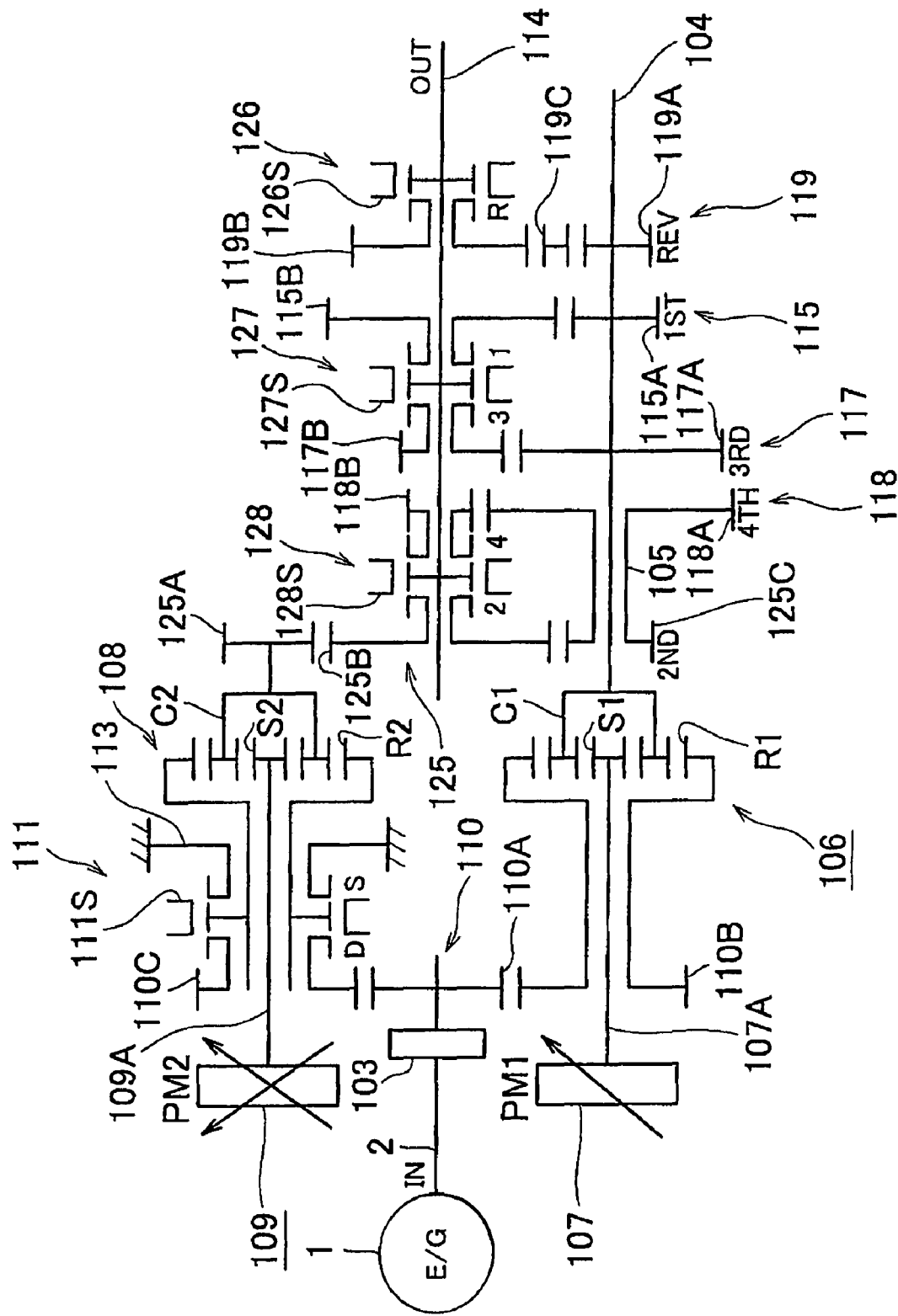
FIG. 15 is a schematic skeleton diagram showing a construction example of a transmission for a vehicle in accordance with a seventh embodiment of the invention.

In the construction example of the seventh embodiment of the invention shown in FIG. 15, the second counter gear pair 112 and the second-speed gear pair 116 in the construction example of the sixth embodiment shown in FIG. 12 are replaced by one gear pair that performs the functions thereof. Specifically, in the example shown in FIG. 15, the second counter gear pair 112 and the second-speed gear pair 116 in the example shown in FIG. 12 are replaced by a second counter gear pair 125 that performs the functions thereof. The construction of the second counter gear pair 125 is substantially the same as that of the second counter gear pair 112 in FIG. 12, that is, a counter driving gear 125A of the second counter gear pair 125 is mounted to a carrier C2 of a second planetary gear mechanism 108, and a counter driven gear 125C meshing with the counter driving gear 125A via an idle gear 125B is linked to a second driving shaft 105. That is, the second driving shaft 105 is linked to the carrier C2 via the second counter gear pair 125.

Therefore, the counter driven gear 125C also serves as a second-speed drive gear 125C, and the idle gear 125B also serves as a second-speed driven gear 125B. That is, the second counter gear pair 125 serves also as a second-speed gear pair 125. In addition, the second counter gear pair 125, similarly to the second counter gear pair 112, constitutes a so-called output drive transmission mechanism, which can be replaced with a drive transmission mechanism that utilizes friction wheels, or a wrapped-around drive transmission mechanism that uses a chain, a belt or the like.

Then, in association with the second counter gear pair 125 serving as both the second counter gear pair 112 and the second-speed gear pair 116 in the example shown in FIG. 12, only a fourth-speed drive gear 118A and the counter driven gear 125C are mounted on the second driving shaft 105 in that order from its distal end side (the right side in FIG. 15).

Furthermore, in association with the second counter gear pair 125 serving as the second counter gear pair 112 and the second-speed gear pair 116 in the example shown in FIG. 12, the disposal of the second-speed gear pair 116, the fourth-speed gear pair 118 and the reverse gear pair 119 is altered. Specifically, the sequence of arrangement of the gears of the gear pairs mounted to the second driving shaft 105 is altered, and the sequence of arrangement of the drive gears of the gear pairs mounted to the first driving shaft 104 is changed to a sequence of arrangement of the reverse drive gear 119A, the first-speed drive gear 115A and the third-speed drive gear 117A from the side of the distal end of the first driving shaft 104 (the right-side end thereof in FIG. 15).

Therefore, in the construction example of the seventh embodiment shown in FIG. 15, the number of counter gear pairs can be reduced and the entire length of the hollow-structured second driving shaft 105 can be shortened in comparison with an example where the fourth-speed drive gear 118A, the second-speed drive gear 116A and the counter driven gear 112C are mounted to the second driving shaft 105. Hence, the double-shaft structure made up of the second driving shaft 105 and the first driving shaft 104 is simplified, and the size and the weight of the transmission or the cost thereof can be reduced. Furthermore, since the number of counter gear pairs is reduced, the gear mesh loss, the friction loss of the transmission as a whole, etc., can be reduced, so that the power transmission efficiency can be improved.

In association with the alteration of the disposal of the second-speed gear pair 125, the fourth-speed gear pair 118 and the reverse gear pair 119, the disposal of the synchronizers is altered. Specifically, in FIG. 15, a first synchronizer 126 is disposed adjacent to the reverse driven gear 119B. A second synchronizer 127 is disposed between the first-speed driven gear 115B and the third-speed driven gear 117B, and a third synchronizer 128 is disposed between the fourth-speed driven gear 118B and the second-speed driven gear 125B.

The constructions of the synchronizers 126, 127, 128 are the same as the constructions of the synchronizers 120, 121, 122. Therefore, the first synchronizer 126 links the reverse driven gear 119B to the driven shaft 114 when a sleeve 126S thereof is moved to the left side in FIG. 15. When the sleeve 126S is positioned at the middle position, the first synchronizer 126 assumes a neutral state in which the sleeve 126S is not engaged with the reverse driven gear 119B. The second synchronizer 127 links the first-speed driven gear 115B to the driven shaft 114 when a sleeve 127S thereof is moved to the right side in FIG. 15. When the sleeve 127S is move to the left side in FIG. 15, the second synchronizer 127 links the third-speed driven gear 117B to the driven shaft 114. Furthermore, when the sleeve 127S is positioned at the middle position, the sleeve 127S is not engaged with either of the driven gears 115B, 117B, that is, the second synchronizer 127 assumes a neutral state. Then, the third synchronizer 128 links the fourth-speed driven gear 118B to the driven shaft 114 when a sleeve 128S thereof is moved to the right side in FIG. 15. When the sleeve 128S is moved to the left side in FIG. 15, the third synchronizer 128 links the second-speed driven gear 125B to the driven shaft 114. Furthermore, when the sleeve 128S is positioned at the middle position, the sleeve 128S is not engaged with either of the driven gears 125B, 118B, that is, the third synchronizer 128 assumes a neutral state.

Similarly to the construction example of the foregoing sixth embodiment, the construction example of the seventh embodiment shown in FIG. 15 is also able to set four forward gear speeds and one reverse gear speed as fixed speed change ratios. The states of operation of the synchronizers 111, 126, 127, 128 and the states of operation of the pump motors 107, 109 for setting the fixed speed change ratios and intermediate speed change ratios therebetween are collectively shown in FIG. 16. The indications used in FIG. 16 mean the same as those in FIG. 14 that are described above.

In FIG. 16, the construction example of the seventh embodiment is different from the construction example of the sixth embodiment firstly in that the first synchronizer 120 in the construction example of the sixth embodiment is replaced with the second synchronizer 127 in the construction example of the seventh the embodiment. The second synchronizer 127, similarly to the first synchronizer 120 in the construction example of the sixth embodiment, is a switching mechanism provided between the first-speed driven gear 115B and the third-speed driven gear 117B, is different merely in name from the first synchronizer 120, with the states of operation as a synchronizer being the same as shown in FIG. 14.

Further differences are the synchronizers for setting the second speed, the fourth speed and the reverse speed. Specifically, the second synchronizer 121 provided between the fourth-speed driven gear 118B and the reverse driven gear 119B in the construction example of the sixth embodiment is replaced with the third synchronizer 128 provided between the second-speed driven gear 125B and the fourth-speed driven gear 118B in the construction example of the seventh embodiment. Furthermore, the second synchronizer 121 provided adjacent to the second-speed driven gear 116B in the construction example of the sixth embodiment is replaced with the third synchronizer 128 provided adjacent to the reverse driven gear 119B in the construction example of the seventh embodiment. Therefore, in FIG. 16, the states of operation shown in the columns of the third synchronizer 128 and the first synchronizer 126 are different from the states of operation shown in the columns of the second synchronizer 121 and the third synchronizer 122 in FIG. 14 while the other columns in FIG. 16 are the same as those in FIG. 14. After all, the linked and released states of the driven gears with respect to the driven shaft 114 are the same between the construction example of the seventh embodiment and the construction example of sixth embodiment.

Therefore, in the transmission with the construction example of the seventh embodiment shown in FIG. 15, the pump motors 107, 109 are operated to set the speed change ratios in substantially the same fashion as in the transmission of the construction example of the sixth embodiment shown in FIG. 12. Therefore, the operations of the planetary gear mechanisms 106, 108 associated with the operations of the pump motors 107, 109 are also the same as in the construction example of the sixth embodiment shown in FIG. 12, so that description of the operations for setting the speed change ratios in the transmission shown in FIG. 15 will be omitted. The construction as shown in FIG. 15 can be reduced in size as a whole, and the vehicle mountability thereof can be improved, and the acceleration from standstill can be improved and the power transmission efficiency can be improved, as in the construction example of the sixth embodiment shown in FIG. 12. Furthermore, each of the pump motors 107, 109 thereof has a so-called one-side shaft-projected structure in which its rotor shaft 107A, 109A is projected only in one of the two directions along the axis thereof. Therefore, the construction can be simplified and reduced in size, and the reliability can be improved.

Next, a construction example of an eighth embodiment of the invention will be described. The construction example of the eighth embodiment is obtained by interchanging the second-speed gear pair (second counter gear pair) 125 and the fourth-speed gear pair 118 in position in the foregoing construction example of the seventh embodiment. Specifically, in the construction example of the seventh embodiment, the second counter gear pair 112 and the second-speed gear pair 116 in the construction example of the sixth embodiment shown in FIG. 12 are replaced by the second counter gear pair 125 that serves as the two gear pairs whereas, in the construction example of the eighth embodiment, the second counter gear pair 112 and the fourth-speed gear pair 118 in the construction example of the sixth embodiment shown in FIG. 12 are replaced by a single counter gear pair that serves as the two gear pairs. In other words, the construction example of the eighth embodiment is obtained by interchanging, in position, the second-speed gear pair (second counter gear pair) 125 and the fourth-speed gear pair 118 in the construction example of the seventh embodiment shown in FIG. 15.

Therefore, the movement directions of the sleeve 128S of the third synchronizer 128 provided between the second-speed driven gear 125B and the fourth-speed driven gear 118B in the construction example of the seventh embodiment shown in FIG. 15 in the directions of the axis (the rightward and leftward directions in FIG. 15) are opposite to the movement directions thereof in the construction example of the eighth embodiment. Specifically, substitution of the "LEFT" and "RIGHT" in the column of the third synchronizer 128 in the operation table of FIG. 16 with "RIGHT" and "LEFT", respectively, provides illustration of the operations performed for setting the speed change ratios in the transmission according to the construction example of the eighth embodiment.

Similarly to the transmissions according to the construction examples of the first and seventh embodiments, the construction example of the eighth embodiment makes it possible to reduce the size of the construction as a whole, improve the vehicle mountability, and improve the acceleration from standstill. Furthermore, each of the pump motors 107, 109 thereof has a so-called one-side shaft-projected structure in which its rotor shaft 107A, 109A is projected only in one direction of the two directions along the axis thereof. Therefore, the construction can be simplified and reduced in size, and the reliability can be improved.

A feature of the construction example of the eighth embodiment is that when the fourth speed as a fixed speed change ratio has been set, power of the engine 1 is transmitted to the driven shaft 114 only via the second planetary gear mechanism 108 and the fourth-speed gear pair 118. Therefore, the number of meshes between gears at the time of setting the fourth speed can be reduced and the power transmission efficiency at the time of high-speed travel can be improved, in comparison with the case where power of the engine 1 is transmitted to the driven shaft 114 via the first planetary gear mechanism 106, the second driving shaft 105 and the fourth-speed gear pair 118.

Next, a construction example of a ninth embodiment of the invention will be described. This construction example of the ninth embodiment is obtained by altering a portion of the construction shown in FIG. 12. Therefore, in the following description, portions different from those in the construction shown in FIG. 12 will be described, and portions that are substantially the same as those shown in FIG. 12 are suffixed with the same reference characters as in FIG. 12, and will not be described in detail again.

Figure 17:
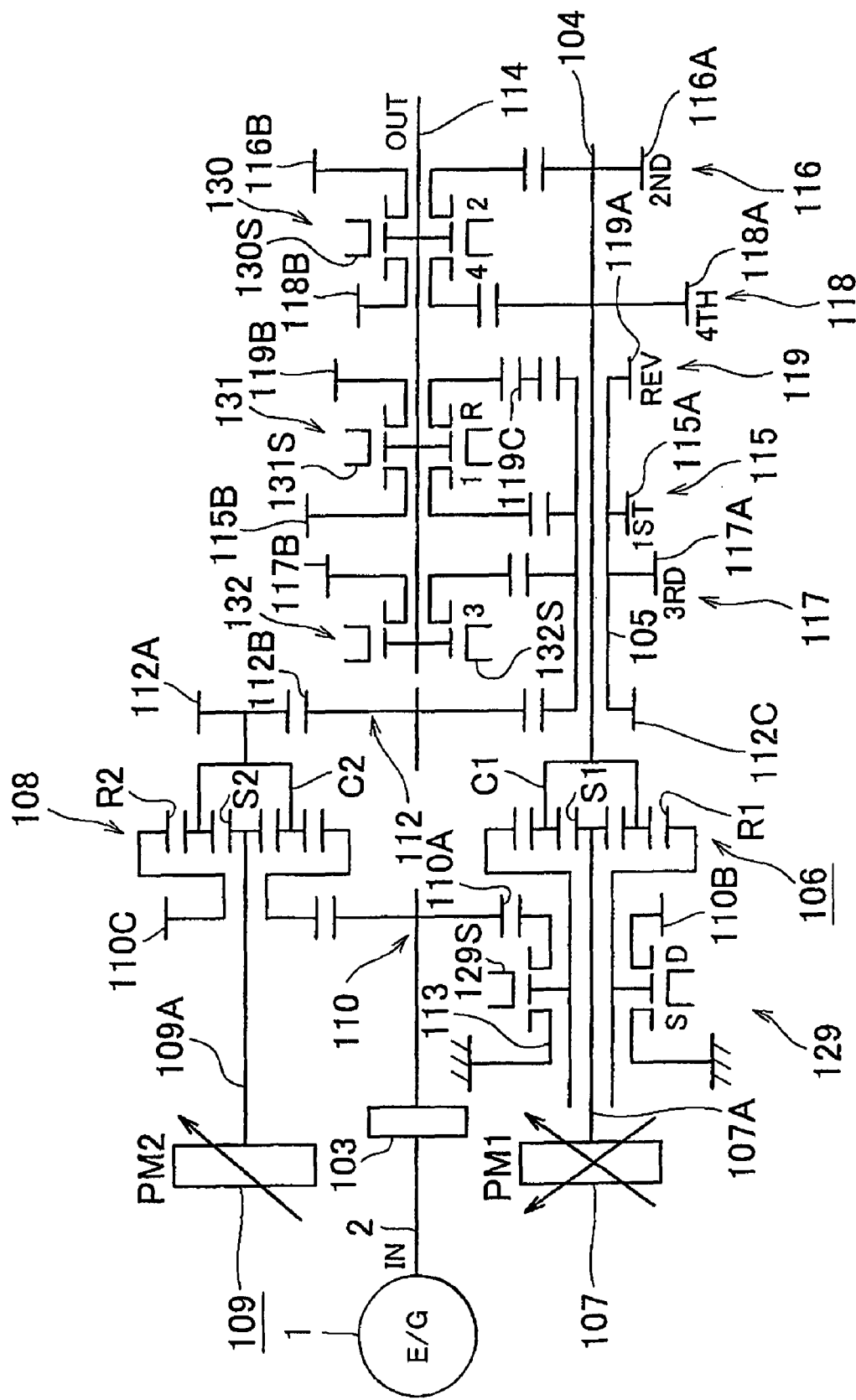
FIG. 17 is a schematic skeleton diagram showing a construction example of a transmission for a vehicle in accordance with a ninth embodiment of the transmission of the invention.

In the construction example of the ninth embodiment of the invention shown in FIG. 17, the start synchronizer 111 disposed coaxially with the second planetary gear mechanism 108 and the second pump motor 109 in the construction example of the sixth embodiment shown in FIG. 12 is disposed on the same axis as the axis of the first planetary gear mechanism 106 and the first pump motor 107. That is, in the example shown in FIG. 17, the start synchronizer 129 corresponding to a vehicle-start switching mechanism in the invention is disposed between the first planetary gear mechanism 106 and the first pump motor 107 coaxially with the first planetary gear mechanism 106 and the first pump motor 107, that is, coaxially with the first and second driving shafts 104, 105.

The start synchronizer 129, constructed substantially the same as the foregoing start synchronizer 111, is able to selectively establish a state in which torque can be transmitted between the ring gear R1 of the first planetary gear mechanism 106 and the engine 1 and is also able to restrict the rotation of the ring gear R1, that is, fix the ring gear R1. Concretely, similar to the foregoing start synchronizer 111, the start synchronizer 129 is made up of, for example, a synchronous link mechanism (synchronizer), a meshing clutch (dog clutch) or a friction type clutch. The start synchronizer 129 illustrated in FIG. 12 is made up of a synchronous link mechanism. The start synchronizer 129 includes a sleeve 129S that is spline-fitted to a hub that is integrated with the ring gear R1 of the first planetary gear mechanism 106. At two opposite sides of the sleeve 129S, a spline integrated with a stationary member 113 and a spline integrated with a counter driven gear 110B of a first counter gear pair 110 are disposed.

That is, the spline integrated with the stationary member 113 is disposed at the engine 1 side (the left side in FIG. 17) of the sleeve 129S, and the spline integrated with the counter driven gear 110B of the first counter gear pair 110 is disposed at the first planetary gear mechanism 106 side (the right side in FIG. 17) of the sleeve 129S. Therefore, the start synchronizer 129 is constructed as follows. When the sleeve 129S is moved to the left side in FIG. 17, the start synchronizer 129 links the ring gear R1 of the first planetary gear mechanism 106 to the stationary member 113 to restrict the rotation of the ring gear R1, that is, fix the ring gear R1. When the sleeve 129S is moved to the right side in FIG. 17, the start synchronizer 129 links the counter driven gear 110B of the first counter gear pair 110 to the ring gear R1. When the sleeve 129S is positioned at the middle position, the sleeve 129S is not engaged with either the stationary member 113 or the counter driven gear 110B, that is, the start synchronizer 129 assumes a neutral state.

Therefore, the first planetary gear mechanism 106 in the construction example of the ninth embodiment shown in FIG. 17 is constructed so that when the sleeve 129S of the start synchronizer 129 is moved to the left side in FIG. 17 to fix the ring gear R1, that is, the input element of the first planetary gear mechanism 106, the first planetary gear mechanism 106 operates as a speed reducing mechanism that amplifies the torque of the sun gear S1, that is, the reaction force element of the first planetary gear mechanism 106, and outputs torque from the carrier C1, that is, the output element of the first planetary gear mechanism 106, if the output torque of the first pump motor 107 is input to the sun gear S1.

In association with the start synchronizer 129 being disposed coaxially with the first planetary gear mechanism 106 and the first pump motor 107, the disposal of the first to fourth-speed gear pairs 115, 116, 117, 118 and the reverse gear pair 119 is altered. Specifically, a second-speed drive gear 116A and a fourth-speed drive gear 118A are mounted on the first driving shaft 104 in that order from its distal end side (the right side in FIG. 17). Besides, a reverse drive gear 119A, a first-speed drive gear 115A and a third-speed drive gear 117A as well as a counter driven gear 112C of a second counter gear pair 112 are mounted to the second driving shaft 105 in that order from its distal end side (the right side in FIG. 17).

Corresponding to the sequence of arrangement of the drive gear 115A, 116A, 117A, 118A, 119A of the gear pairs 115, 116, 117, 118, 119 mounted on the driving shafts 104, 105, driven gears 115B, 116B, 117B, 118B, 119B of the gear pairs are freely rotatably fitted to and supported on a driven shaft 114. Specifically, the second-speed driven gear 116B, the fourth-speed driven gear 118B, the reverse driven gear 119B, the first-speed driven gear 115B and the third-speed driven gear 117B, meshed with the drive gears 116A, 118A, 119A, 115A, 117A, respectively, are freely rotatably fitted to the driven shaft 114 in that order from the distal end side of the driven shaft 114 (the right side in FIG. 17).

In association with the foregoing alteration of the arrangement of the gear pairs 115, 116, 117, 118, 119, the disposal of the synchronizers is altered. Specifically, in FIG. 17, a first synchronizer 130 is disposed between the second-speed driven gear 116B and the fourth-speed driven gear 118B, and a second synchronizer 131 is disposed between the reverse driven gear 119B and the first-speed driven gear 115B. Furthermore, a third synchronizer 132 is disposed adjacent to the third-speed driven gear 117B.

The constructions of the synchronizers 130, 131, 132 are substantially the same as the constructions of the foregoing synchronizers 120, 121, 122. Therefore, the first synchronizer 130 is constructed as follows. That is, when a sleeve 130S thereof is moved to the right side in FIG. 17, the first synchronizer 130 links the second-speed driven gear 116B to the driven shaft 114. When the sleeve 130S is moved to the left side in FIG. 17, the first synchronizer 130 links the fourth-speed driven gear 118B to the driven shaft 114. Furthermore, when the sleeve 130S is positioned at the middle position, the sleeve 130S is not engaged with either of the driven gears 116B, 118B, that is, the first synchronizer 130 assumes a neutral state. Likewise, the second synchronizer 131 links the reverse driven gear 119B to the driven shaft 114 when a sleeve 121S thereof is move to the right side in FIG. 17. When the sleeve 131S is moved to the left side in FIG. 17, the second synchronizer 131 links the first-speed driven gear 115B to the driven shaft 114. Furthermore, when the sleeve 131S is positioned at the middle position, the sleeve 131S is not engaged with either of the driven gears 119B, 115B, that is, the second synchronizer 131 assumes a neutral state. Furthermore, the third synchronizer 132 links the third-speed driven gear 117B to the driven shaft 114 when a sleeve 132S thereof is moved to the right side in FIG. 17. When the sleeve 132S is positioned at the middle position, the third synchronizer 132 assumes a neutral state in which the sleeve 132S is not engaged with the third-speed driven gear 117B.

In the construction example of the ninth embodiment shown in FIG. 17, too, four forward gear speeds and one reverse gear speed as fixed speed change ratios can be set, and the speed change ratio between the fixed speed change ratios can be steplessly or continuously set. When any one of the fixed speed change ratios is to be set, the synchronizers 129, 130, 131, 132 are operated so that the gear pair corresponding to the fixed speed change ratio can transmit torque between a corresponding one of the driving shafts 104, 105 and the driven shaft 114. An intermediate speed change ratio between fixed speed change ratios is set by operating the synchronizers 129, 130, 131, 132 so that the two gear pairs that set the lower-speed side fixed speed change ratio and the higher-speed side fixed speed change ratio with respect to the intermediate speed change ratio can transmit torque between the driving shafts 104, 105 and the driven shaft 114. Furthermore, at the time of forward or reverse start of the vehicle, the synchronizers 129, 130, 131, 132 are operated so that the first-speed gear pair 115 or the reverse gear pair 119 can transmit torque with respect to the driven shaft 114. Therefore, the states of operation of the synchronizers 129, 130, 131, 132 and the pump motors 107, 109 can be collectively illustrated as in FIG. 18. The indications used in FIG. 18 mean the same as those in FIG. 14 or 16 that are described above.

Therefore, the construction example of the ninth embodiment shown in FIG. 17 can be operated in substantially the same manner as the foregoing construction example of the sixth embodiment shown in FIG. 12, and can achieve substantially the same effects. Besides, in this construction example of the ninth embodiment, when the fourth speed as a fixed speed change ratio is set, power of the engine 1 is transmitted to the driven shaft 114 only via the first planetary gear mechanism 106 and the first driving shaft 104 as well as the fourth-speed gear pair 118. Therefore, the number of meshes of gears at the time of the fourth speed can be reduced and the power transmission efficiency at the time of high-speed travel, in particular, can be improved, in comparison with, for example, a construction in which power of the engine 1 is transmitted to the driven shaft 114 via the second planetary gear mechanism 108, the second counter gear pair 112 and the second driving shaft 105 as well as the fourth-speed gear pair 118.

Next, a construction example of a tenth embodiment of the invention will be described. This construction example of the tenth embodiment is obtained by altering a portion of the foregoing constructions shown in FIGS. 12 and 17. Therefore, in the following description, portions different from those in the constructions shown in FIGS. 12 and 17 will be described, and portions that are substantially the same as those shown in FIGS. 12 and 17 are suffixed with the same reference characters as in FIGS. 12 and 17, and will not be described in detail again.

Figure 19:
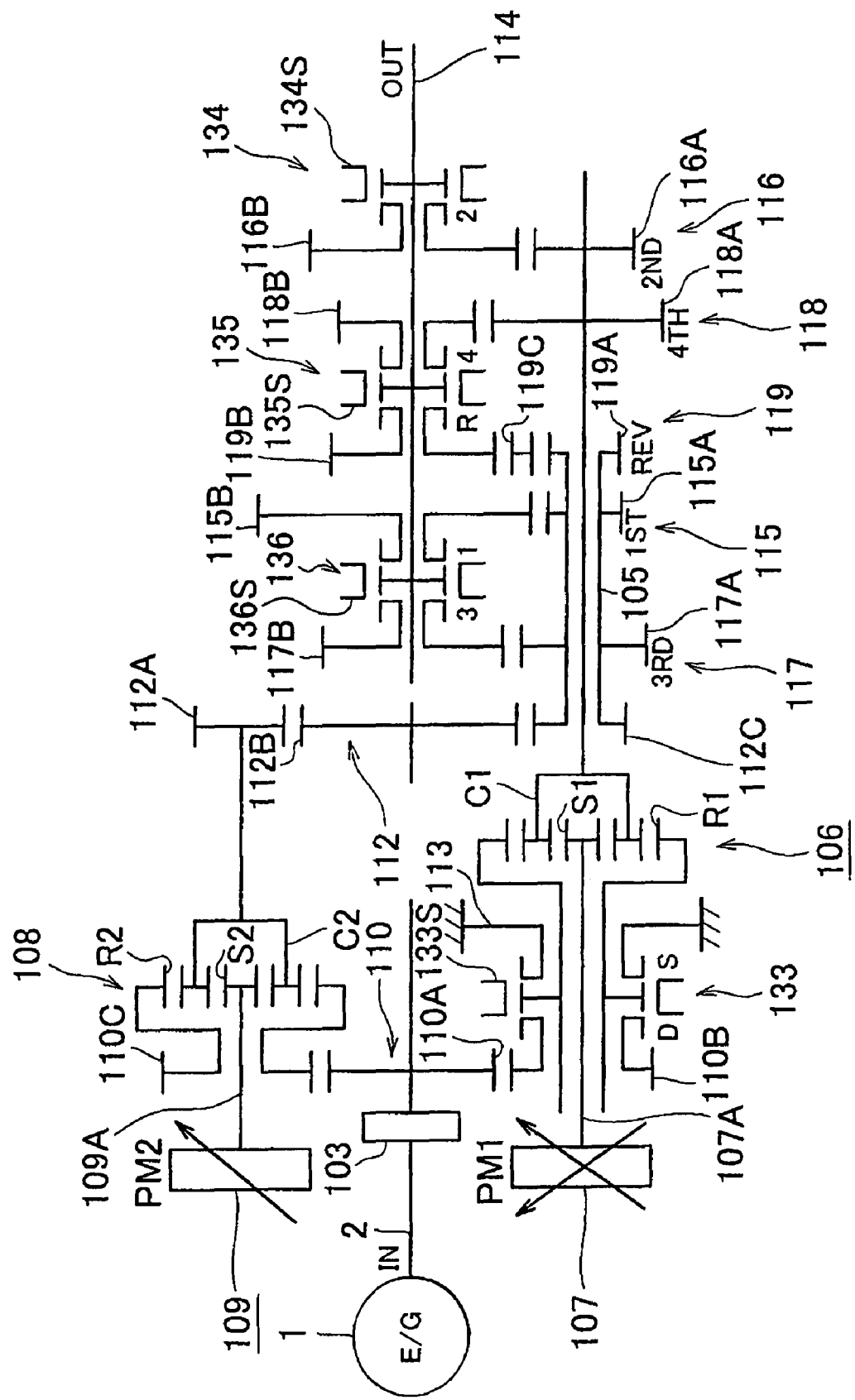
FIG. 19 is a schematic skeleton diagram showing a construction example of a transmission for a vehicle in accordance with a tenth embodiment of the transmission of the invention.

In the construction example of the tenth embodiment of the invention shown in FIG. 19, the stationary member 113 and the counter driven gear 110B of the first counter gear pair 110 that are linkable to the ring gear R1 of the first planetary gear mechanism 106 by the start synchronizer 129 in the construction example of the ninth embodiment shown in FIG. 17 are interchanged in position. That is, in the example shown in FIG. 19, the spline integrated with the counter driven gear 110B of the first counter gear pair 110 is disposed at the engine 1 side (the left side in FIG. 19) of a sleeve 133S of a start synchronizer 133 that corresponds to a vehicle-start switching mechanism in the invention, and the spline integrated with the stationary member 113 is disposed at the first planetary gear mechanism 106 side (the right side in FIG. 19) of the sleeve 133S. Therefore, when the sleeve 133S is moved to the left side in FIG. 19, the start synchronizer 133 links the counter driven gear 110B of the first counter gear pair 110 to the ring gear R1. When the sleeve 133S is moved to the right side in FIG. 19, the start synchronizer 133 links the ring gear R1 of the first planetary gear mechanism 106 to the stationary member 113 to restrict the rotation of the ring gear R1, that is, fix the ring gear R1. Furthermore when the sleeve 133S is positioned at the middle position, the sleeve 133S is not engaged with either the counter driven gear 110B or the stationary member 113, that is, the start synchronizer 133 assumes a neutral state.

Therefore, the first planetary gear mechanism 106 in the construction example of the tenth embodiment shown in FIG. 19 is constructed so that when the sleeve 133S of the start synchronizer 133 is moved to the right side in FIG. 19 to fix the ring gear R1, that is, the input element of the first planetary gear mechanism 106, the first planetary gear mechanism 106 operates as a speed reducing mechanism that amplifies the torque of the sun gear S1, that is, the reaction force element of the first planetary gear mechanism 106, and outputs torque from the carrier C1, that is, the output element of the first planetary gear mechanism 106, if the output torque of the first pump motor 107 is input to the sun gear S1.

In association with the alteration of the disposal of the counter driven gear 110B and the stationary member 113, the disposal of the second planetary gear mechanism 108 is also altered. Specifically, the second planetary gear mechanism 108 is disposed on an axis parallel to the axis of the driving shafts 104, 105 and the start synchronizer 133, and is radially outwardly adjacent to the start synchronizer 133. That is, the two planetary gear mechanisms 106, 108 are disposed with a dislocation from each other in the direction of the axis. Therefore, the length of the construction of the transmission in the radial direction can be shortened and therefore the size of the construction can be reduced in comparison with the construction in which the planetary gear mechanisms 106, 108 are disposed in parallel at the same position in the direction of the axis.

Furthermore, the disposal of synchronizers is altered. Specifically, in FIG. 19, a first synchronizer 134 is disposed adjacent to the second-speed driven gear 116B. A second synchronizer 135 is disposed between the fourth-speed driven gear 118B and the reverse driven gear 119B, and a third synchronizer 136 is disposed between the first-speed driven gear 115B and the third-speed driven gear 117B.

The constructions of the synchronizers 134, 135, 136 are substantially the same as the constructions of the foregoing synchronizers 120, 121, 122 or the foregoing synchronizers 130, 131, 132. Therefore, the first synchronizer 134 links the second-speed driven gear 116B to the driven shaft 114 when a sleeve 134S of the first synchronizer 134 is moved to the left side in FIG. 19. When the sleeve 134S is positioned at the middle position, the first synchronizer 134 assumes a neutral state in which the sleeve 134S is not engaged with the second driven gear 116B. The second synchronizer 135 links the fourth-speed driven gear 118B to the driven shaft 114 when a sleeve 135S of the second synchronizer 135 is moved to the right side in FIG. 19. When the sleeve 135S is moved to the left side in FIG. 19, the second synchronizer 135 links the reverse driven gear 119B to the driven shaft 114. Furthermore, when the sleeve 135S is positioned at the middle position, the sleeve 135S is not engaged with either of the driven gears 118B, 119B, that is, the second synchronizer 135 assumes a neutral state. The third synchronizer 136 links the first-speed driven gear 115B to the driven shaft 114 when a sleeve 136S of the third synchronizer 136 is moved to the right side in FIG. 19. When the sleeve 136S is moved to the left side in FIG. 19, the third synchronizer 136 links the third-speed driven gear 117B to the driven shaft 114. Furthermore, when the sleeve 136S is positioned at the middle position, the sleeve 136S is not engaged with either of the driven gears 115B, 117B, that is, the third synchronizer 136 assumes a neutral state.

In the construction example of the tenth embodiment shown in FIG. 19, too, four forward gear speeds and one reverse gear speed as fixed speed change ratios can be set, and the speed change ratio between the fixed speed change ratios can be steplessly or continuously set. When any one of the fixed speed change ratios is to be set, the synchronizers 133, 134, 135, 136 are operated so that the gear pair corresponding to the fixed speed change ratio can transmit torque between a corresponding one of the driving shafts 104, 105 and the driven shaft 114. An intermediate speed change ratio between fixed speed change ratios is set by operating the synchronizers 133, 135, 135, 136 so that the two gear pairs that set the lower-speed side fixed speed change ratio and the higher-speed side fixed speed change ratio with respect to the intermediate speed change ratio can transmit torque between the driving shafts 104, 105 and the driven shaft 114. Furthermore, at the time of forward or reverse start of the vehicle, the synchronizers 133, 135, 135, 136 are operated so that the first-speed gear pair 115 or the reverse gear pair 119 can transmit torque with respect to the driven shaft 114. Therefore, the states of operation of the synchronizers 133, 135, 135, 136 and the pump motors 107, 109 can be collectively illustrated as in FIG. 20. The indications used in FIG. 20 mean the same as those in FIGS. 14, 16 and 18 that are described above.

Therefore, the construction example of the tenth embodiment shown in FIG. 19 can be operated in substantially the same manner as the foregoing construction example of the ninth embodiment shown in FIG. 17, and can achieve substantially the same effects. Besides, in the construction example of the tenth embodiment, the two planetary gear mechanisms 106, 108 are disposed with a dislocation from each other in the direction of the axis. Therefore, in the case where a space for accommodating the second planetary gear mechanism 108 is dislocated toward the engine 1 side (the left side in FIG. 19) in the transmission and a space for accommodating the second planetary gear mechanism 108 is provided near a center portion of the transmission, a so-called protuberance formed in a central portion of the outer peripheral portion of the transmission can be reduced, and the vehicle mountability of the transmission can be improved, in comparison with the case where the planetary gear mechanisms 106, 108 are disposed in parallel at the same position in the direction of the axis.

Next, a construction example of an eleventh embodiment of the invention will be described. This construction example of the eleventh embodiment is obtained by altering a portion of the foregoing constructions shown in FIGS. 12, 15, 17 and 19. Therefore, in the following description, portions different from those in the constructions shown in FIGS. 12, 15, 17 and 19 will be described, and portions that are substantially the same as those shown in FIGS. 12, 15, 17 and 19 are suffixed with the same reference characters as in FIGS. 12, 15, 17 and 19, and will not be described in detail again.

Figure 21:
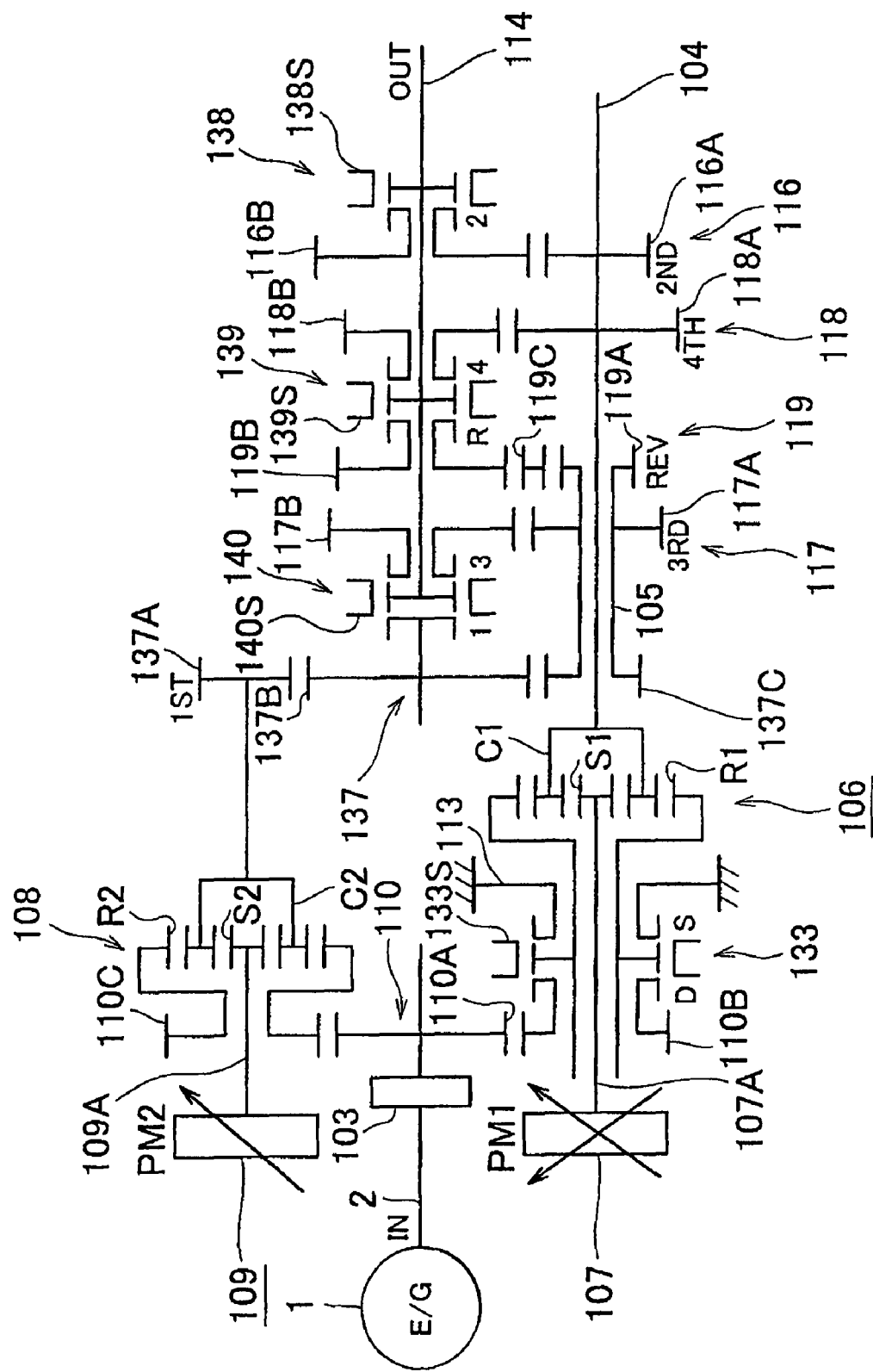
FIG. 21 is a schematic skeleton diagram showing a construction example of a transmission for a vehicle in accordance with an eleventh embodiment of the transmission of the invention.

In the construction example of the eleventh embodiment of the invention shown in FIG. 21, the second counter gear pair 112 and the first-speed gear pair 115 in the construction example of the tenth embodiment shown in FIG. 19 are replaced by a gear pair that performs the functions thereof. Specifically, in the example shown in FIG. 21, the second counter gear pair 112 and the first-speed gear pair 115 in the example shown in FIG. 19 are replaced by a second counter gear pair 137 that performs the functions thereof. The construction of the second counter gear pair 137 is substantially the same as that of the foregoing second counter gear pairs 112, 125, that is, a counter driving gear 137A of the second counter gear pair 137 is mounted to a carrier C2 of a second planetary gear mechanism 108, and a counter driven gear 137C meshing with the counter driving gear 137A via an idle gear 137B is linked to a second driving shaft 105. That is, the second driving shaft 105 is linked to the carrier C2 via the second counter gear pair 137.

Therefore, the counter driven gear 137C also serves as a first-speed drive gear 137C, and the idle gear 137B also serves as a first-speed driven gear 137B. That is, the counter gear pair 137 serves also as a first-speed gear pair 137. In addition, the second counter gear pair 137, similarly to the second counter gear pairs 112, 125, constitutes a so-called output drive transmission mechanism, which can be replaced with a drive transmission mechanism that utilizes friction wheels, or a wrapped-around drive transmission mechanism that uses a chain, a belt or the like.

Then, in association with the second counter gear pair 137 serving as both the second counter gear pair 112 and the first-speed gear pair 115 in the example shown in FIG. 19, a reverse drive gear 119A and a third-speed drive gear 117A and the counter driven gear 137C are mounted on the second driving shaft 105 in that order from its distal end side (the right side in FIG. 21).

Corresponding to the sequence of arrangement of the drive gears 137A, 116A, 117A, 118A, 119A of the gear pairs 137, 116, 117, 118, 119 mounted on the driving shafts 104, 105, driven gears 137B, 116B, 117B, 118B, 119B are freely rotatably fitted to and supported on the driven shaft 114. Specifically, the second-speed driven gear 116B, the fourth-speed driven gear 118B, the reverse driven gear 119B and the third-speed driven gear 117B, meshed with the drive gears 116A, 118A, 119A, 117A, respectively, are freely rotatably fitted to the driven shaft 114 in that order from the distal end side of the driven shaft 114 (the right side in FIG. 21).

Therefore, in the construction example of the eleventh embodiment shown in FIG. 21, the number of counter gear pairs can be reduced and the entire length of the hollow-structured second driving shaft 105 can be shortened in comparison with an example where the reverse drive gear 119A, the first-speed drive gear 115A, the third-speed drive gear 117A and the counter driven gear 112C are mounted to the second driving shaft 105. Hence, the double-shaft structure made up of the second driving shaft 105 and the first driving shaft 104 can be simplified, and the size and the weight of the transmission or the cost thereof can be reduced. Furthermore, since the number of counter gear pairs is reduced, the gear mesh loss, the friction loss of the transmission as a whole, etc., can be reduced, so that the power transmission efficiency can be improved.

In association with the alteration of the disposal of the first-speed gear pair 137 and the third-speed gear pair 117, the disposal of synchronizers is altered. Specifically, in FIG. 21, a first synchronizer 138 is disposed adjacent to the second-speed driven gear 116B. A second synchronizer 139 is disposed between the fourth-speed driven gear 118B and the reverse driven gear 119B. Furthermore, a third synchronizer 140 is disposed between the third-speed driven gear 117B and the first-speed driven gear 137B.

The constructions of the synchronizers 138, 139, 140 are the same as the constructions of the synchronizers 120, 121, 122 or the synchronizers 130, 131, 132. Therefore, the first synchronizer 138 links the second-speed driven gear 116B to the driven shaft 114 when a sleeve 138S thereof is moved to the left side in FIG. 21. When the sleeve 138S is positioned at the middle position, the first synchronizer 138 assumes a neutral state in which the sleeve 138S is not engaged with the second-speed driven gear 116B. The second synchronizer 139 links the fourth-speed driven gear 118B to the driven shaft 114 when a sleeve 139S thereof is moved to the right side in FIG. 21. When the sleeve 139S is move to the left side in FIG. 21, the second synchronizer 139 links the reverse driven gear 119B to the driven shaft 114. Furthermore, when the sleeve 139S is positioned at the middle position, the sleeve 139S is not engaged with either of the driven gears 118B, 119B, that is, the second synchronizer 139 assumes a neutral state. Then, the third synchronizer 140 links the third-speed driven gear 117B to the driven shaft 114 when a sleeve 140S thereof is moved to the right side in FIG. 21. When the sleeve 140S is moved to the left side in FIG. 21, the third synchronizer 140 links the first-speed driven gear 137B to the driven shaft 114. Furthermore, when the sleeve 140S is positioned at the middle position, the sleeve 140S is not engaged with either of the driven gears 117B, 137B, that is, the third synchronizer 140 assumes a neutral state.

In the construction example of the eleventh embodiment shown in FIG. 21, too, four forward gear speeds and one reverse gear speed as fixed speed change ratios can be set, and the speed change ratio between the fixed speed change ratios can be steplessly or continuously set. When any one of the fixed speed change ratios is to be set, the synchronizers 133, 138, 139, 140 are operated so that the gear pair corresponding to the fixed speed change ratio can transmit torque between a corresponding one of the driving shafts 104, 105 and the driven shaft 114. An intermediate speed change ratio between fixed speed change ratios is set by operating the synchronizers 133, 138, 139, 140 so that the two gear pairs that set the lower-speed side fixed speed change ratio and the higher-speed side fixed speed change ratio with respect to the intermediate speed change ratio can transmit torque between the driving shafts 104, 105 and the driven shaft 114. Furthermore, at the time of forward or reverse start of the vehicle, the synchronizers 133, 138, 139, 140 are operated so that the first-speed gear pair 137 or the second-speed gear pair 116 or the reverse gear pair 119 can transmit torque with respect to the driven shaft 114. Therefore, the states of operation of the synchronizers 133, 138, 139, 140 and the pump motors 107, 109 can be collectively illustrated as in FIG. 22. The indications used in FIG. 22 mean the same as those in FIGS. 14, 16, 18 and 20 that are described above.

Therefore, the construction example of the eleventh embodiment shown in FIG. 21 can be operated in substantially the same manner as the foregoing construction example of the tenth embodiment shown in FIG. 19, and can achieve substantially the same effects. Besides, in this construction example of the eleventh embodiment, when the fourth speed as a fixed speed change ratio is set, power of the engine 1 is transmitted to the driven shaft 114 only via the first planetary gear mechanism 106 and the first driving shaft 104 as well as the fourth-speed gear pair 118. Therefore, the number of meshes of gears at the time of the fourth speed can be reduced and the power transmission efficiency at the time of high-speed travel, in particular, can be improved, in comparison with, for example, a construction in which power of the engine 1 is transmitted to the driven shaft 114 via the second planetary gear mechanism 108, the second counter gear pair 112 and the second driving shaft 105 as well as the fourth-speed gear pair 118.

Besides, the two planetary gear mechanisms 106, 108 are disposed with a dislocation from each other in the direction of the axis. Therefore, in the case where a space for accommodating the second planetary gear mechanism 108 is dislocated toward the engine 1 side (the left side in FIG. 21) in the transmission and a space for accommodating the second planetary gear mechanism 108 is provided near a center portion of the transmission, a so-called protuberance formed in a central portion of the outer peripheral portion of the transmission can be reduced, and the vehicle mountability of the transmission can be improved, in comparison with the case where the planetary gear mechanisms 106, 108 are disposed in parallel at the same position in the direction of the axis.

Next, a construction example of a twelfth embodiment of the invention will be described. This construction example of the twelfth embodiment is obtained by altering a portion of the foregoing constructions shown in FIGS. 12, 15, 17, 19 and 21. Therefore, in the following description, portions different from those in the constructions shown in FIGS. 12, 15, 17, 19 and 21 will be described, and portions that are substantially the same as those shown in FIGS. 12, 15, 17, 19 and 21 are suffixed with the same reference characters as in FIGS. 12, 15, 17, 19 and 21, and will not be described in detail again.

Figure 23:
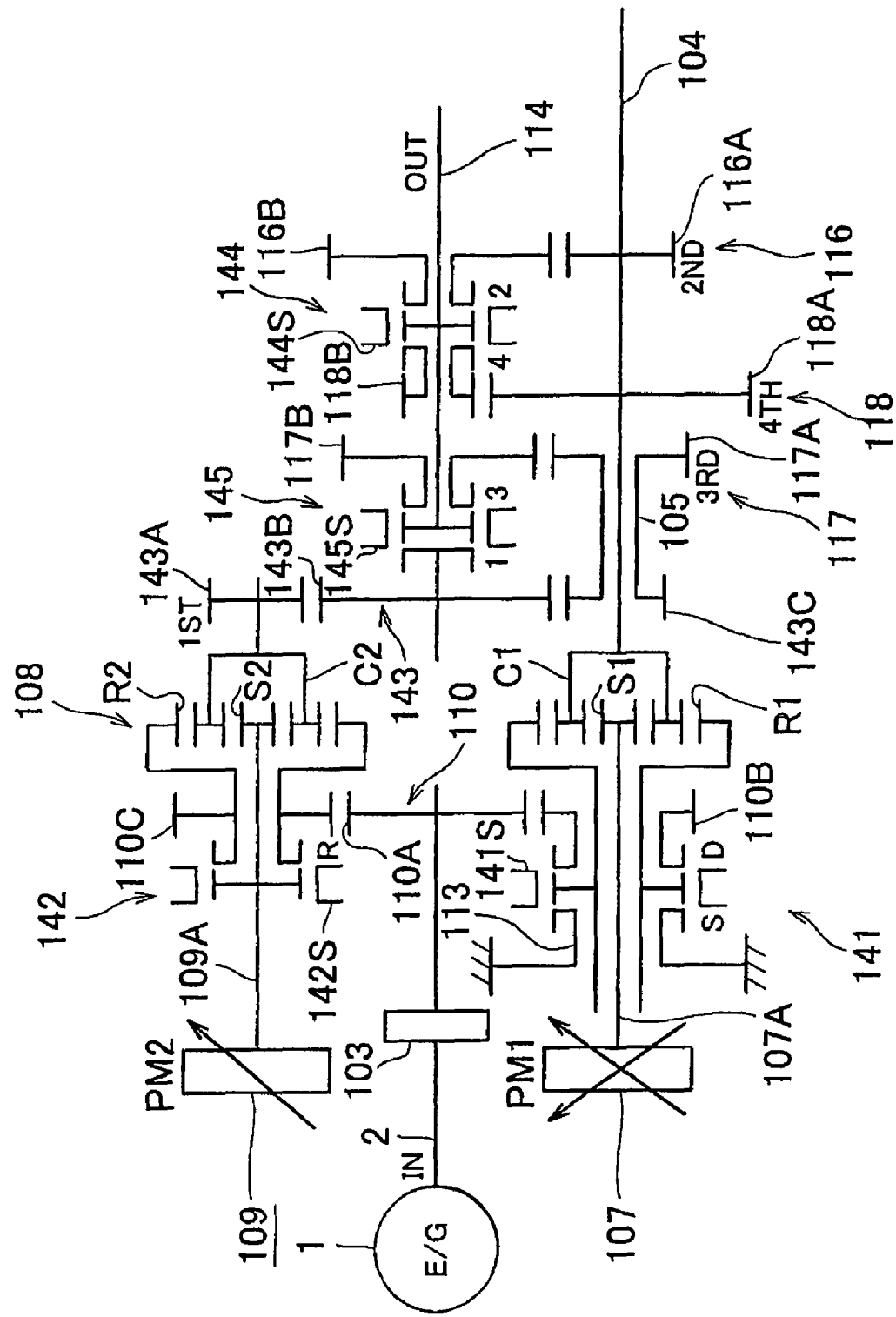
FIG. 23 is a schematic skeleton diagram showing a construction example of a transmission for a vehicle in accordance with a twelfth embodiment of the transmission of the invention.

In the construction example of the twelfth embodiment of the invention shown in FIG. 23, a reverse synchronizer for setting a reverse gear speed is provided between a planetary gear mechanism and a pump motor on a side where the start synchronizer is not provided. Specifically, in the example shown in FIG. 23, a start synchronizer 141 corresponding to a vehicle-start switching mechanism in this invention is disposed coaxially with a first planetary gear mechanism 106 and a first pump motor 107, that is, coaxially with first and second driving shafts 104, 105, and between the first planetary gear mechanism 106 and the first pump motor 107. Besides, a reverse synchronizer 142 is disposed coaxially with a second planetary gear mechanism 108 and a second pump motor 109, and between the second planetary gear mechanism 108 and the second pump motor 109.

The start synchronizer 141, constructed in substantially the same manner as the start synchronizers 111, 129, 133, includes a sleeve 141S that is spline-fitted to a hub that is integrated with a ring gear R1 of the first planetary gear mechanism 106. At two opposite sides of the sleeve 141S, a spline integrated with a stationary member 113 and a spline integrated with a counter driven gear 101B of a first counter gear pair 110 are disposed.

That is, the spline integrated with the stationary member 141 is disposed at the engine 1 side (the left side in FIG. 23) of the sleeve 141S, and the spline integrated with the counter driven gear 110B of the first counter gear pair 110 is disposed at the first planetary gear mechanism 106 side (the right side in FIG. 23) of the sleeve 141S. Therefore, the start synchronizer 151 is constructed as follows. When the sleeve 141S is moved to the left side in FIG. 23, the start synchronizer 141 links the ring gear R1 of the first planetary gear mechanism 106 to the stationary member 113 to restrict the rotation of the ring gear R1, that is, fix the ring gear R1. When the sleeve 141S is moved to the right side in FIG. 23, the start synchronizer 141 links the counter driven gear 110B of the first counter gear pair 110 to the ring gear R1. When the sleeve 141S is positioned at the middle position, the sleeve 141S is not engaged with either the stationary member 113 or the counter driven gear 110B, that is, the start synchronizer 141 assumes a neutral state.

The reverse synchronizer 142 includes a sleeve 142S that is spline-fitted to a hub that is integrated with the sun gear S2 of the second planetary gear mechanism 108. Furthermore, a spline integrated with the ring gear R2 of the second planetary gear mechanism 108, and a spline integrated with a counter driven gear 110C of the first counter gear pair 110 are disposed adjacent to the sleeve 142S.

Therefore, when the sleeve 142S is moved to the right side in FIG. 23, the reverse synchronizer 142 links the sun gear S2 of the second planetary gear mechanism 108 to the counter driven gear 110C of the first counter gear pair 110 and also links the sun gear S2 and the ring gear R2 of the second planetary gear mechanism 108. When the sleeve 142S is positioned at the middle position, the sleeve 142S is not engaged with either counter driven gear 110C or the ring gear R2, that is, the reverse synchronizer 142 assumes a neutral state.

In association with the provision of the start synchronizer 141 and the reverse synchronizer 142, the disposal of the first to fourth-speed gear pairs 115, 116, 117, 118 and the reverse gear pair 119 is altered. Specifically, a second-speed drive gear 116A and a fourth-speed drive gear 118A are mounted to the first driving shaft 104 in that order from its distal end side (the right side in FIG. 23). Besides, a third-speed drive gear 117A, and a counter driven gear 143C of a second counter gear pair 143 that replaces and serves as the first gear pair are mounted to the second driving shaft 105 in that order from its distal end side (the right side in FIG. 17).

The second counter gear pair 143 is constructed substantially the same as the second counter gear pairs 112, 125 shown in FIGS. 12 and 15. That is, a counter driving gear 143A of the second counter gear pair 143 is mounted to the carrier C2 of the second planetary gear mechanism 108, and a counter driven gear 143C in mesh with the counter driving gear 143A via an idle gear 143B is linked to the second driving shaft 105. That is, the second driving shaft 105 is linked to the carrier C2 via the second counter gear pair 143.

The counter gear pair 143 also serves as a first-speed gear pair 143. Specifically, the counter driven gear 143C serves as a first-speed drive gear 143C, and the idle gear 143B serves as a second-speed driven gear 143B.

Corresponding to the sequence of arrangement of the drive gears 116A, 117A, 118A, 119A, 143A of the gear pairs 116, 117, 118, 119, 143 mounted to the driving shafts 104, 105, driven gears 116B, 117B, 118B, 119B, 143B are freely rotatably fitted to and supported on the driven shaft 114. Specifically, the second-speed driven gear 116B, the fourth-speed driven gear 118B and the third-speed driven gear 117B, meshed with the drive gears 116A, 118A, 117A, respectively, are freely rotatably fitted to the driven shaft 114 in that order from the distal end side of the driven shaft 114 (the right side in FIG. 23).

Therefore, in the construction example of the twelfth embodiment shown in FIG. 23, the number of counter gear pairs can be reduced and the entire length of the hollow-structured second driving shaft 105 can be shortened in comparison with an example where, for example, the reverse drive gear 119A, the first-speed drive gear 115A, the third-speed drive gear 117A and the counter driven gear 112C and the like are mounted to the second driving shaft 105. Hence, the double-shaft structure made up of the second driving shaft 105 and the first driving shaft 104 can be simplified, and the size and the weight of the transmission or the cost thereof can be reduced. Furthermore, since the number of counter gear pairs is reduced, the gear mesh loss, the friction loss of the transmission as a whole, etc., can be reduced, so that the power transmission efficiency can be improved.

In association with the alteration of the disposal of the gear pairs 116, 117, 118, the disposal of synchronizers is altered. Specifically, in FIG. 23, a first synchronizer 144 is disposed between the second-speed driven gear 116B and the fourth-speed driven gear 118B, and a second synchronizer 145 is disposed between the third-speed driven gear 117B and the idle gear 143B of the second counter gear pair 143, that is, the first-speed driven gear 143B.

The constructions of the synchronizers 144, 145 are substantially the same as the constructions of the foregoing synchronizers. Therefore, the first synchronizer 144 links the second-speed driven gear 116B to the driven shaft 114 when a sleeve 144S of the first synchronizer 144 is moved to the right side in FIG. 23. When the sleeve 144S is moved to the left side in FIG. 23, the first synchronizer 144 links the fourth-speed driven gear 118B to the driven shaft 114. Furthermore, when the sleeve 144S is positioned at the middle position, the sleeve 144S is not engaged with either of the driven gears 116B, 118B, that is, the first synchronizer 144 assumes a neutral state. The second synchronizer 145 links the third-speed driven gear 117B to the driven shaft 114 when a sleeve 145S of the second synchronizer 145 is moved to the right side in FIG. 23. When the sleeve 145S is moved to the left side in FIG. 23, the second synchronizer 145 links the idle gear 143B, that is, the first-speed driven gear 143B, to the driven shaft 114. Furthermore, when the sleeve 145S is positioned at the middle position, the sleeve 145S is not engaged with either of the driven gears 117B, 143B, that is, the second synchronizer 145 assumes a neutral state.

In the construction example of the twelfth embodiment shown in FIG. 23, too, four forward gear speeds and one reverse gear speed as fixed speed change ratios can be set, and the speed change ratio between the fixed speed change ratios can be steplessly or continuously set. When any one of the fixed speed change ratios is to be set, the synchronizers 141, 142, 144, 145 are operated so that the gear pair corresponding to the fixed speed change ratio can transmit torque between a corresponding one of the driving shafts 104, 105 and the driven shaft 114. A so-called intermediate speed change ratio between fixed speed change ratios is set by operating the synchronizers 141, 142, 144, 145 so that the two gear pairs that set the lower-speed side fixed speed change ratio and the higher-speed side fixed speed change ratio with respect to the intermediate speed change ratio can transmit torque between the driving shafts 104, 105 and the driven shaft 114. Furthermore, at the time of forward or reverse start of the vehicle, the synchronizers 141, 142, 144, 145 are operated so that the first-speed gear pair 143 or the second-speed gear pair 116 can transmit torque with respect to the driven shaft 114. Therefore, the states of operation of the synchronizers 141, 142, 144, 145 and the pump motors 107, 109 can be collectively illustrated as in FIG. 24. The indications used in FIG. 23 mean the same as those in FIGS. 14, 16, 18, 20 and 22 that are described above.

In the construction example of the twelfth embodiment shown in FIG. 23, when the reverse gear speed is to be set, the sleeve 141S of the start synchronizer 141 is firstly moved to the left side in FIG. 23, so that the ring gear R1 of the first planetary gear mechanism 106 is linked to the stationary member 113, that is, the ring gear R1 is fixed. Furthermore, the sleeve 142S of the reverse synchronizer 142 is moved to the right side in FIG. 23, so that the sun gear S2 of the second planetary gear mechanism 108 is linked to the counter driven gear 110C of the first counter gear pair 110 and to the ring gear R2 of the first planetary gear mechanism 108. That is, the rotating elements of the second planetary gear mechanism 108, that is, the sun gear S2, the ring gear R2 and the carrier C2, assume such a state as to rotate together as one unit.

During this state, power of the engine 1 input to the input shaft 2 is input to the second pump motor 109 via the first counter gear pair 110 and the second planetary gear mechanism 108 whose rotating elements rotate together as one unit. Therefore, by the power from the engine 1, the second pump motor 109 is rotated in the direction opposite to the rotation direction of the engine 1, and functions as a pump to generate oil pressure. Then, the pressure oil produced by the second pump motor 109 functioning as a pump is supplied from the ejection port 109D to the ejection port 107D of the first pump motor 107. As a result, due to the pressure oil supplied to the ejection port 107D, the first pump motor 107 functions as a motor, and rotates in the direction opposite to the rotation direction thereof in the case of forward travel, and the torque is transmitted to the driven shaft 114 via the first planetary gear mechanism 106, the first driving shaft 104 and the second-speed gear pair 116.

At this time, since the ring gear R1 of the first planetary gear mechanism 106 is fixed by the start synchronizer 141, the first planetary gear mechanism 106 functions as a speed-reducing mechanism in which the carrier C1 acts as an output element. Therefore, the torque input to the sun gear S1 is amplified by the first planetary gear mechanism 106, and then is transmitted to the driven shaft 114 via the first driving shaft 104 and the second-speed gear pair 116. That is, the torque output from the first pump motor 107 is amplified, and then is transmitted to the driven shaft 114.

Therefore, the power of the engine 1 causes the second pump motor 109 to function as a pump, and in turn, the oil pressure generated by the second pump motor 109 causes the first pump motor 107 to function as a motor. The torque that is output by the first pump motor 107 functioning as a motor and that is opposite in direction to the torque output in the case of forward travel is amplified by the first planetary gear mechanism 106, and then is transmitted to driven shaft 114. Thus, the vehicle travels rearward.

Therefore, in the construction example of the twelfth embodiment shown in FIG. 23, it becomes unnecessary that one of the foregoing two pump motors be of the so-called two-way swing type, that is, each of the first pump motor 107 and the second pump motor 109 can be constructed of a so-called one-way swing type pump motor. Therefore, the constructions of the pump motors 107, 109 can be simplified, or can be reduced in size and weight.

Although in the foregoing examples, the driven shaft 114 is used as an output shaft, it is also permissible in the invention that an output shaft be provided separately from the driven shaft 114 and power be transmitted from the driven shaft 114 to the output shat and be output from the transmission. In that case, the output shaft may be disposed coaxially with the driving shafts 104, 105.

The invention claimed is:

1. A transmission for a vehicle comprising:
   first and second driving shafts to which power is selectively transmitted from a motive power source;
   a driven shaft to which power is transmitted from the first and second driving shafts;
   a plurality of drive transmission mechanisms disposed between the first and second driving shafts and the driven shaft; and
   a switching mechanism that enables the selective transmission of power between the first driving shaft and the driven shaft or between the second driving shaft and the driven shaft via the drive transmission mechanisms,
   wherein the first and second driving shafts are disposed concentrically and fitted to each other so as to be rotatable relative to each other, and the first and second driving shafts and the driven shaft are disposed on axes that are parallel to each other,
   a first drive unit able to output a portion of the power transmitted from the motive power source to the first driving shaft and output another portion of the power after changing the another portion of the power in energy form and also able to change a proportion between the power output to the first driving shaft and the power output after being changed in energy form is disposed on the same axis as the axis of the first driving shaft and the second driving shaft, and
   a second drive unit able to output a portion of the power transmitted from the motive power source to the second driving shaft and output another portion of the power after changing the another portion of the power in energy form and also able to change a proportion between the power output to the second driving shaft and the power output after being changed in energy form is disposed on the same axis as the axis of the driven shaft,
   the first drive unit and the second drive unit are interconnected so as to be able to send and receive powers changed in energy form to and from each other,
   each of the first drive unit and the second drive unit includes a planetary mechanism that performs a differential operation by three elements that are an input element to which power is transmitted from the motive power source, an output element that outputs power to one of the driving shafts, and a reaction element, and
   the first driving shaft is linked to the first drive unit and the second driving shaft is linked to the second drive unit.

2. The transmission for a vehicle according to claim 1, wherein
   each of the first drive unit and the second drive unit includes a motor that is driven to generate energy and is supplied with energy to output power and that is variable in a capacity of generating energy and a capacity of outputting power, and in each of the first drive unit and the second drive unit, the motor is linked to the reaction element.

3. The transmission for a vehicle according to claim 2, further comprising:
a direct-coupling switching mechanism that selectively directly couples the driven shaft and the motor of one of the drive units disposed on the same axis as the driven shaft, and a vehicle start control device that sets the direct-coupling switching mechanism and another one of the switching mechanisms into an engaged state.

4. The transmission for a vehicle according to claim 3, wherein
the drive transmission mechanisms include a first-speed drive transmission mechanism that transmits power when the vehicle starts in a forward travel direction, and another forward-speed drive transmission mechanism whose speed change ratio is smaller than the speed change ratio of the first-speed drive transmission mechanism, and
the direct-coupling switching mechanism is able to switch the another forward-speed drive transmission mechanism into a torque transmission-capable state while linkage between the driven shaft and the motor of the one of the drive units disposed coaxially with the driven shaft is released.

5. The transmission for a vehicle according to claim 4, wherein
the another forward-speed drive transmission mechanism is a drive transmission mechanism that sets a speed change ratio that is subsequently smaller than the speed change ratio of the first-speed drive transmission mechanism.

6. The transmission for a vehicle according to claim 4, wherein
the another forward-speed drive transmission mechanism is another drive transmission mechanism linked to one of the driving shafts to which a second-speed drive transmission mechanism whose speed change ratio is subsequently smaller than the speed change ratio of the first-speed drive transmission mechanism is linked.

7. The transmission for a vehicle according to claim 3, wherein
the another one of the switching mechanisms is either one of a drive transmission mechanism that enables torque transmission via a drive transmission mechanism that sets a greatest speed change ratio in a forward travel direction among the plurality of power transmission mechanisms, and a drive transmission mechanism that transmits power in such a direction that the vehicle travels in a reverse direction.

8. The transmission for a vehicle according to claim 2, wherein
a first planetary mechanism having an input element to which power is input from the motive power source, an output element linked to the first driving shaft, and a reaction element is disposed on the same axis as the first driving shaft and the second driving shaft, and
a first motor that is capable of recovering energy and outputting drive force and that is variable in an energy recovery capacity and an output capacity is linked to the reaction element of the first planetary mechanism, and
a second planetary mechanism having an input element to which power is input from the motive power source, an output element linked to the second driving shaft, and a reaction element is disposed on an axis that is parallel to the first driving shaft and the second driving shaft, and a second motor that is capable of recovering energy and outputting drive force and that is variable in an energy recovery capacity and an output capacity is linked to the reaction element of the second planetary mechanism, and
a vehicle-start switching mechanism is provided which selectively causes a path between the motive power source and the input element of one planetary mechanism of the first planetary mechanism and the second planetary mechanism to be capable of torque transmission, and which selectively restricts rotation of the input element of the one planetary mechanism by linking the one planetary mechanism to a stationary member.

9. The transmission for a vehicle according to claim 8, wherein
one planetary mechanism of the first planetary mechanism and the second planetary mechanism is constructed so that the one planetary mechanism operates as a speed-reducing mechanism if power is input to the reaction element of the one planetary mechanism from the first motor or the second motor while the input element of the one planetary mechanism is linked to the stationary member by the vehicle-start switching mechanism so that rotation of the input element is restricted.

10. The transmission for a vehicle according to claim 8, wherein
one planetary mechanism of the first planetary mechanism and the second planetary mechanism is constructed of a single-pinion type planetary gear mechanism that has a sun gear, a ring gear disposed concentrically with the sun gear, and a carrier holding pinions that are in mesh with the sun gear and the ring gear, and the ring gear forms an input element of the one planetary mechanism to which power is input from the motive power source, and the carrier forms an output element of the one planetary mechanism that is linked to the first driving shaft or the second driving shaft, and the sun gear forms a reaction element of the one planetary mechanism that is linked to the first motor or the second motor.

11. The transmission for a vehicle according to claim 8, wherein
the drive transmission mechanisms are mechanisms capable of setting a plurality of speed change ratios for the vehicle's traveling, and the vehicle-start switching mechanism is constructed so that when there is a request for increasing the drive torque at the time of start of the vehicle, the vehicle-start switching mechanism interlinks the stationary member and the input element of the one planetary mechanism of the first planetary mechanism and the second planetary mechanism, and causes a path between the input element of the one planetary mechanism and the motive power source to be in a state of being incapable of torque transmission, and so that when there is not a drive torque increase request, the vehicle-start switching mechanism releases linkage between the stationary member and the input element of the one planetary mechanism and allows rotation of the input element of the one planetary mechanism, and causes a path between input element of the one planetary mechanism and the motive power source to be in a state of being capable of torque transmission, or causes the input element of the one planetary mechanism to be in a state in which the input element of the one planetary mechanism is not linked to any member.

12. The transmission for a vehicle according to claim 8, wherein the first motor is disposed on the same axis as the first planetary mechanism and the first driving shaft as well as the second driving shaft, and the second motor is disposed on the same axis as the second planetary mechanism, and is disposed radially outwardly adjacent to an outside of the first motor.

13. The transmission for a vehicle according to claim 2, wherein the motors include variable capacity type fluid pressure pump motors that are variable in displacement volume, and the variable capacity type fluid pressure pump motors in the drive units are interconnected so as to be able to send and receive fluid pressures to and from each other.

14. The transmission for a vehicle according to claim 13, wherein the variable capacity type fluid pressure pump motors include a two-way swing type fluid pressure pump motor whose displacement volume is changeable in both positive and negative directions.

15. The transmission for a vehicle according to claim 2, wherein the motors include a motor-generator that has a function of an electric generator and a function of an electric motor.

16. The transmission for a vehicle according to claim 1, wherein the drive transmission mechanisms include at least one reverse-speed drive transmission mechanism that transmits power to cause the vehicle to travel reversely, and the switching mechanism includes a mechanism which selectively causes a drive transmission mechanism provided between one of the driving shafts and the driven shaft and another drive transmission mechanism provided between another one of the driving shafts and the driven shaft to be capable of torque transmission and which sets both the drive transmission mechanism and the another drive transmission mechanism into such a state as not to transmit torque, and the drive transmission mechanisms set into a torque transmission-capable state by the mechanism include the reverse-speed drive transmission mechanism.

* * * * *